United States Patent
Taherzadeh Boroujeni et al.

(10) Patent No.: US 12,395,270 B2
(45) Date of Patent: Aug. 19, 2025

(54) DETERMINING UPLINK CONTROL CHANNEL REPETITION FACTORS

(71) Applicant: QUALCOMM Incorporated, San Diego, CA (US)

(72) Inventors: Mahmoud Taherzadeh Boroujeni, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 632 days.

(21) Appl. No.: 17/581,573

(22) Filed: Jan. 21, 2022

(65) Prior Publication Data

US 2022/0239411 A1    Jul. 28, 2022

Related U.S. Application Data

(60) Provisional application No. 63/143,020, filed on Jan. 28, 2021, provisional application No. 63/141,436, filed on Jan. 25, 2021, provisional application No. 63/141,275, filed on Jan. 25, 2021.

(51) Int. Cl.
*H04L 1/08* (2006.01)
*H04W 72/20* (2023.01)

(52) U.S. Cl.
CPC ............ *H04L 1/08* (2013.01); *H04W 72/20* (2023.01)

(58) Field of Classification Search
CPC .................. H04L 1/08; H04W 72/20
See application file for complete search history.

(56) References Cited

U.S. PATENT DOCUMENTS

| | | | | |
|---|---|---|---|---|
| 2020/0259625 | A1* | 8/2020 | Papasakellariou ... | H04B 7/0456 |
| 2022/0095346 | A1* | 3/2022 | Khoshnevisan ...... | H04L 1/1854 |
| 2024/0089026 | A1* | 3/2024 | Bhamri ..................... | H04L 1/08 |

FOREIGN PATENT DOCUMENTS

| | | | | |
|---|---|---|---|---|
| CA | 3060839 A1 * | 5/2020 | ............. | H04B 1/713 |
| CN | 116830704 A * | 9/2023 | ........... | H04B 7/0617 |

OTHER PUBLICATIONS

Spreadtrum Communications; "Considerations on PUCCH coverage enhancements"; 3GPP Draft R12100798; Jan. 18, 2021; (Year: 2021).*

(Continued)

*Primary Examiner* — Edan Orgad
*Assistant Examiner* — Samuel Dilan Rutnam
(74) *Attorney, Agent, or Firm* — Holland & Hart LLP

(57) ABSTRACT

Methods, systems, and devices for wireless communications are described. Generally, a base station may implicitly indicate a physical uplink control channel (PUCCH) repetition factor for a user equipment (UE) to use on a next PUCCH via the selection of an aggregation level for the preceding physical downlink control channel (PDCCH). For example, the base station may configure relationships between PUCCH repetition factors and aggregation levels. To determine which PUCCH repetition factor the UE should use, the base station may select the corresponding aggregation level, and may transmit a downlink control message (e.g., a downlink control information (DCI) message) on a PDCCH using the selected aggregation level that corresponds to the desired PUCCH repetition factor.

28 Claims, 26 Drawing Sheets

(56) References Cited

OTHER PUBLICATIONS

International Search Report and Written Opinion—PCT/US2022/070323—ISA/EPO—Jun. 15, 2022.
Lenovo, et al., "Enhancements for PUCCH Repetition", 3GPP Draft, 3GPP TSG RAN WG1 #104-e, R1-2101576, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), XP051971740, 4 Pages, Retrieved from the Internet: URL: https://ftp.3gpp.org/tsg_ran/WG1_RL1/TSGR1_104-e/Docs/R1-2101576.zip R1-2101576_PUCCH_repetition_Cov.docx [Retrieved on Jan. 19, 2021] paragraph [02.1].
NTT DOCOMO, et al., "PUCCH Enhancements for Coverage Enhancement", 3GPP Draft, 3GPP TSG RAN WG1 #104e, R1-2101626, 3rd Generation Partnership Project (3GPP), Mobile Competence Centre, 650, Route Des Lucioles, F-06921 Sophia-Antipolis Cedex, France, vol. RAN WG1, No. E-Meeting, Jan. 25, 2021-Feb. 5, 2021, Jan. 18, 2021 (Jan. 18, 2021), XP051971781, 2 Pages, Retrieved from the Internet: URL: https://ftp.3gpp.org/tsg_ran/WG1_RL1/TSGR1_104-e/Docs/R1-2101626.zip R1-2101626 PUCCH Enhancements.docx [Retrieved on Jan. 18, 2021] p. 1.
NTT DOCOMO, et al., "UL Data Transmission Procedure for June Release URLLC", 3GPP Draft, 3GPP TSG RAN WG1 Meeting #93, R1-1807069, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442267, 6 Pages, Retrieved from the Internet: URL: http://www.3gpp.org/ftp/Meetings%5F3GPP%5FSYNC/RAN1/Docs/ [Retrieved on May 20, 2018] p. 1.
Qualcomm Incorporated: "Summary of Rel:15 Maintenance for Scheduling and HARQ", 3GPP Draft, 3GPP TSG RAN WG 1 Meeting #98, R1-1909522, 3rd Generation Partnership Project (3GPP), Mobile Competence Centre, 650, Route Des Lucioles, F-06921 Sophia-Antipolis Cedex, France, vol. RAN WG1, No. Praque, Czech, Aug. 26, 2019-Aug. 30, 2019, Sep. 3, 2019 (Sep. 3, 2019), XP051766121, 14 Pages, Retrieved from the Internet: URL: http://www.3gpp.org/ftp/tsg_ran/WGI_RL1/TSGR1_98/Docs/R1-1909522.zip [Retrieved on Sep. 3, 2019] pp. 5,9.
Qualcomm Incorporated: "PUCCH Coverage Enhancements", 3GPP Draft, R1-2101480, 3GPP TSG-RAN WG1 Meeting #104-e, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021 (Jan. 19, 2021), XP051971645, 4 pages, Retrieved from the Internet: URL: https://ftp.3gpp.org/tsg_ran/WG1_RL1/TSGR1_104-e/Docs/R1-2101480.zip R1-2101480 PUCCH coverage enhancements.docx [retrieved on Jan. 19, 2021] section 3, p. 2-p. 3.
Spreadtrum Communications: "Considerations on PUCCH Coverage Enhancement", 3GPP Draft, 3GPP TSG RAN WG1#104-e, R1-2100798, 3rd Generation Partnership Project (3GPP), Mobile Competence Centre, 650, Route Des Lucioles, F-06921 Sophia-Antipolis Cedex, France, vol. RAN WG1, No. E-Meeting, Jan. 25, 2021-Feb. 5, 2021, Jan. 18, 2021 (Jan. 18, 2021), XP051970535, 4 Pages, Retrieved from the Internet: URL: https://ftp.3gpp.org/tsg_ran/WG1_RL1/TSGR1_104-e/Docs/R1-2100798.zip R1-2100798.docx [Retrieved on Jan. 18, 2021] p. 2-p. 3.
Apple Inc: "PUCCH Coverage Enhancements", 3GPP Draft, 3GPP TSG RAN WG1 #104-e, R1-2101398, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 18, 2021 (Jan. 18, 2021), XP051971565, pp. 1-3, Retrieved from the Internet: URL: https://ftp.3gpp.org/tsg_ran/WG1_RL1/TSGR1_104-e/Docs/R1-2101398.zip R1-2101398.docx [retrieved on Jan. 18, 2021] Paragraph [02.2].
CATT: "Discussion on PUCCH Enhancements", 3GPP Draft, 3GPP TSG RAN WG1 #105-e, R1-2104540, 3rd Generation Partnership Project (3GPP), Mobile Competence Centre, 650, Route Des Lucioles, F-06921 Sophia-Antipolis Cedex, France, vol. RAN WG1, No. e-Meeting, May 19, 2021-May 27, 2021 May 12, 2021 (May 12, 2021), XP052010863, 5 Pages, Retrieved from the Internet: URL: https://ftp.3gpp.org/tsg_ran/WG1_RL1/TSGR1_105-e/Docs/R1-2104540.zip R1-2104540.docx [retrieved on May 12, 2021] p. 1-p. 3.
Partial International Search Report—PCT/US2022/070323—ISA/EPO—Apr. 8, 2022.
Qualcomm Incorporated: "PUCCH Enhancements", 3GPP Draft, 3GPP TSG-RAN WG1 Meeting #105-e, R1-2104688, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021 May 12, 2021 (May 12, 2021), XP052010939, 9 Pages, Retrieved from the Internet: URL: https://ftp.3gpp.org/tsg_ran/WG1_RL1/TSGR1_105-e/Docs/R1-2104688.zip R1-2104688 PUCCH Coverage Enhancements.docx [retrieved on May 12, 2021] p. 2.

* cited by examiner

DETERMINING UPLINK CONTROL CHANNEL REPETITION FACTORS

CROSS REFERENCE

The present application for patent claims the benefit of U.S. Provisional Patent Application No. 63/143,020 by Taherzadeh Bouroujeni et al., entitled "INDICATIONS OF UPLINK CONTROL CHANNEL REPETITION FACTORS BASED ON AGGREGATION LEVELS," filed Jan. 28, 2021, U.S. Provisional Patent Application No. 63/141,275 by Taherzadeh Bouroujeni et al., entitled "DETERMINING PHYSICAL UPLINK CONTROL CHANNEL REPETITION FACTORS BASED AT LEAST IN PART ON BANDWIDTH PART SWITCHING," filed Jan. 25, 2021, and U.S. Provisional Patent Application No. 63/141,436 by Taherzadeh Bouroujeni et al., entitled "PUCCH REPETITION FACTOR INDICATION," filed Jan. 25, 2021, each of which is assigned to the assignee hereof, and each of which is expressly incorporated in its entirety by reference herein.

FIELD OF TECHNOLOGY

The following relates to wireless communications, including determining control channel repetition factors.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, UEs may transmit one or more repetitions of an uplink message (e.g., an uplink control message).

SUMMARY

The described techniques relate to improved methods, systems, devices, and apparatuses that support determining control channel repetition factors. Generally, a base station may implicitly indicate a physical uplink control channel (PUCCH) repetition factor for a user equipment (UE) to use on a next PUCCH via the selection of an aggregation level for the preceding physical downlink control channel (PDCCH). For example, the base station may configure relationships between PUCCH repetition factors and aggregation levels. To determine which PUCCH repetition factor the UE should use, the base station may select the corresponding aggregation level, and may transmit a downlink control message (e.g., a downlink control information (DCI) message) on a PDCCH using the selected aggregation level that corresponds to the desired PUCCH repetition factor. In some cases, applying the indicated correspondence between aggregation levels and PUCCH repetition factors may be based on one or more rules being satisfied (e.g., the relationship between PUCCH repetition factors and aggregation levels is only valid if one or more conditions are satisfied). The UE may use the indicated PUCCH repetition factor for only a next PUCCH transmission (e.g., an acknowledgement (ACK) or negative acknowledgement (NACK) message for a downlink transmission indicated in the received DCI), for all PUCCH transmissions until a next DCI indicates a new PUCCH repetition factor, or for all PUCCH transmissions for the duration of a timer.

A method for wireless communications at a user equipment (UE) is described. The method may include receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel, receiving, from the base station on the downlink control channel, a downlink control information message using a first aggregation level of the one or more aggregation levels, selecting, based on the first aggregation level, a first repetition factor that is indicated by the first aggregation level of the downlink control information message by the correspondence between the one or more aggregation levels for the downlink control channel and the one or more repetition factors for the uplink control channel, and transmitting, to the base station on the uplink control channel, repetitions of an uplink control message according to the selected first repetition factor and repetitions of one or more subsequent uplink control messages on the uplink control channel according to the first repetition factor.

An apparatus for wireless communications at a UE is described. The apparatus may include a processor, memory coupled with the processor, and instructions stored in the memory. The instructions may be executable by the processor to cause the apparatus to receive, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel, receive, from the base station on the downlink control channel, a downlink control information message using a first aggregation level of the one or more aggregation levels, select, based on the first aggregation level, a first repetition factor that is indicated by the first aggregation level of the downlink control information message by the correspondence between the one or more aggregation levels for the downlink control channel and the one or more repetition factors for the uplink control channel, and transmit, to the base station on the uplink control channel, repetitions of an uplink control message according to the selected first repetition factor and repetitions of one or more subsequent uplink control messages on the uplink control channel according to the first repetition factor.

Another apparatus for wireless communications at a UE is described. The apparatus may include means for receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel, means for receiving, from the base station on the downlink control channel, a downlink control information message using a first aggregation level of the one or more aggregation levels, means for selecting, based on the first aggregation level, a first repetition factor that is indicated by the first aggregation level of the downlink control information message by the correspondence between the one or more aggregation levels for the downlink control channel and the one or more repetition factors for the uplink control channel, and means for transmitting, to the base station on the uplink control channel, repetitions of an uplink control message according to the selected first repetition factor and repetitions of one or more subsequent uplink control messages on the uplink control channel according to the first repetition factor.

A non-transitory computer-readable medium storing code for wireless communications at a UE is described. The code may include instructions executable by a processor to receive, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel, receive, from the base station on the downlink control channel, a downlink control information message using a first aggregation level of the one or more aggregation levels, select, based on the first aggregation level, a first repetition factor that is indicated by the first aggregation level of the downlink control information message by the correspondence between the one or more aggregation levels for the downlink control channel and the one or more repetition factors for the uplink control channel, and transmit, to the base station on the uplink control channel, repetitions of an uplink control message according to the selected first repetition factor and repetitions of one or more subsequent uplink control messages on the uplink control channel according to the first repetition factor.

Some examples of the method, apparatuses, and non-transitory computer-readable medium described herein may further include operations, features, means, or instructions for receiving, from the base station after transmitting repetitions of the one or more subsequent uplink control messages, a second downlink control information message using a second aggregation level of the one or more aggregation levels and transmitting, to the base station, repetitions of one or more additional uplink control messages according to a second repetition factor indicated by the second aggregation level of the second downlink control information message according to the correspondence between the one or more aggregation levels for the downlink control channel and the one or more repetition factors for the uplink control channel.

In some examples of the method, apparatuses, and non-transitory computer-readable medium described herein, receiving the configuration information may include operations, features, means, or instructions for receiving an indication of a control resource set configuration for the uplink control channel, the control resource set configuration including the configuration information indicating the correspondence between the one or more aggregation levels for the downlink control channel and the one or more repetition factors for the uplink control channel.

In some examples of the method, apparatuses, and non-transitory computer-readable medium described herein, receiving the configuration information may include operations, features, means, or instructions for receiving an indication of a search space configuration for the downlink control channel, the search space configuration including the configuration information indicating the correspondence between the one or more aggregation levels for the downlink control channel and the one or more repetition factors for the uplink control channel.

Some examples of the method, apparatuses, and non-transitory computer-readable medium described herein may further include operations, features, means, or instructions for determining whether one or more parameter values for the uplink control channel satisfy one or more rules and applying the correspondence between the one or more aggregation levels for the downlink control channel and the one or more repetition factors for the uplink control channel to the repetitions of the uplink control message based on the determining, where the transmitting of the repetitions of the uplink control message according to the first repetition factor may be based on the applying.

In some examples of the method, apparatuses, and non-transitory computer-readable medium described herein, the one or more parameter values for the uplink control channel include an identifier of a resource set for the uplink control channel, a size of an uplink control information message for transmission on the uplink control channel, a format for the uplink control channel, contents of the uplink control information message, or any combination thereof.

Some examples of the method, apparatuses, and non-transitory computer-readable medium described herein may further include operations, features, means, or instructions for receiving, in the configuration information, an indication of the one or more rules.

Some examples of the method, apparatuses, and non-transitory computer-readable medium described herein may further include operations, features, means, or instructions for determining whether one or more parameter values for the downlink control channel satisfy one or more rules and applying the correspondence between the one or more aggregation levels for the downlink control channel and the one or more repetition factors for the uplink control channel to the repetitions of the uplink control message based on the determining, where the transmitting of the repetitions of the uplink control message according to the first repetition factor may be based on the applying.

In some examples of the method, apparatuses, and non-transitory computer-readable medium described herein, the one or more parameter values for the downlink control channel include a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

Some examples of the method, apparatuses, and non-transitory computer-readable medium described herein may further include operations, features, means, or instructions for receiving, in the configuration information, an indication of the one or more rules.

A method for wireless communications at a UE is described. The method may include receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel, receiving, from the base station on the downlink control channel, a downlink control information message using a first aggregation level of the one or more aggregation levels, selecting, based on the first aggregation level, a first repetition factor that is indicated by the first aggregation level of the downlink control information message by the correspondence between the one or more aggregation levels for the downlink control channel and the one or more repetition factors for the uplink control channel, initiating a timer based on the receiving of the downlink control information message, and transmitting, to the base station on the uplink control channel, repetitions of an uplink control message and one or more uplink control messages according to the first repetition factor for a duration of the timer.

An apparatus for wireless communications at a UE is described. The apparatus may include a processor, memory coupled with the processor, and instructions stored in the memory. The instructions may be executable by the processor to cause the apparatus to receive, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel, receive, from the base station on the downlink control channel, a downlink control information message using a first aggregation level of the one or more aggregation levels, select, based on the first aggregation level, a first repetition factor that is indicated by the first aggregation level of the downlink control information message by the correspondence between the one or more aggregation levels for the downlink control channel and the one or more repetition factors for the uplink control channel, initiate a timer based on the receiving of the downlink control information message, and transmit, to the base station on the uplink control channel, repetitions of an uplink control message and one or more uplink control messages according to the first repetition factor for a duration of the timer.

Another apparatus for wireless communications at a UE is described. The apparatus may include means for receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel, means for receiving, from the base station on the downlink control channel, a downlink control information message using a first aggregation level of the one or more aggregation levels, means for selecting, based on the first aggregation level, a first repetition factor that is indicated by the first aggregation level of the downlink control information message by the correspondence between the one or more aggregation levels for the downlink control channel and the one or more repetition factors for the uplink control channel, means for initiating a timer based on the receiving of the downlink control information message, and means for transmitting, to the base station on the uplink control channel, repetitions of an uplink control message and one or more uplink control messages according to the first repetition factor for a duration of the timer.

A non-transitory computer-readable medium storing code for wireless communications at a UE is described. The code may include instructions executable by a processor to receive, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel, receive, from the base station on the downlink control channel, a downlink control information message using a first aggregation level of the one or more aggregation levels, select, based on the first aggregation level, a first repetition factor that is indicated by the first aggregation level of the downlink control information message by the correspondence between the one or more aggregation levels for the downlink control channel and the one or more repetition factors for the uplink control channel, initiate a timer based on the receiving of the downlink control information message, and transmit, to the base station on the uplink control channel, repetitions of an uplink control message and one or more uplink control messages according to the first repetition factor for a duration of the timer.

Some examples of the method, apparatuses, and non-transitory computer-readable medium described herein may further include operations, features, means, or instructions for transmitting, upon expiration of the timer, repetitions of one or more additional uplink control messages according to a second repetition factor.

In some examples of the method, apparatuses, and non-transitory computer-readable medium described herein, receiving the configuration information may include operations, features, means, or instructions for receiving an indication of a control resource set configuration for the uplink control channel, the control resource set configuration including the configuration information indicating the correspondence between the one or more aggregation levels for the downlink control channel and the one or more repetition factors for the uplink control channel.

In some examples of the method, apparatuses, and non-transitory computer-readable medium described herein, receiving the configuration information may include operations, features, means, or instructions for receiving an indication of a search space configuration for the downlink control channel, the search space configuration including the configuration information indicating the correspondence between the one or more aggregation levels for the downlink control channel and the one or more repetition factors for the uplink control channel.

Some examples of the method, apparatuses, and non-transitory computer-readable medium described herein may further include operations, features, means, or instructions for determining whether one or more parameter values for the uplink control channel satisfy one or more rules and applying the correspondence between the one or more aggregation levels for the downlink control channel and the one or more repetition factors for the uplink control channel to the repetitions of the uplink control message based on the determining, where the transmitting of the repetitions of the uplink control message according to the first repetition factor may be based on the applying.

In some examples of the method, apparatuses, and non-transitory computer-readable medium described herein, the one or more parameter values for the uplink control channel include an identifier of a resource set for the uplink control channel, a size of an uplink control information message for transmission on the uplink control channel, a format for the uplink control channel, contents of the uplink control information message, or any combination thereof.

Some examples of the method, apparatuses, and non-transitory computer-readable medium described herein may further include operations, features, means, or instructions for receiving, in the configuration information, an indication of the one or more rules.

Some examples of the method, apparatuses, and non-transitory computer-readable medium described herein may further include operations, features, means, or instructions for determining whether one or more parameter values for the downlink control channel satisfy one or more rules and applying the correspondence between the one or more aggregation levels for the downlink control channel and the one or more repetition factors for the uplink control channel to the repetitions of the uplink control message based on the determining, where the transmitting of the repetitions of the uplink control message according to the first repetition factor may be based on the applying.

In some examples of the method, apparatuses, and non-transitory computer-readable medium described herein, the one or more parameter values for the downlink control channel include a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

Some examples of the method, apparatuses, and non-transitory computer-readable medium described herein may further include operations, features, means, or instructions for receiving, in the configuration information, an indication of the one or more rules.

A method for wireless communications at a base station is described. The method may include transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel, transmitting, to the UE on the downlink control channel, a downlink control information message using a first aggregation level of the one or more aggregation levels, and receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel.

An apparatus for wireless communications at a base station is described. The apparatus may include a processor, memory coupled with the processor, and instructions stored in the memory. The instructions may be executable by the processor to cause the apparatus to transmit, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel, transmit, to the UE on the downlink control channel, a downlink control information message using a first aggregation level of the one or more aggregation levels, and receive, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel.

Another apparatus for wireless communications at a base station is described. The apparatus may include means for transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel, means for transmitting, to the UE on the downlink control channel, a downlink control information message using a first aggregation level of the one or more aggregation levels, and means for receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel.

A non-transitory computer-readable medium storing code for wireless communications at a base station is described. The code may include instructions executable by a processor to transmit, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel, transmit, to the UE on the downlink control channel, a downlink control information message using a first aggregation level of the one or more aggregation levels, and receive, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel.

Some examples of the method, apparatuses, and non-transitory computer-readable medium described herein may further include operations, features, means, or instructions for transmitting, to the UE after receiving repetitions of the one or more subsequent uplink control messages, a second downlink control information message using a second aggregation level of the one or more aggregation levels and receiving, from the UE, repetitions of one or more additional uplink control messages according to a second repetition factor indicated by the second aggregation level of the second downlink control information message according to the correspondence between the one or more aggregation levels for the downlink control channel and the one or more repetition factors for the uplink control channel.

In some examples of the method, apparatuses, and non-transitory computer-readable medium described herein, transmitting the configuration information may include operations, features, means, or instructions for transmitting an indication of a control resource set configuration for the uplink control channel, the control resource set configuration including the configuration information indicating the correspondence between the one or more aggregation levels for the downlink control channel and the one or more repetition factors for the uplink control channel.

In some examples of the method, apparatuses, and non-transitory computer-readable medium described herein, transmitting the configuration information may include operations, features, means, or instructions for transmitting an indication of a search space configuration for the downlink control channel, the search space configuration including the configuration information indicating the correspondence between the one or more aggregation levels for the downlink control channel and the one or more repetition factors for the uplink control channel.

Some examples of the method, apparatuses, and non-transitory computer-readable medium described herein may further include operations, features, means, or instructions for identifying the first repetition factor of the one or more repetition factors for receiving the repetitions of the uplink control message and selecting, from the one or more aggregation levels, the first aggregation level that may be associated with the first repetition factor according to the correspondence, where the transmitting of the downlink control information message using the first aggregation level may be based on the selecting.

Some examples of the method, apparatuses, and non-transitory computer-readable medium described herein may further include operations, features, means, or instructions for determining a channel quality metric for the uplink control channel, where the identifying of the first repetition factor may be based on the channel quality metric.

Some examples of the method, apparatuses, and non-transitory computer-readable medium described herein may further include operations, features, means, or instructions for transmitting, to the UE in the configuration information, an indication of one or more rules instructing the UE to apply the correspondence to the repetitions of the uplink control message if one or more parameter values for the uplink control channel satisfy the one or more rules.

In some examples of the method, apparatuses, and non-transitory computer-readable medium described herein, the one or more parameter values for the uplink control channel include an identifier of a resource set for the uplink control channel, a size of an uplink control information message for transmission on the uplink control channel, a format for the uplink control channel, contents of the uplink control information message, or any combination thereof.

Some examples of the method, apparatuses, and non-transitory computer-readable medium described herein may further include operations, features, means, or instructions for transmitting, to the UE in the configuration information, an indication of one or more rules instructing the UE to apply the correspondence to the repetitions of the uplink control message if one or more parameter values for the downlink control channel satisfy the one or more rules.

In some examples of the method, apparatuses, and non-transitory computer-readable medium described herein, the one or more parameter values for the downlink control channel include a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

A method for wireless communications at a base station is described. The method may include transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel, transmitting, to the UE on the downlink control channel, a downlink control information message using a first aggregation level of the one or more aggregation levels, receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel, initiating a timer based on the receiving of the downlink control information message, and receiving repetitions of uplink control messages according to the first repetition factor for a duration of the timer.

An apparatus for wireless communications at a base station is described. The apparatus may include a processor, memory coupled with the processor, and instructions stored in the memory. The instructions may be executable by the processor to cause the apparatus to transmit, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel, transmit, to the UE on the downlink control channel, a downlink control information message using a first aggregation level of the one or more aggregation levels, receive, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel, initiate a timer based on the receiving of the downlink control information message, and receive repetitions of uplink control messages according to the first repetition factor for a duration of the timer.

Another apparatus for wireless communications at a base station is described. The apparatus may include means for transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel, means for transmitting, to the UE on the downlink control channel, a downlink control information message using a first aggregation level of the one or more aggregation levels, means for receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel, means for initiating a timer based on the receiving of the downlink control information message, and means for receiving repetitions of uplink control messages according to the first repetition factor for a duration of the timer.

A non-transitory computer-readable medium storing code for wireless communications at a base station is described. The code may include instructions executable by a processor to transmit, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel, transmit, to the UE on the downlink control channel, a downlink control information message using a first aggregation level of the one or more aggregation levels, receive, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel, initiate a timer based on the receiving of the downlink control information message, and receive repetitions of uplink control messages according to the first repetition factor for a duration of the timer.

Some examples of the method, apparatuses, and non-transitory computer-readable medium described herein may further include operations, features, means, or instructions for receiving, upon expiration of the timer, repetitions of one or more additional uplink control messages according to a second repetition factor.

Some examples of the method, apparatuses, and non-transitory computer-readable medium described herein may further include operations, features, means, or instructions for transmitting, to the UE after receiving repetitions of the one or more subsequent uplink control messages, a second downlink control information message using a second aggregation level of the one or more aggregation levels and receiving, from the UE, repetitions of one or more additional uplink control messages according to a second repetition factor indicated by the second aggregation level of the second downlink control information message according to the correspondence between the one or more aggregation levels for the downlink control channel and the one or more repetition factors for the uplink control channel.

In some examples of the method, apparatuses, and non-transitory computer-readable medium described herein, transmitting the configuration information may include operations, features, means, or instructions for transmitting an indication of a control resource set configuration for the uplink control channel, the control resource set configuration including the configuration information indicating the correspondence between the one or more aggregation levels for the downlink control channel and the one or more repetition factors for the uplink control channel.

In some examples of the method, apparatuses, and non-transitory computer-readable medium described herein, transmitting the configuration information may include operations, features, means, or instructions for transmitting an indication of a search space configuration for the downlink control channel, the search space configuration including the configuration information indicating the correspondence between the one or more aggregation levels for the downlink control channel and the one or more repetition factors for the uplink control channel.

Some examples of the method, apparatuses, and non-transitory computer-readable medium described herein may further include operations, features, means, or instructions for identifying the first repetition factor of the one or more repetition factors for receiving the repetitions of the uplink control message and selecting, from the one or more aggregation levels, the first aggregation level that may be associated with the first repetition factor according to the correspondence, where the transmitting of the downlink control information message using the first aggregation level may be based on the selecting.

Some examples of the method, apparatuses, and non-transitory computer-readable medium described herein may further include operations, features, means, or instructions for determining a channel quality metric for the uplink control channel, where the identifying of the first repetition factor may be based on the channel quality metric.

Some examples of the method, apparatuses, and non-transitory computer-readable medium described herein may further include operations, features, means, or instructions for transmitting, to the UE in the configuration information, an indication of one or more rules instructing the UE to apply the correspondence to the repetitions of the uplink control message if one or more parameter values for the uplink control channel satisfy the one or more rules.

In some examples of the method, apparatuses, and non-transitory computer-readable medium described herein, the one or more parameter values for the uplink control channel include an identifier of a resource set for the uplink control channel, a size of an uplink control information message for transmission on the uplink control channel, a format for the uplink control channel, contents of the uplink control information message, or any combination thereof.

Some examples of the method, apparatuses, and non-transitory computer-readable medium described herein may further include operations, features, means, or instructions for transmitting, to the UE in the configuration information, an indication of one or more rules instructing the UE to apply the correspondence to the repetitions of the uplink control message if one or more parameter values for the downlink control channel satisfy the one or more rules.

In some examples of the method, apparatuses, and non-transitory computer-readable medium described herein, the one or more parameter values for the downlink control channel include a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

A method for wireless communications at a UE is described. The method may include receiving, from a base station, DCI that includes an indication for the UE to switch to a bandwidth part (BWP), determining a (PUCCH repetition factor based on an association between the BWP indicated in the DCI and the PUCCH repetition factor, and transmitting, to the base station, a PUCCH based on the PUCCH repetition factor.

An apparatus for wireless communications at a UE is described. The apparatus may include a processor, memory coupled with the processor, and instructions stored in the memory. The instructions may be executable by the processor to cause the apparatus to receive, from a base station, DCI that includes an indication for the UE to switch to a BWP, determine a PUCCH repetition factor based on an association between the BWP indicated in the DCI and the PUCCH repetition factor, and transmit, to the base station, a PUCCH based on the PUCCH repetition factor.

Another apparatus for wireless communications at a UE is described. The apparatus may include means for receiving, from a base station, DCI that includes an indication for the UE to switch to a BWP, means for determining a PUCCH repetition factor based on an association between the BWP indicated in the DCI and the PUCCH repetition factor, and means for transmitting, to the base station, a PUCCH based on the PUCCH repetition factor.

A non-transitory computer-readable medium storing code for wireless communications at a UE is described. The code may include instructions executable by a processor to receive, from a base station, DCI that includes an indication for the UE to switch to a BWP, determine a PUCCH repetition factor based on an association between the BWP indicated in the DCI and the PUCCH repetition factor, and transmit, to the base station, a PUCCH based on the PUCCH repetition factor.

Some examples of the method, apparatuses, and non-transitory computer-readable medium described herein may further include operations, features, means, or instructions for receiving, from the base station, a semi-static configuration via radio resource control signaling that indicates the association between the BWP and the PUCCH repetition factor and where determining the PUCCH repetition factor includes determining the PUCCH repetition factor based on the semi-static configuration.

In some examples of the method, apparatuses, and non-transitory computer-readable medium described herein, the semi-static configuration may be a PUCCH resource set configuration.

In some examples of the method, apparatuses, and non-transitory computer-readable medium described herein, the semi-static configuration indicates one or more associations between possible BWPs and corresponding PUCCH repetition factors.

In some examples of the method, apparatuses, and non-transitory computer-readable medium described herein, the association between the BWP and the PUCCH repetition factor may be based on a PUCCH resource set.

In some examples of the method, apparatuses, and non-transitory computer-readable medium described herein, the association between the BWP and the PUCCH repetition factor may be based on a PUCCH format.

In some examples of the method, apparatuses, and non-transitory computer-readable medium described herein, the association between the BWP and the PUCCH repetition factor may be based on an uplink control information size.

In some examples of the method, apparatuses, and non-transitory computer-readable medium described herein, the association between the BWP and the PUCCH repetition factor may be based on uplink control information content.

In some examples of the method, apparatuses, and non-transitory computer-readable medium described herein, the BWP may be an uplink BWP.

In some examples of the method, apparatuses, and non-transitory computer-readable medium described herein, the BWP may be a downlink BWP.

Some examples of the method, apparatuses, and non-transitory computer-readable medium described herein may further include operations, features, means, or instructions for receiving, from the base station, a downlink media access control control element that indicates one or more updated associations between possible BWPs and corresponding PUCCH repetition factors.

Some examples of the method, apparatuses, and non-transitory computer-readable medium described herein may further include operations, features, means, or instructions for receiving, from the base station, a second DCI that indicates one or more updated associations between possible BWPs and corresponding PUCCH repetition factors.

A method for wireless communications at a base station is described. The method may include transmitting, to a UE, DCI that includes an indication for the UE to switch to a BWP and receiving, from the UE, a PUCCH in accordance with a PUCCH repetition factor that is based on an association with the BWP indicated in the DCI.

An apparatus for wireless communications at a base station is described. The apparatus may include a processor, memory coupled with the processor, and instructions stored in the memory. The instructions may be executable by the processor to cause the apparatus to transmit, to a UE, DCI that includes an indication for the UE to switch to a BWP and receive, from the UE, a PUCCH in accordance with a PUCCH repetition factor that is based on an association with the BWP indicated in the DCI.

Another apparatus for wireless communications at a base station is described. The apparatus may include means for transmitting, to a UE, DCI that includes an indication for the UE to switch to a BWP and means for receiving, from the UE, a PUCCH in accordance with a PUCCH repetition factor that is based on an association with the BWP indicated in the DCI.

A non-transitory computer-readable medium storing code for wireless communications at a base station is described. The code may include instructions executable by a processor to transmit, to a UE, DCI that includes an indication for the UE to switch to a BWP and receive, from the UE, a PUCCH in accordance with a PUCCH repetition factor that is based on an association with the BWP indicated in the DCI.

Some examples of the method, apparatuses, and non-transitory computer-readable medium described herein may further include operations, features, means, or instructions for transmitting, to the UE, a semi-static configuration via radio resource control signaling that indicates the association between the BWP and the PUCCH repetition factor.

In some examples of the method, apparatuses, and non-transitory computer-readable medium described herein, the semi-static configuration may be a PUCCH resource set configuration.

In some examples of the method, apparatuses, and non-transitory computer-readable medium described herein, the semi-static configuration indicates one or more associations between possible BWPs and corresponding PUCCH repetition factors.

In some examples of the method, apparatuses, and non-transitory computer-readable medium described herein, the association between the BWP and the PUCCH repetition factor may be based on a PUCCH resource set.

In some examples of the method, apparatuses, and non-transitory computer-readable medium described herein, the association between the BWP and the PUCCH repetition factor may be based on a PUCCH format.

In some examples of the method, apparatuses, and non-transitory computer-readable medium described herein, the association between the BWP and the PUCCH repetition factor may be based on an uplink control information size.

In some examples of the method, apparatuses, and non-transitory computer-readable medium described herein, the association between the BWP and the PUCCH repetition factor may be based on uplink control information content.

In some examples of the method, apparatuses, and non-transitory computer-readable medium described herein, the BWP may be an uplink BWP.

In some examples of the method, apparatuses, and non-transitory computer-readable medium described herein, the BWP may be a downlink BWP.

Some examples of the method, apparatuses, and non-transitory computer-readable medium described herein may further include operations, features, means, or instructions for transmitting, to the UE, a downlink media access control control element that indicates one or more updated associations between possible BWPs and corresponding PUCCH repetition factors.

Some examples of the method, apparatuses, and non-transitory computer-readable medium described herein may further include operations, features, means, or instructions for transmitting, to the UE, a second DCI that indicates one or more updated associations between possible BWPs and corresponding PUCCH repetition factors.

A method for wireless communications at a UE is described. The method may include receiving signaling indicating a first repetition factor index, the UE being configured with information that maps, for each of a set of multiple repetition factor indexes, each of a set of multiple sets of transmission parameters to a corresponding quantity of PUCCH repetitions and using a first quantity of PUCCH repetitions, for a first PUCCH transmission, based on the information mapping a combination of the first repetition factor index and a first set of transmission parameters associated with the first PUCCH transmission to the first quantity of PUCCH repetitions.

An apparatus for wireless communications at a UE is described. The apparatus may include a processor, memory coupled with the processor, and instructions stored in the memory. The instructions may be executable by the processor to cause the apparatus to receive signaling indicating a first repetition factor index, the UE being configured with information that maps, for each of a set of multiple repetition factor indexes, each of a set of multiple sets of transmission parameters to a corresponding quantity of PUCCH repetitions and used a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Another apparatus for wireless communications at a UE is described. The apparatus may include means for receiving signaling indicating a first repetition factor index, the UE being configured with information that maps, for each of a set of multiple repetition factor indexes, each of a set of multiple sets of transmission parameters to a corresponding quantity of PUCCH repetitions and means for using a first quantity of PUCCH repetitions, for a first PUCCH transmission, based on the information mapping a combination of the first repetition factor index and a first set of transmission parameters associated with the first PUCCH transmission to the first quantity of PUCCH repetitions.

A non-transitory computer-readable medium storing code for wireless communications at a UE is described. The code may include instructions executable by a processor to receive signaling indicating a first repetition factor index, the UE being configured with information that maps, for each of a set of multiple repetition factor indexes, each of a set of multiple sets of transmission parameters to a corresponding quantity of PUCCH repetitions and used a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Some examples of the method, apparatuses, and non-transitory computer-readable medium described herein may further include operations, features, means, or instructions for receiving signaling configuring the UE with the information via radio resource control (RRC) signaling.

Some examples of the method, apparatuses, and non-transitory computer-readable medium described herein may further include operations, features, means, or instructions for using a second quantity of PUCCH repetitions, for a second PUCCH transmission, based on the information mapping a combination of the first repetition factor index and a second set of transmission parameters associated with the second PUCCH transmission to the second quantity of PUCCH repetitions.

In some examples of the method, apparatuses, and non-transitory computer-readable medium described herein, the information maps a combination of a second repetition factor index and the first set of transmission parameters to a second quantity of PUCCH repetitions.

Some examples of the method, apparatuses, and non-transitory computer-readable medium described herein may further include operations, features, means, or instructions for receiving the signaling indicating the first repetition factor index includes receiving DCI signaling indicating the first repetition factor index.

Some examples of the method, apparatuses, and non-transitory computer-readable medium described herein may further include operations, features, means, or instructions for receiving the signaling indicating the first repetition factor index includes receiving downlink medium access control (MAC) control element (MAC-CE) signaling indicating the first repetition factor index.

In some examples of the method, apparatuses, and non-transitory computer-readable medium described herein, the first set of transmission parameters may be associated with the first PUCCH transmission based on the first set of transmission parameters being associated with a physical downlink shared channel (PDSCH) transmission associated with the first PUCCH transmission.

In some examples of the method, apparatuses, and non-transitory computer-readable medium described herein, the first set of transmission parameters includes a transmit beam.

In some examples of the method, apparatuses, and non-transitory computer-readable medium described herein, the first set of transmission parameters includes a bandwidth part.

In some examples of the method, apparatuses, and non-transitory computer-readable medium described herein, the first set of transmission parameters includes a content of the PUCCH transmission or an PDSCH associated with the first PUCCH transmission.

In some examples of the method, apparatuses, and non-transitory computer-readable medium described herein, the first set of transmission parameters includes a semi-persistent scheduling (SPS) transmission associated with the first PUCCH transmission.

Some examples of the method, apparatuses, and non-transitory computer-readable medium described herein may further include operations, features, means, or instructions for receiving signaling indicating a third quantity of PUCCH repetitions may be associated with the second set of transmission parameters and using the third quantity of PUCCH repetitions instead of the second quantity of PUCCH repetitions for a second PUCCH transmission associated with the second set of transmission parameters.

A method for wireless communications at a UE is described. The method may include receiving signaling indicating a first quantity of PUCCH repetitions is associated with a first set of transmission parameters and using the first quantity of PUCCH repetitions for a first PUCCH transmission associated with the first set of transmission parameters.

An apparatus for wireless communications at a UE is described. The apparatus may include a processor, memory coupled with the processor, and instructions stored in the memory. The instructions may be executable by the processor to cause the apparatus to receive signaling indicating a first quantity of PUCCH repetitions is associated with a first set of transmission parameters and used the first quantity of PUCCH repetitions for a first PUCCH transmission associated with the first set of transmission parameters.

Another apparatus for wireless communications at a UE is described. The apparatus may include means for receiving signaling indicating a first quantity of PUCCH repetitions is associated with a first set of transmission parameters and means for using the first quantity of PUCCH repetitions for a first PUCCH transmission associated with the first set of transmission parameters.

A non-transitory computer-readable medium storing code for wireless communications at a UE is described. The code may include instructions executable by a processor to receive signaling indicating a first quantity of PUCCH repetitions is associated with a first set of transmission parameters and used the first quantity of PUCCH repetitions for a first PUCCH transmission associated with the first set of transmission parameters.

Some examples of the method, apparatuses, and non-transitory computer-readable medium described herein may further include operations, features, means, or instructions for receiving signaling indicating a second quantity of PUCCH repetitions may be associated with the set of transmission parameters and using the second quantity of PUCCH repetitions for a second PUCCH transmission associated with the first set of transmission parameters.

Some examples of the method, apparatuses, and non-transitory computer-readable medium described herein may further include operations, features, means, or instructions for receiving signaling indicating the first quantity of PUCCH repetitions may be associated with a second set of transmission parameters and using the first quantity of PUCCH repetitions for a second PUCCH transmission associated with the second set of transmission parameters.

In some examples of the method, apparatuses, and non-transitory computer-readable medium described herein, receiving the signaling indicating the first quantity of PUCCH repetitions may be associated with a first set of transmission parameters may include operations, features, means, or instructions for receiving DCI signaling.

In some examples of the method, apparatuses, and non-transitory computer-readable medium described herein, receiving the signaling indicating the first quantity of PUCCH repetitions may be associated with a first set of transmission parameters may include operations, features, means, or instructions for receiving downlink medium access control (MAC) control element (MAC-CE) signaling.

In some examples of the method, apparatuses, and non-transitory computer-readable medium described herein, the first set of transmission parameters may be associated with the first PUCCH transmission based on the first set of transmission parameters being associated with an PDSCH transmission associated with the first PUCCH transmission.

In some examples of the method, apparatuses, and non-transitory computer-readable medium described herein, the first set of transmission parameters includes a transmit beam.

In some examples of the method, apparatuses, and non-transitory computer-readable medium described herein, the first set of transmission parameters includes a bandwidth part.

In some examples of the method, apparatuses, and non-transitory computer-readable medium described herein, the first set of transmission parameters includes a content of the PUCCH transmission or an PDSCH associated with the first PUCCH transmission.

In some examples of the method, apparatuses, and non-transitory computer-readable medium described herein, the first set of transmission parameters includes a semi-persistent scheduling (SPS) transmission associated with the first PUCCH transmission.

A method for wireless communications at a base station is described. The method may include sending a UE signaling indicating a first repetition factor index, the base station being configured with information that maps, for each of a set of multiple repetition factor indexes, each of a set of multiple sets of transmission parameters to a corresponding quantity of PUCCH repetitions and monitoring for a first quantity of PUCCH repetitions, for a first PUCCH transmission, based on the information mapping a combination of the first repetition factor index and a first set of transmission parameters associated with the first PUCCH transmission to the first quantity of PUCCH repetitions.

An apparatus for wireless communications at a base station is described. The apparatus may include a processor, memory coupled with the processor, and instructions stored in the memory. The instructions may be executable by the processor to cause the apparatus to send a UE signaling indicating a first repetition factor index, the base station being configured with information that maps, for each of a set of multiple repetition factor indexes, each of a set of multiple sets of transmission parameters to a corresponding quantity of PUCCH repetitions and monitor for a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Another apparatus for wireless communications at a base station is described. The apparatus may include means for sending a UE signaling indicating a first repetition factor index, the base station being configured with information that maps, for each of a set of multiple repetition factor indexes, each of a set of multiple sets of transmission parameters to a corresponding quantity of PUCCH repetitions and means for monitoring for a first quantity of PUCCH repetitions, for a first PUCCH transmission, based on the information mapping a combination of the first repetition factor index and a first set of transmission parameters associated with the first PUCCH transmission to the first quantity of PUCCH repetitions.

A non-transitory computer-readable medium storing code for wireless communications at a base station is described. The code may include instructions executable by a processor to send a UE signaling indicating a first repetition factor index, the base station being configured with information that maps, for each of a set of multiple repetition factor indexes, each of a set of multiple sets of transmission parameters to a corresponding quantity of PUCCH repetitions and monitor for a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Some examples of the method, apparatuses, and non-transitory computer-readable medium described herein may further include operations, features, means, or instructions for sending signaling configuring the UE with the information via RRC signaling.

Some examples of the method, apparatuses, and non-transitory computer-readable medium described herein may further include operations, features, means, or instructions for monitoring a second quantity of PUCCH repetitions, for a second PUCCH transmission, based on the information mapping a combination of the first repetition factor index and a second set of transmission parameters associated with the second PUCCH transmission to the second quantity of PUCCH repetitions.

In some examples of the method, apparatuses, and non-transitory computer-readable medium described herein, the information maps a combination of a second repetition factor index and the first set of transmission parameters to a second quantity of PUCCH repetitions.

Some examples of the method, apparatuses, and non-transitory computer-readable medium described herein may further include operations, features, means, or instructions for sending the signaling indicating the first repetition factor index includes sending DCI signaling indicating the first repetition factor index.

Some examples of the method, apparatuses, and non-transitory computer-readable medium described herein may further include operations, features, means, or instructions for sending the signaling indicating the first repetition factor index includes sending downlink medium access control (MAC) control element (MAC-CE) signaling indicating the first repetition factor index.

In some examples of the method, apparatuses, and non-transitory computer-readable medium described herein, the first set of transmission parameters may be associated with the first PUCCH transmission based on the first set of transmission parameters being associated with an PDSCH transmission associated with the first PUCCH transmission.

In some examples of the method, apparatuses, and non-transitory computer-readable medium described herein, the first set of transmission parameters includes a transmit beam.

In some examples of the method, apparatuses, and non-transitory computer-readable medium described herein, the first set of transmission parameters includes a bandwidth part.

In some examples of the method, apparatuses, and non-transitory computer-readable medium described herein, the first set of transmission parameters includes a content of the PUCCH transmission or an PDSCH associated with the first PUCCH transmission.

In some examples of the method, apparatuses, and non-transitory computer-readable medium described herein, the first set of transmission parameters includes a semi-persistent scheduling (SPS) transmission associated with the first PUCCH transmission.

Some examples of the method, apparatuses, and non-transitory computer-readable medium described herein may further include operations, features, means, or instructions for sending signaling indicating a third quantity of PUCCH repetitions may be associated with the second set of transmission parameters and monitoring the third quantity of PUCCH repetitions instead of the second quantity of PUCCH repetitions for a second PUCCH transmission associated with the second set of transmission parameters.

A method for wireless communications at a base station is described. The method may include sending a UE signaling indicating a first quantity of PUCCH repetitions is associated with a first set of transmission parameters and monitoring for the first quantity of PUCCH repetitions for a first PUCCH transmission associated with the first set of transmission parameters.

An apparatus for wireless communications at a base station is described. The apparatus may include a processor, memory coupled with the processor, and instructions stored in the memory. The instructions may be executable by the processor to cause the apparatus to send a UE signaling indicating a first quantity of PUCCH repetitions is associated with a first set of transmission parameters and monitor for the first quantity of PUCCH repetitions for a first PUCCH transmission associated with the first set of transmission parameters.

Another apparatus for wireless communications at a base station is described. The apparatus may include means for sending a UE signaling indicating a first quantity of PUCCH repetitions is associated with a first set of transmission parameters and means for monitoring for the first quantity of PUCCH repetitions for a first PUCCH transmission associated with the first set of transmission parameters.

A non-transitory computer-readable medium storing code for wireless communications at a base station is described. The code may include instructions executable by a processor to send a UE signaling indicating a first quantity of PUCCH repetitions is associated with a first set of transmission parameters and monitor for the first quantity of PUCCH repetitions for a first PUCCH transmission associated with the first set of transmission parameters.

Some examples of the method, apparatuses, and non-transitory computer-readable medium described herein may further include operations, features, means, or instructions for sending signaling indicating a second quantity of PUCCH repetitions may be associated with the set of transmission parameters and monitoring the second quantity of PUCCH repetitions for a second PUCCH transmission associated with the first set of transmission parameters.

Some examples of the method, apparatuses, and non-transitory computer-readable medium described herein may further include operations, features, means, or instructions for sending signaling indicating the first quantity of PUCCH repetitions may be associated with a second set of transmission parameters and monitoring the first quantity of PUCCH repetitions for a second PUCCH transmission associated with the second set of transmission parameters.

In some examples of the method, apparatuses, and non-transitory computer-readable medium described herein, sending the signaling indicating the first quantity of PUCCH repetitions may be associated with a first set of transmission parameters may include operations, features, means, or instructions for sending DCI signaling.

In some examples of the method, apparatuses, and non-transitory computer-readable medium described herein, sending the signaling indicating the first quantity of PUCCH repetitions may be associated with a first set of transmission parameters may include operations, features, means, or instructions for sending downlink medium access control (MAC) control element (MAC-CE) signaling.

In some examples of the method, apparatuses, and non-transitory computer-readable medium described herein, the first set of transmission parameters may be associated with the first PUCCH transmission based on the first set of transmission parameters being associated with an PDSCH transmission associated with the first PUCCH transmission.

In some examples of the method, apparatuses, and non-transitory computer-readable medium described herein, the first set of transmission parameters includes a transmit beam.

In some examples of the method, apparatuses, and non-transitory computer-readable medium described herein, the first set of transmission parameters includes a bandwidth part.

In some examples of the method, apparatuses, and non-transitory computer-readable medium described herein, the first set of transmission parameters includes a content of the PUCCH transmission or an PDSCH associated with the first PUCCH transmission.

In some examples of the method, apparatuses, and non-transitory computer-readable medium described herein, the first set of transmission parameters includes a semi-persistent scheduling (SPS) transmission associated with the first PUCCH transmission.

DETAILED DESCRIPTION

Figure 1:
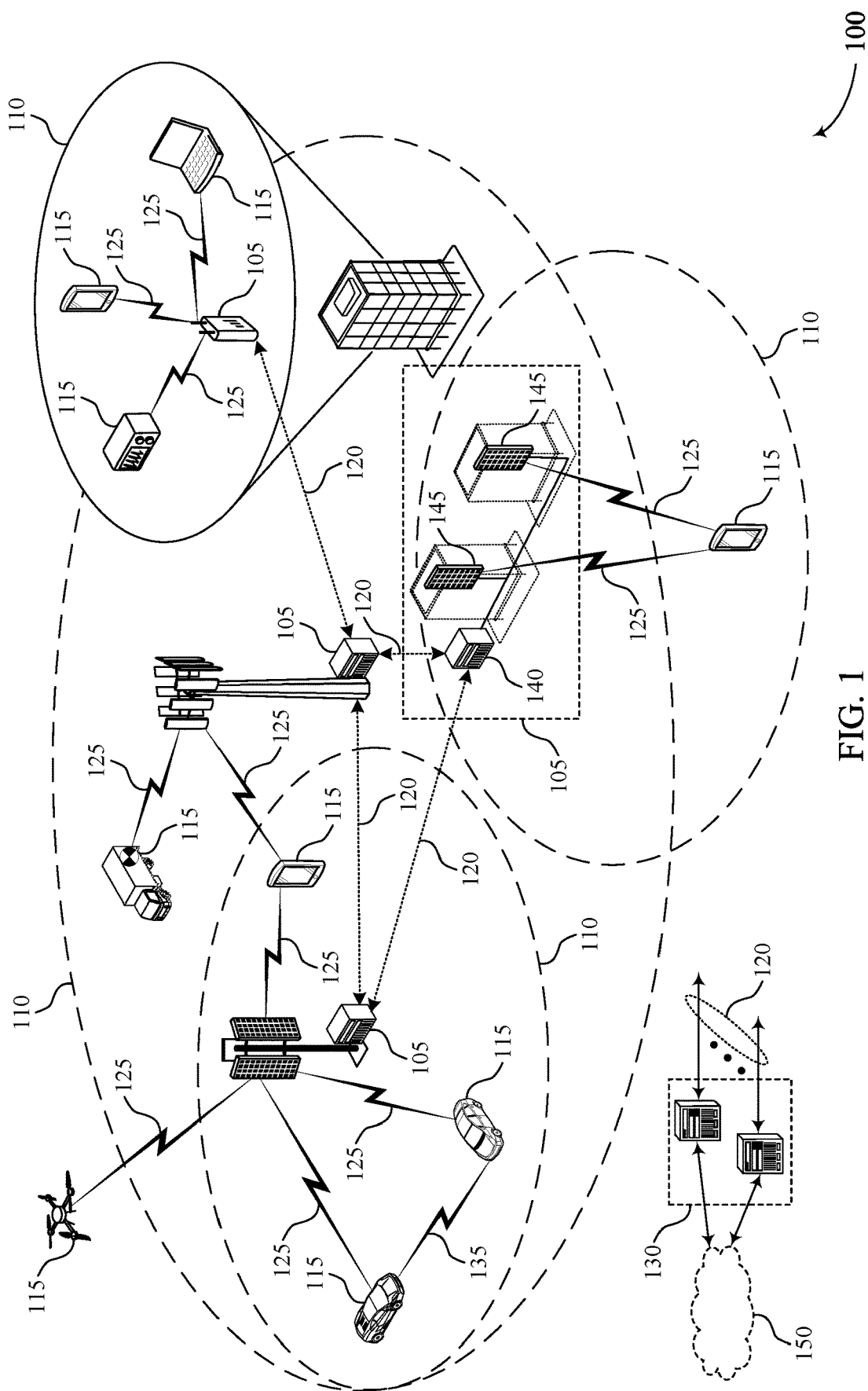
FIG. 1 illustrates an example of a wireless communications system that supports determining uplink control channel repetition factors in accordance with aspects of the present disclosure.

Some examples of a wireless communications systems may support repetitions of uplink transmissions. A wireless communications system (e.g., a 5G system) may rely on physical uplink control channel (PUCCH) repetition (e.g., transmitting uplink control messages multiple times) for coverage enhancement. For example, a user equipment (UE) may transmit one or more repetitions of an uplink control message on a PUCCH within a slot or across multiple slots. Some techniques may provide a mechanism for a base station to individually configure a UE to perform PUCCH repetition for each configured uplink control message, which may result in additional signaling for each configured uplink control message. However, such techniques may rely on an increased size of existing signaling, or new signaling, which may result in increased latency, increased signaling overhead, or the like. Some techniques may provide a mechanism for the base station to dynamically signal for the UE to use a preconfigured PUCCH coverage enhancement scheme. However, such techniques do not allow for a dynamic indication of a repetition factor (e.g., such as the PUCCH repetition count) for an individual uplink control message or a subset of uplink control messages, which may result in inefficient use of available resources, increased system latency, increased signaling overhead, or the like.

A base station may implicitly indicate a PUCCH repetition factor for a UE to use on a next PUCCH via the selection of an aggregation level for the preceding PDCCH. For example, the base station may configure relationships between PUCCH repetition factors and aggregation levels. To determine which PUCCH repetition factor the UE should use, the base station may select the corresponding aggregation level, and may transmit a downlink control message (e.g., a DCI message) on a physical downlink control channel (PDCCH) using the selected aggregation level that corresponds to the desired PUCCH repetition factor. In some cases, applying the indicated correspondence between aggregation levels and PUCCH repetition factors may be based on one or more rules being satisfied (e.g., the relationship between PUCCH repetition factors and aggregation levels is only valid if one or more conditions are satisfied). The UE may use the indicated PUCCH repetition factor for only a next PUCCH transmission (e.g., an ACK/NACK message for a downlink transmission indicated in the received DCI), for all PUCCH transmissions until a next DCI indicates a new PUCCH repetition factor, or for all PUCCH transmissions for the duration of a timer.

In some examples, a UE may receive, from a base station, DCI that includes an indication for the UE to switch to a BWP. The UE may determine a PUCCH repetition factor based at least in part on an association between the BWP indicated in the DCI and the PUCCH repetition factor. The UE may transmit, to the base station, a PUCCH based at least in part on the PUCCH repetition factor. Numerous other aspects are described.

In certain systems (e.g., Release 17 5G new radio systems), PUCCH may be enhanced using repetition of PUCCH transmissions. PUCCH repetition may involve repeating PUCCH transmissions in a quantity of consecutive transmission time intervals (TTIs). Aspects of the present disclose provide for dynamic indication of a PUCCH repetition factor. In some aspects, a single indication of a PUCCH repetition factor may be used, where the PUCCH repetition factor can have multiple different interpretations based on associated transmission parameters. In some examples, a user equipment (UE) may be configured with a set of repetition factor indexes. The repetition factor indexes can each be associated with mappings of repetition factors to transmission parameters. Thus, a base station (BS) can send a UE a repetition factor index. The UE can use the repetition factor index and the associated configured mapping to determine the repetition factor for PUCCH transmissions based on the associated transmission parameters. In some examples, the base station may dynamically send the UE a repetition factor, along with the associated transmission parameters for the repetition factor. Based on the repetition factor, the UE can send repetitions of PUCCH transmissions.

Aspects of the disclosure are initially described in the context of wireless communications systems. Aspects of the disclosure are further illustrated by and described with reference to wireless communications systems, process flows, and timelines. Aspects of the disclosure are further illustrated by and described with reference to apparatus diagrams, system diagrams, and flowcharts that relate to indications of uplink control channel repetition factor based on aggregation levels.

FIG. 1 illustrates an example of a wireless communications system 100 that supports determining control channel repetition factors in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may implicitly indicate a PUCCH repetition factor for a UE 115 to use on a next PUCCH via the selection of an aggregation level for the preceding PDCCH. For example, base station 105 may configure relationships between PUCCH repetition factors and aggregation levels. To determine which PUCCH repetition factor UE 115 should use, base station 105 may select the corresponding aggregation level, and may transmit a downlink control message (e.g., a DCI message) on a physical downlink control channel (PDCCH) using the selected aggregation level that corresponds to the desired PUCCH repetition factor. In some cases, applying the indicated correspondence between aggregation levels and PUCCH repetition factors may be based on one or more rules being satisfied (e.g., the relationship between PUCCH repetition factors and aggregation levels is only valid if one or more conditions are satisfied). UE 115 may use the indicated PUCCH repetition factor for only a next PUCCH transmission (e.g., an ACK/NACK message for a downlink transmission indicated in the received DCI), for all PUCCH transmissions until a next DCI indicates a new PUCCH repetition factor, or for all PUCCH transmissions for the duration of a timer.

Figure 2:
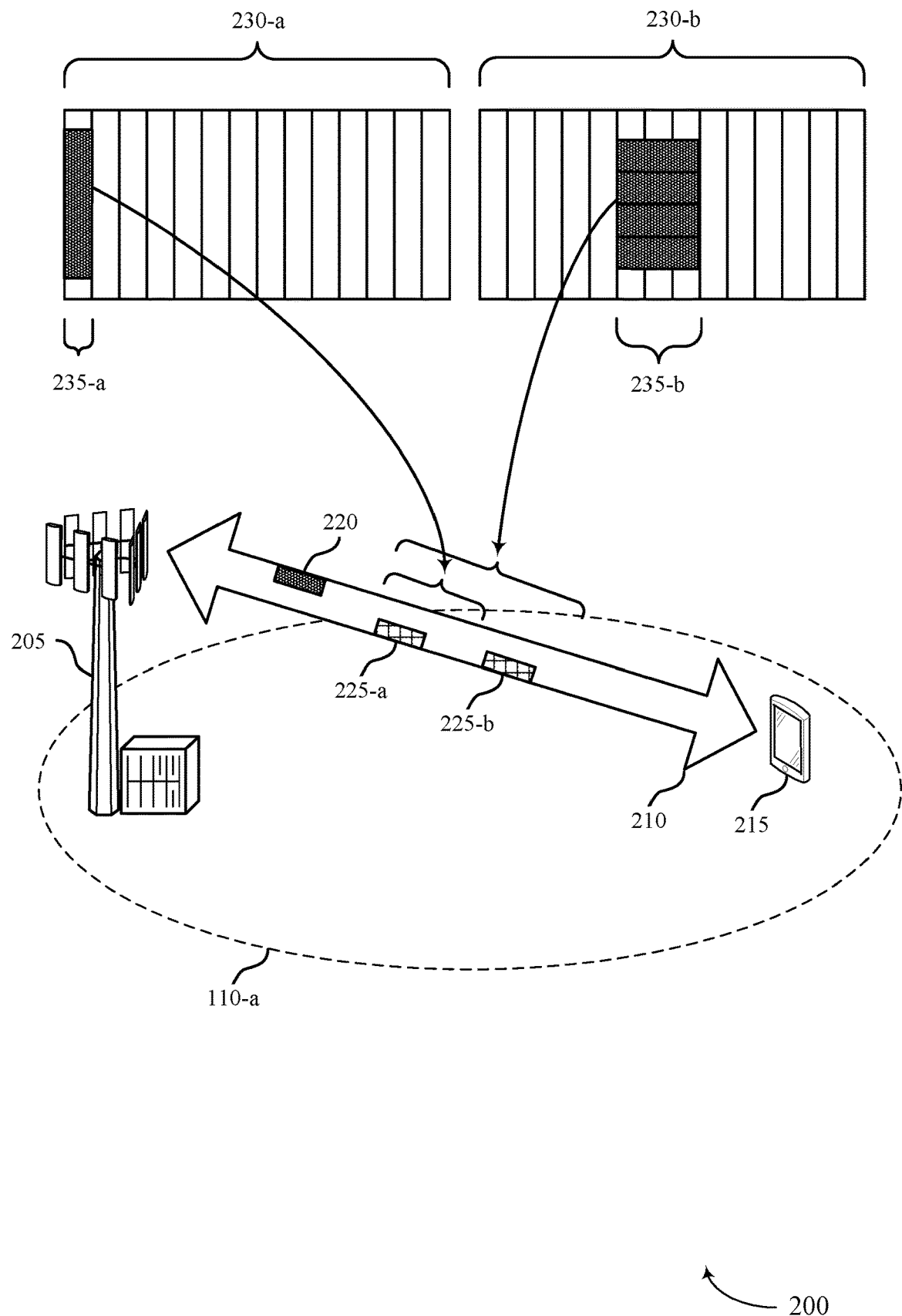
FIG. 2 illustrates an example of a wireless communications system that supports determining uplink control channel repetition factors in accordance with aspects of the present disclosure.

FIG. 2 illustrates an example of a wireless communications system 200 that supports indications of uplink control channel repetition factor based on aggregation levels in accordance with aspects of the present disclosure. Wireless communications system 200 may include a base station 205 and a UE 215, which may be examples of corresponding devices described with reference to FIG. 1. Base station 205 and UE 215 may be in communication with each other via a bidirectional communication link 210.

Base station 205 may transmit, and UE 215 may receive, a DCI message 220 on a PDCCH. UE 215 may perform blind decoding procedures on search spaces of one or more search space sets to receive the DCI message. For example, UE 215 may attempt to decode each PDCCH candidate of a set of PDCCH search candidates in a search space set and may determine whether a cyclic redundancy check (CRC) of each PDCCH candidate passes, indicating that decoding is correct. Base station 205 may configure UE 215 to perform the PDCCH blind decoding procedures. Blind decoding configuration information may include an indication of a quantity of PDCCH candidates per control channel element (CCE) aggregation level, DCI format and size for UE monitoring, a set of possible aggregation levels (e.g., 1, 2, 4, 8, 16, etc.), a set of DCI format sizes, or the like. An aggregation level may refer to a quantity of permitted CCEs for the PDCCH. In some examples, a base station may transmit downlink messages (e.g., DCI message 220) using a higher aggregation level to improve coverage (e.g., if channel quality is degraded or weak). Search space sets may be defined by one or more parameters, including a set of aggregation levels, a quantity of PDCCH candidates for each aggregation level, PDCCH monitoring occasions for the search space sets, or the like.

In some examples, wireless communications system 200 may support PUCCH repetition (e.g., transmitting uplink control messages multiple times) for coverage enhancement. In such examples, a user equipment (UE) may transmit one or more repetitions of an uplink control message 225 on a PUCCH within a slot or across multiple slots. For instance, UE 215 may transmit uplink control message 225-a, and may subsequently transmit a repetition of the uplink control message 225-b (e.g., an uplink control message having the same content as uplink control message 225-a). This may be referred to as a transmission of uplink control message 225-a and a first repetition of uplink control message 225-b, or as first repetition of the uplink control message 225-a and second repetition of the uplink control message 225-b (e.g., two repetitions of an uplink control message 225). Base station 205 may receive the first repetition of uplink control message 225-a, the second repetition of uplink control message 225-b, or both. If base station 205 fails to receive one of the repetitions, it may successfully receive another repetition of the uplink control message. Or, if base station 205 only partially decodes each repetition, it may combine the results of multiple decoding procedures to successfully receive and decode the uplink control message. Thus, PUCCH repetition may result in improved coverage, decreased system latency, and improved communications with UE 215.

UE 215 may transmit multiple repetitions of uplink control messages according to a repetition factor (e.g., a repetition count indicating a quantity of repetitions of the uplink control message UE 215 is to transmit). Base station 205 may dynamically configure a repetition factor for each uplink control message 225. However, such techniques may result in additional signaling for each configured uplink control message 225 (e.g., for each uplink control message 225, base station 205 may transmit a downlink message indicating a repetition factor for the uplink control message 225). Such signaling may create additional overhead, unnecessarily utilize computation resources for UE 215, increase system latency, and inefficiently utilize available PDCCH resources. In some examples, base station 205 may dynamically signal for the UE to use a preconfigured PUCCH coverage enhancement scheme. However, such techniques do not allow for a dynamic indication of a repetition factor (e.g., such as the PUCCH repetition count) for an individual uplink control message or a subset of uplink control messages, which may result in inefficient use of available resources, increased system latency, increased signaling overhead, or the like.

Base station 205 may implicitly indicate a PUCCH repetition factor for UE 215 to use on a next PUCCH transmission via the selection of an aggregation level for a preceding PDCCH transmission. For example, base station 205 may configure relationships between PUCCH repetition factors and aggregation levels at UE 215. To determine which PUCCH repetition factor UE 215 should use, base station 205 may select the corresponding aggregation level, and may transmit a DCI message on a PDCCH using the selected aggregation level that corresponds to the desired PUCCH repetition factor.

In some examples, base station may provide, to UE 215, configuration information including a correspondence between aggregation levels and repetition factors. The correspondence may indicate that, for example, an aggregation level of 1 or 2 corresponds to one repetition (e.g., a single instance of a PUCCH transmission), aggregation level of 4 corresponds to two repetitions, and an aggregation level of 8 or 16 corresponds to four repetitions. The correspondence information may be included in PUCCH configuration information, search space set configuration information, CORESET configuration information, or the like, as described in greater detail with reference to FIG. 3.

In one example, base station 205 may transmit DCI message 220 in a coreset 235-a in a transmission time interval (TTI) (e.g., slot) 230-a. Coreset 235-a may be a one-symbol coreset located in a first symbol of TTI 230-a. Coreset 235-a may include a single CCE including 6 resource element groups (REGs). Thus, according to this example, base station 205 may transmit DCI message 220 using an aggregation level 1. In such examples, UE 215 may receive the DCI message 220, and, based on the aggregation level 1 and the correspondence between aggregation level 1 and no repetition (e.g., a repetition factor of 0), UE 215 may transmit a single instance of uplink control message 225-a (e.g., may not apply PUCCH repetition to the transmission of uplink control message 225-a). In some examples, base station 205 may transmit DCI message 220 in a coreset 235-b in a TTI 230-b. Coreset 235-b may include 4 CCEs including 6 REGs each. Thus, base station 205 may transmit DCI message 220 using an aggregation level 4. In such examples, UE 215 may receive the DCI message 220, and, based on the aggregation level 4 and the correspondence between aggregation level 4 and 2 repetitions, may transmit two repetitions of uplink control message 225 (e.g., may transmit uplink control message 225-a and uplink control message 225-b). These examples of a correspondence are only illustrative, and the described techniques may be applied with any combination of correspondence between aggregation levels and repetition factors (e.g., any repetition factor could be configured to correspond to any aggregation level).

Thus, as described herein, base station 205 may implicitly indicate, by a selected aggregation level for DCI message 220, a repetition factor for use in PUCCH repetitions. Such techniques may allow for more dynamic selection and use of different PUCCH repetition factors, allow base station 205 to select appropriate repetition factors at different times and in different scenarios. For instance, when channel conditions are low, base station 205 may select a higher aggregation level corresponding to a higher repetition factor, which may increase the likelihood of DCI message 220 being received by UE 215, and the likelihood of uplink control message 225 being received by base station 205. Similarly, when channel conditions are high, base station 205 may select a lower aggregation level corresponding to a lower repetition factor, which may more efficiently utilize available resources without increasing the risk of failed downlink and uplink control signaling.

In some cases, applying the indicated correspondence between aggregation levels and PUCCH repetition factors may be based on one or more rules being satisfied. For examples, UE 215 may only consider the correspondence between aggregation levels and repetition factors to be valid if one or more parameters for the PUCCH satisfy one or more rules. In such examples, UE 215 may only apply the repetition factor indicated by an aggregation level when certain parameter values (e.g., a PUCCH resource set identifier, uplink control information (UCI) size, PUCCH format, UCI content, etc.) satisfy one or more rules. For instance, the correspondence between aggregation levels and repetition factor may be valid for UE-specific search spaces, but not for common search spaces (or vice versa), for some PUCCH formats by not for other PUCCH formats, for some UCI sizes, but not for other sizes, or the like. In some examples, UE 215 may only consider the correspondence between aggregation levels and repetition factors to be valid if one or more parameter values for the PDCCH satisfy one or more rules. In such examples, UE 215 may only apply the repetition factor indicated by an aggregation level when certain parameters values (e.g., DCI size, associated search space, associated CORESET, index of the PDCCH within a search space, a location of CCEs within the CORESET, index of a search space set for the PDCCH, or the like) satisfy one or more rules. For instance, the correspondence between aggregation levels and repetition factors may be valid for some DCI sizes, some DCI formats, some search spaces, some CORESETs, or the like. In some examples, base station 205 may transmit an indication of the one or more rules to UE 215, as described in greater detail with reference to FIG. 3.

The UE may use the indicated PUCCH repetition factor for only a next PUCCH transmission (e.g., an ACK/NACK message for a downlink transmission indicated in the received DCI message 220), for all PUCCH transmissions until a next DCI indicates a new PUCCH repetition factor, or for all PUCCH transmissions for the duration of a timer, as described in greater detail with reference to FIGS. 3 and 4.

Figure 3:
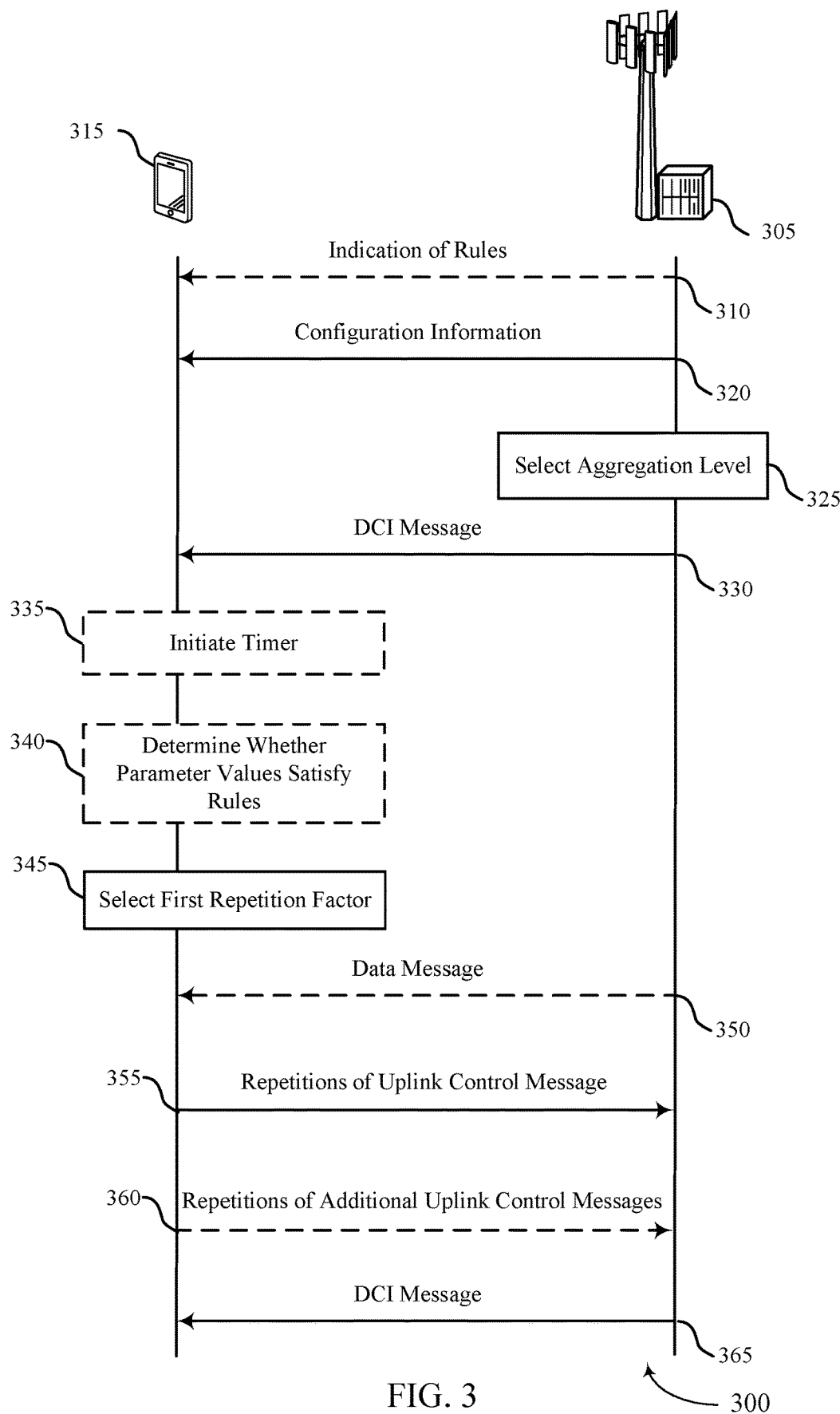
FIG. 3 illustrates an example of a process flow that supports determining uplink control channel repetition factors in accordance with aspects of the present disclosure.

FIG. 3 illustrates an example of a process flow 300 that supports indications of uplink control channel repetition factor based on aggregation levels in accordance with aspects of the present disclosure. Process flow 300 may include, or may be implemented by, base station 305 and UE 315, which may be examples of corresponding devices described with reference to FIG. 1 and FIG. 2.

At 320, base station 305 may transmit, and UE 315 may receive, configuration information. The configuration information may include an indication of a correspondence between one or more aggregation levels for a PDCCH and one or more repetition factors for a PUCCH. Each one of the one or more repetition factors may correspond to a repetition factor (e.g., a repetition count) for uplink control messages on the PUCCH. In some examples, base station 305 may include the indication of the correspondence in a PUCCH resource configuration message. In some examples, base station 305 may include the indication of the correspondence in a CORESET configuration message. In some examples, base station 305 may include the indication of the correspondence in a search space configuration message.

At 330, base station 305 may transmit, and UE 315 may receive, a DCI message. Base station 305 may transmit the DCI using a first aggregation level (e.g., 1, 2, 4, 8, 16, etc.). In some examples, at 325, base station 305 may select the aggregation level from a set of aggregation levels indicated in the configuration information at 320. Base station 305 may identify a repetition factor (from the set of repetition factors indicated in the configuration information at 320) for use by UE 315 in transmitting one or more pending or subsequent uplink control messages. In some examples, base station 305 may select the preferred repetition factor based on channel conditions, cell conditions, communication history with UE 315, or the like. Having identified the preferred repetition factor, base station 305 may select the aggregation level that corresponds with the preferred repetition factor, according to the correspondence indicated at 320. base station 305 may then transmit the DCI message at 330 using the selected aggregation level.

At 345, UE 315 may select a first repetition factor for use in PUCCH repetition. UE 315 may select the first repetition factor that is indicated by the first aggregation level used to transmit the DCI message at 330. For example, UE 315 may determine which repetition factor of the set of repetition factors corresponds with the aggregation level used to transmit the DCI message at 330, according to the correspondence indicated at 320. UE 315 may then select the determined repetition factor from the set of repetition factors, based on the identified aggregation level.

AT 355, UE 315 may transmit one or more repetitions of the uplink control message using the repetition factor (e.g., the repetition count) indicated by the aggregation level used at 330. For example, if the configuration information indicates that an aggregation level of sixteen corresponds to a repetition factor of four, and base station 305 transmits the DCI message at 330 using an aggregation level of sixteen, then UE 315 may transmit four repetitions of the uplink control message at 355. Similarly, if the configuration information indicates that an aggregation level of 8 corresponds to a repetition factor of two, and base station 305 transmits the DCI message at 330 using an aggregation level of eight, then UE 315 may transmit two repetitions of the uplink control message at 355.

In some examples, at 340, UE 315 may determine whether one or more parameter values for the PUCCH satisfy one or more rules. For example, the correspondence between aggregation levels and repetition factors indicated at 320 may only be valid if certain PUCCH parameter values satisfy one or more rules or conditions. If such rules are not satisfied (e.g., the parameter values for the PUCCH do not satisfy the rules), then UE 315 may refrain from applying the repetition factor indicated by the aggregation level to one or more subsequent transmissions on the PUCCH. The parameters may include a PUCCH resource set identifier (e.g., the correspondence may only be valid for some PUCCH resource sets), a UCI size (e.g., the correspondence may only be valid for some UCI sizes or within a threshold UCI size), a PUCCH format (e.g., the correspondence may only be valid for some PUCCH formats), control message content (e.g., the correspondence may only be valid for some control message contents), or the like. If the parameter values for the PUCCH satisfy the rules, then UE 315 may apply the repetition factor indicated by the aggregation level used at 330, and may transmit the appropriate quantity of repetitions of the uplink control message at 335. In some examples, base station 305 may transmit an indication of the one or more rules (e.g., the parameter values for which the correspondence is to be considered valid) to UE 315. Base station 305 may transmit an indication of the rules in a configuration message or higher layer signaling at 310, or may include the indication in the configuration information transmitted at 320, or any combination thereof.

In some examples, at 340, UE 315 may determine whether one or more parameter values for the PDCCH on which the DCI message is received satisfy one or more rules. For example, the correspondence between aggregation levels and repetition factors indicated at 320 may only be valid if certain PDCCH parameter values satisfy one or more rules or conditions. If such rules are not satisfied (e.g., the parameter values for the PDCCH do not satisfy the rules), then UE 315 may refrain from applying the repetition factor indicated by the aggregation level to one or more subsequent transmissions on the PUCCH. The parameters may include a DCI size (e.g., the correspondence may only be valid for some DCI sizes or DCI sizes that satisfy a size threshold value), search space identifier associated with the PDCCH, (e.g., the correspondence may only be valid for some search space sets, or for some search space set types), a CORESET identifier associated with the PDCCH (e.g., the correspondence may only be valid for some CORESETs), or the like. In some examples, the parameter values may include an index or a location of a preceding PDCCH. In such examples, the index of the PDCCH may refer to an index among the PDCCH candidates of the search space, the index of the PDCCH candidates among PDCCH candidates that have the same aggregation level in that search space). In some examples, the parameter values may include a location of the PDCCH (e.g., a location of the CCEs in an associated CORESET). In some examples, the parameter values may include an index of the associated search space for the preceding PDCCH. If the parameter values for the PDCCH satisfy the rules, then UE 315 may apply the repetition factor indicated by the aggregation level used at 330, and may transmit the appropriate quantity of repetitions of the uplink control message at 355. In some examples, base station 305 may transmit an indication of the one or more rules (e.g., the parameter values for which the correspondence is to be considered valid) to UE 315. Base station 305 may transmit an indication of the rules in a configuration message or higher layer signaling at 310, or may include the indication in the configuration information transmitted at 320, or any combination thereof.

In some examples, UE 315 may apply the indicated repetition factor to a PUCCH transmission associated with a physical downlink shared channel (PDSCH) triggered by the DCI message. For example, the DCI message received at 330 may schedule a downlink message on a PDSCH, and PUCCH resources for transmitting feedback information associated with or responsive to the downlink message on the PDSCH (e.g., an acknowledgement (ACK) message or a negative acknowledgement (NACK) message). In such examples, at 350, base station 305 may transmit, and UE 315 may receive, the downlink message scheduled by the DCI message at 330. UE 315 may then transmit the feedback message (e.g., an ACK or NACK message) to base station 305 at 355 using the repetition factor indicated by the aggregation level used by base station 305 to transmit the DCI message at 330. In such examples, UE 315 may only use the indicated repetition factor for the feedback message. At 360, UE 315 may transmit repetitions or additional control messages using another repetition factor (e.g., a previously indicated repetition factor, a default repetition factor, or no repetition factor).

In some examples, UE 315 may apply the indicated repetition factor to all PUCCH transmissions subsequent to receiving the DCI message at 330 (e.g., until receiving a subsequent DCI message at 365). For example, at 355, UE 315 may transmit repetitions of an uplink control message (e.g., a feedback message associated with a data message received at 350) using the repetition factor indicated by the aggregation level used to transmit the DCI message at 330. At 360, UE 315 may transmit repetitions of additional uplink control messages (e.g., control messages associated with other downlink transmissions, periodic or semi-persistent uplink control messages not associated with the DCI message, etc.). UE 315 may continue to apply the repetition factor selected at 345 for a subset or all PUCCH transmissions until a subsequent repetition factor is indicated by base station 305. For example, at 365, base station 305 may transmit another DCI message (e.g., scheduling another downlink data message). For uplink control messages transmitted after receiving the DCI message at 365, UE 315 may apply the repetition factor indicated by the aggregation level used to transmit the DCI message at 365. Timelines associated with how long a UE 315 considers a repetition factor to be valid are described in greater detail with reference to FIG. 4.

In some examples, UE 315 may initiate a timer, and may apply the indicated repetition factor to all PUCCH transmissions that occur for the duration of the timer, for example until expiry of the timer. For example, UE 315 may initiate a timer at 335 (e.g., immediately upon or a fixed offset after receiving DCI message 330, or upon transmitting a first repetition of the uplink control message at 355). For the duration of the timer, UE 315 may transmit repetitions of all PUCCH transmissions using the repetition factor selected at 345. Upon expiration of the timer, UE 315 may refrain from using the repetition factor selected at 345 (e.g., may use a previously indicated repetition factor, a default repetition factor, or no repetition factor). Timelines associated with how long a UE 315 considers a repetition factor to be valid are described in greater detail with reference to FIG. 4.

Figure 4:
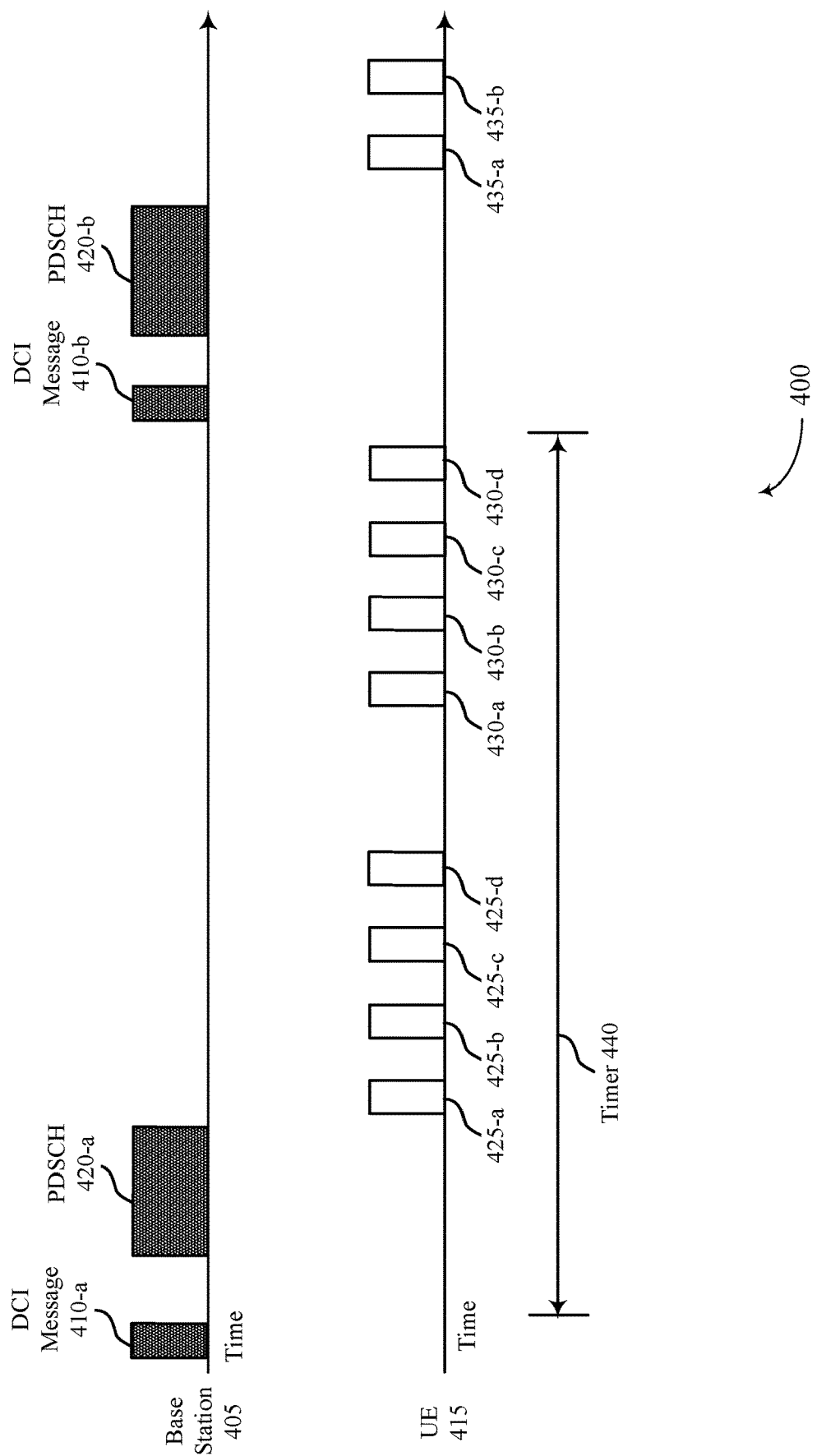
FIG. 4 illustrates an example of a timeline that supports determining uplink control channel repetition factors in accordance with aspects of the present disclosure.

FIG. 4 illustrates an example of a timeline 400 that supports indications of uplink control channel repetition factor based on aggregation levels in accordance with aspects of the present disclosure. Timeline 400 may include or be implemented by a UE 415 and a base station 405, which may be examples of corresponding devices described with reference to FIGS. 1-3.

In some examples, UE 415 may apply a repetition factor indicated by a first DCI message 410-*a* until UE 415 receives a second DCI message 410-*b*. For example, Base station 405 may transmit, and UE 415 may receive, DCI message 410-*a*. In some examples, DCI message 410-*a* may schedule a downlink data message on PDSCH 420. UE 415 may select a repetition factor based on an aggregation level used by base station 405 to transmit the DCI message 410-*a*. UE 415 may use the selected repetition factor for uplink control messages on the PUCCH until UE 415 receives a next DCI message 410-*b*. For instance, if the selected repetition factor is four, then UE 415 may transmit four repetitions 425 (e.g., repetition 425-*a*, repetition 425-*b*, repetition 425-*c*, and repetition 425-*d*) of the uplink control message (e.g., a feedback message associated with the data message received on PDSCH 420). In some examples, UE 415 may transmit one or more additional or subsequent uplink control messages. For example, UE 415 may transmit a periodic or semi-persistent uplink control message that is not associated with or scheduled by DCI message 410-*a*. In such examples, UE 415 may apply the same repetition factor (e.g., a repetition factor of four) to such an uplink control message. UE 415 may transmit four repetitions 430 of the periodic or semi-persistent uplink control message (e.g., repetition 430-*a*, repetition 430-*b*, repetition 430-*c*, and repetition 430-*d*).

Base station 405 may subsequently transmit, and UE 415 may receive, another DCI message 410-*b*. In some examples, DCI message 410-*b* may schedule a data transmission (e.g., a downlink data transmission on PDSCH 420-*b*). Base station 405 may transmit DCI message 410-*b* using a different aggregation level than it used to transmit DCI message 410-*a*. The different aggregation level may be associated with a different repetition factor (e.g., a repetition factor of two). Thus, subsequent to receiving DCI message 410-*b*, UE 415 may transmit repetitions of an uplink control message (e.g., a feedback message for the data message received on PDSCH 420-*b*) according to the new repetition factor indicated by the aggregation level for DCI message 410-*b*. In such examples, UE 415 may transmit two repetitions 435 (e.g., repetition 435-*a* and repetition 435-*b*) of the control message using the updated repetition factor as indicated by DCI message 410-*b*.

In some examples, UE 415 may initiate a timer 440 after receiving DCI message 410-*a*, and may apply a repetition factor indicated by a DCI message 410-*a* until the timer 440 expires. For example, base station 405 may transmit DCI message 410-*a* using an aggregation level associated with a repetition factor of four. After receiving DCI message 410-*a*, UE 415 may transmit four repetitions 425 of an uplink control message (e.g., a feedback message associated with a downlink data transmission on PDSCH 420-*a*). Additionally, UE 415 may transmit one or more additional uplink control messages (e.g., periodic control messages not associated with DCI message 410-*a*). If timer 440 has not yet expired, then UE 415 may transmit four repetitions 430 of the additional uplink control messages. When timer 440 expires, UE 445 may utilize another repetition factor (e.g., a preconfigured or previously indicated repetition factor, a default repetition factor, or no repetition factor), for subsequent uplink control messages.

Figure 5:
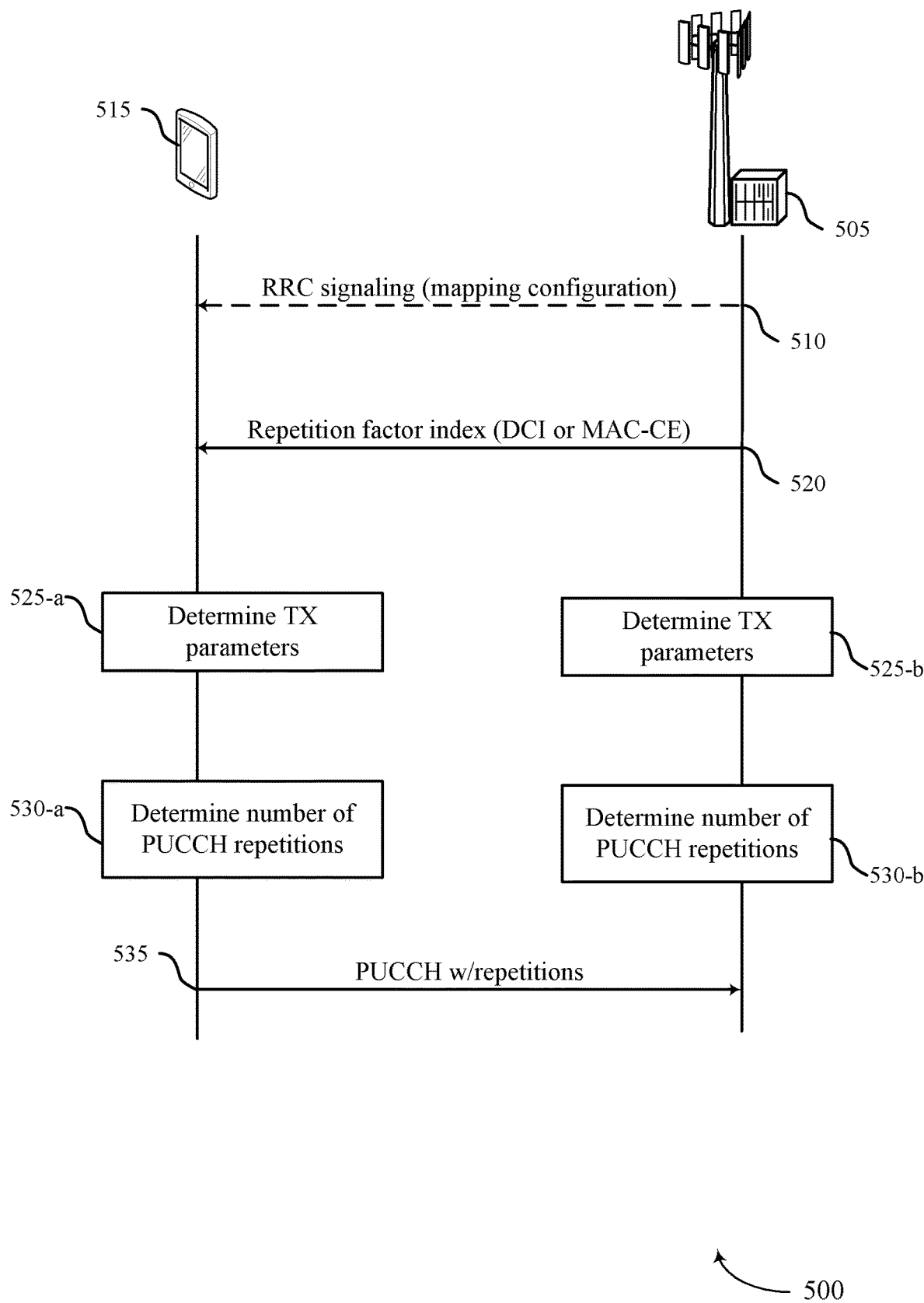
FIG. 5 illustrates an example of a process flow that supports determining uplink control channel repetition factors in accordance with aspects of the present disclosure.

FIG. 5 illustrates an example of a process flow 500 that supports determining uplink control channel repetition factors in accordance with aspects of the present disclosure. Process flow 500 may include a UE 515 and a base station 505. The UE 515 and the base station 505 may be examples of corresponding devices described with reference to FIGS. 1-4. The UE 515 may be configured with repetition factor indexes and associated mappings. For example, for each repetition factor index, the UE may be configured with a mapping of one or multiple sets of one or multiple transmission parameters to repetition factors (quantity of PUCCH repetition). The repetition factor indexes and/or mappings may be configured at the UE semi-statically via radio resource control (RRC) signaling, at 510. The repetition factor indexes and/or mappings may be preconfigured at the UE, such as hardcoded at the UE, and/or defined in the 3GPP technical standards.

A base station, such as a base station 505 in the wireless communication network 100 illustrated in FIG. 1 (which may be a gNB in 5G NR system), can send a single indication to the UE 515 of a repetition factor index, at 520. The base station 505 may send the indication of the repetition factor index via DCI. The base station 505 may send the indication of the repetition factor index via medium access control (MAC) control element (CE) signaling.

The repetition factor index may be valid for a specified, configured, or preconfigured duration. The repetition factor index may be valid until signaling is received deactivating the repetition factor index or indicating a new repetition factor index.

The UE 515 can use the indicated repetition factor index and the configured (or preconfigured) mapping associated with the repetition factor index to determine a quantity of repetitions to use for PUCCH transmission. For example, at 525-*a*, the UE 515 can determine the set of parameters associated with a PUCCH transmission. At 530-*a*, the UE 515 can determine the quantity of PUCCH repetitions to use for the PUCCH transmission based on the PUCCH repetition factors mapped to the determined set of parameters in the mapping associated with the indicated repetition factor index. The UE 515 may then send a PUCCH transmission, at 535, using the determined quantity of repetitions. Similarly, the base station 505 can determine the set of transmission parameters, at 525-*b*, and then determine the quantity of PUCCH repetitions, at 530-*b*, to monitor for the PUCCH transmission.

According to certain aspects, during the time that the PUCCH repetition factor index is valid. The UE 515 may use the associated mapping to determine to quantity of PUCCH repetitions for multiple PUCCH transmissions associated with different transmission parameters. Thus, with the same indicated PUCCH repetition factor index, the UE may send PUCCH transmissions using different quantities of repetitions. Later, the UE 515 may be indicated a different repetition factor index. Based on the different repetition factor index and the mapping associated with that repetition factor index, the UE 515 may determine a different quantity of PUCCH repetitions for a PUCCH transmissions using the same transmission parameters as a PUCCH transmission sent based on the earlier repetition factor index. Thus, the UE 515 interprets the repetition factor indication differently depending on the transmission parameters.

According to certain aspects, the transmission parameters may include the content of the PUCCH transmission.

According to certain aspects, the transmission parameters may include the content of a PDSCH transmission that is associated with the PUCCH. For example, the PDSCH for which the PUCCH carrier feedback, such as hybrid automatic repeat request (HARQ) acknowledgment (ACK)/negative acknowledgment (NACK) feedback.

According to certain aspects, the transmission parameters may include a beam. For example, the UE may determine the PUCCH repetition factor based on the transmit beam for the PUCCH transmission (or for the associated PDSCH) and a mapping of beams to repetition factors, in the mapping associated with an indicated repetition factor index.

According to certain aspects, the transmission parameters may include a BWP. For example, the UE may determine the PUCCH repetition factor based on the BWP for the PUCCH transmission (or for the associated PDSCH) and a mapping of BWPs to repetition factors, in the mapping associated with an indicated repetition factor index.

According to certain aspects, the transmission parameters may include a semi-persistent scheduling (SPS), such as an associated SPS resource or transmission. For example, the UE may determine the PUCCH repetition factor based on the SPS for the PUCCH transmission (or for the associated PDSCH) and a mapping of SPSs to repetition factors, in the mapping associated with an indicated repetition factor index. For example, different SPSs configured for the same UE may be configured with different sets of values for the PUCCH repetition factor and a single indication of PUCCH repetition factor may indicate an index which may refer to a different value for PUCCH associated with each SPS.

Figure 6:
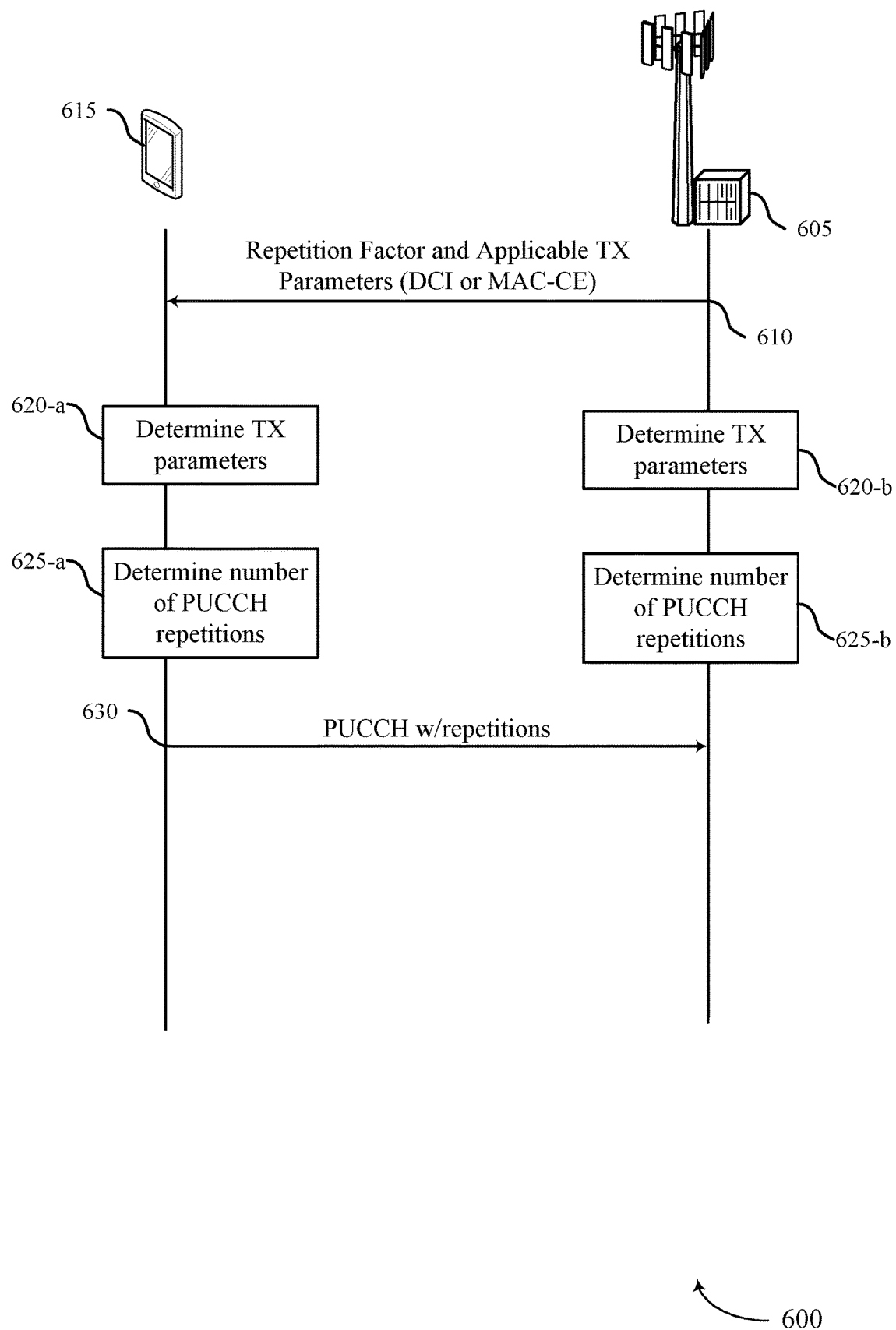
FIG. 6 illustrates an example of a process flow that supports determining uplink control channel repetition factors in accordance with aspects of the present disclosure.

FIG. 6 illustrates an example of a process flow 600 that supports determining uplink control channel repetition factors in accordance with aspects of the present disclosure. Process flow 600 may include a UE 615 and a base station 705, which may be examples of corresponding devices described with reference to FIGS. 1-5.

At 610, the UE 615 may receive an indication of a repetition factor (e.g., receives a repetition factor value) and an indication of the applicable set of transmission parameters (e.g., any of the transmission parameters discussed above). The indication at 610 may be received via DCI or MAC-CE signaling. At 620-*a* the UE 615 may determine the set of transmission parameters for a PUCCH transmission. At 620-*a*, for a set of transmission parameters indicated by dynamic indication, at 610, the UE 615 can determine the indicated repetition factor to use for the PUCCH transmission. The UE 615 may then send a PUCCH transmission, at 630, using the determined quantity of repetitions. Similarly, the base station 605 can determine the set of transmission parameters, at 620-*b*, and then determine the quantity of PUCCH repetitions, at 620-*b*, to monitor for the PUCCH transmission.

In an illustrative example, the signaling at 610 may indicate a quantity of PUCCH repetitions and an associated SPS whose PUCCH is affected by it (and/or a beam or BWP of the PUCCH or an associated PDSCH). When the UE sends a PUCCH transmission for an associated SPS, the UE sends the PUCCH using the quantity of repetitions dynamically indicated in the signaling for the SPS.

According to certain aspects, a dynamically signaled repetition factor for a set of transmission parameters may override a repetition factor indicated by a repetition factor index and mapping for the set of transmission parameters. In this case, for a PUCCH associated with the set of transmission parameters indicated with a dynamically signaled repetition factor, the UE uses the dynamically signaled repetition factor instead of the repetition factor mapped to the set of transmission parameters in the mapping associated with a repetition factor index received before the dynamic indication.

Figure 7:
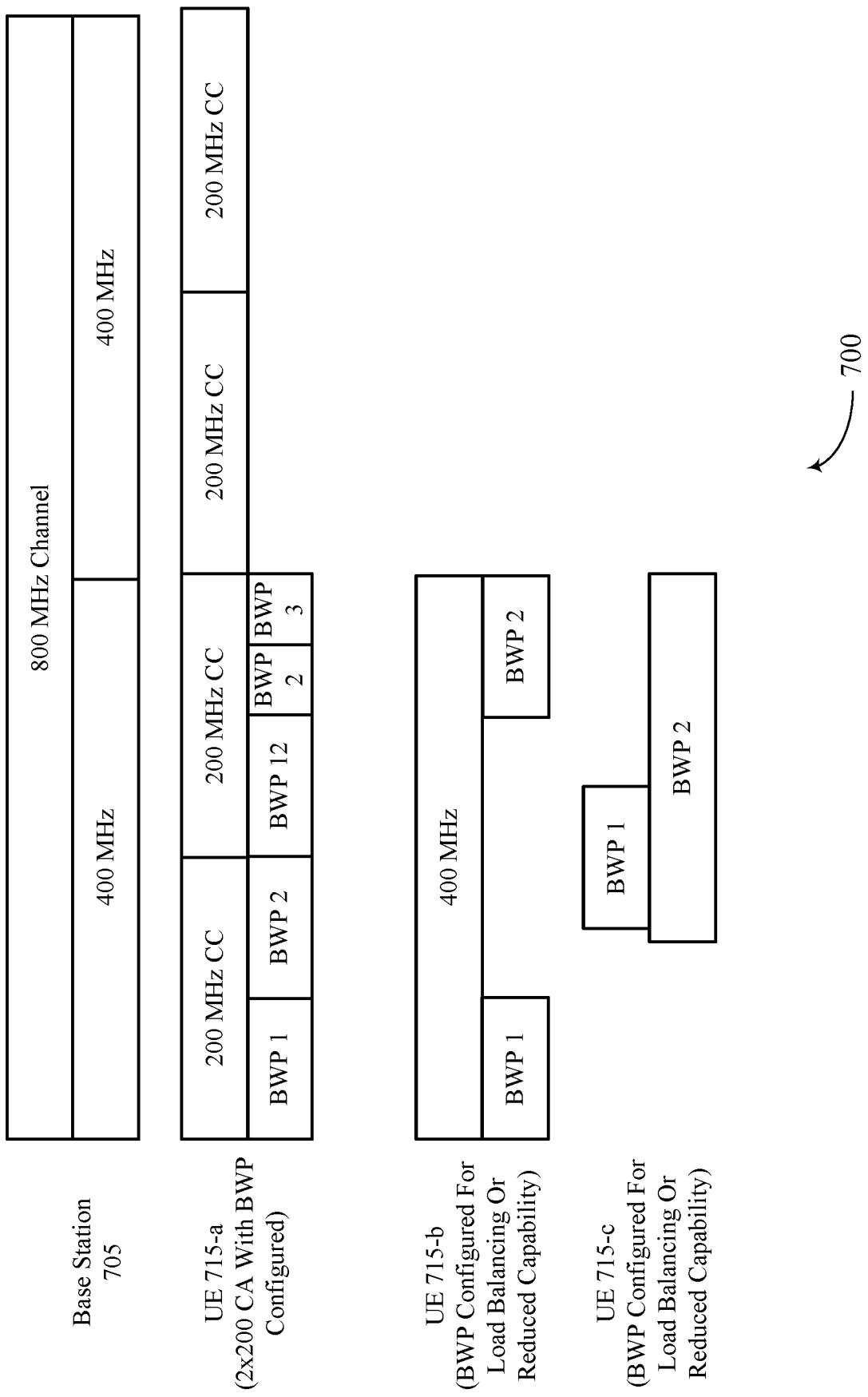
FIG. 7 illustrates an example of a bandwidth management scheme that supports determining uplink control channel repetition factors in accordance with aspects of the present disclosure.

FIG. 7 illustrates an example of a bandwidth management scheme that supports determining uplink control channel repetition factors in accordance with aspects of the present disclosure. In some examples, carrier aggregation within a wider channel may be supported. For example, a base station (e.g., base station 705) may operate simultaneously as a wideband component carrier for some UEs 715, and as a set of intra-band contiguous component carriers with carrier aggregation for other UEs. A same physical resource block (PRB) grid structure for a given numerology may be applied for narrowband UEs 715, carrier aggregation UEs 715, and wideband UEs 715 within a wideband NR carrier.

"Bandwidth part" (BWP) may refer to a portion of a bandwidth. For example, the bandwidth may be subdivided into multiple BWPs. BWPs may be useful for UEs having a reduced bandwidth capability. BWPs may be useful for load balancing within component carriers and UE power saving. BWPs may provide simultaneous support for mixed numerologies. Each BWP may be associated with a numerology, such that each BWP may be configured differently to enable more efficient use of the spectrum and more efficient use of power. For example, one BWP may have reduced energy requirements, while another BWP may support different functions or services, provide coexistence with other systems, etc.

As shown in FIG. 7, an 800 Mhz channel may be divided into two separate 400 MHz channels, such as a first 400 MHz channel and a second 400 MHz channel. The first 400 MHz channel may be associated with a first 200 MHz component carrier and a second 200 MHz component carrier. The second 400 MHz channel may be associated with a first 200 MHz component carrier and a second 200 MHz component carrier. As an example, a first UE 715 (e.g., UE 715-*a*) may be configured for carrier aggregation with two separate 200 MHz component carriers, which may each be divided into one or more BWPs. As another example, a second UE 715 (UE 715-*b*) may be configured with a 400 MHz component carrier, which may be divided into multiple BWPs for load balancing or a reduced UE capability. As yet another example, a third UE (UE 715-*c*) may be configured with multiple BWPs for power saving.

As indicated above, FIG. 7 is provided as an example. Other examples may differ from what is described with regard to FIG. 7.

An NR system may support a DCI-based dynamic switching of BWPs. For example, a single scheduling DCI may switch an active BWP of a UE 715 to another BWP within a given serving cell. In other words, the single scheduling DCI may cause the UE 715 to switch from a first BWP to a second BWP, where the second BWP may be of a same link direction as compared to the first BWP.

For a paired spectrum, downlink and uplink BWPs may be configured separately and independently for each UE-specific serving cell of the UE 715. For active BWP switching, DCI for downlink may be used for downlink active BWP switching and DCI for uplink may be used for uplink active BWP switching.

For an unpaired spectrum, a downlink BWP and an uplink BWP may be jointly configured as a pair. The downlink and uplink BWPs of a downlink/uplink BWP pair may share a same center frequency, but may be of different bandwidths for each UE-specific serving cell of the UE 715. For active BWP switching, DCI for either downlink or uplink may be used for active BWP switching from one downlink/uplink BWP pair to another downlink/uplink BWP pair. The DCI for either the downlink or the uplink may be applicable when both downlink and uplink are activated to a UE 715 in a corresponding unpaired spectrum.

A base station 705 may transmit an indication of a PUCCH repetition factor to a UE 715. The base station 705 may transmit the indication of the PUCCH repetition factor based at least in part on radio resource control (RRC) signaling or other suitable signaling. The UE 715 may use the PUCCH repetition factor to transmit a PUCCH to the base station 705. In other words, the UE 715 may transmit the PUCCH based at least in part on the PUCCH repetition factor. However, the indication of the PUCCH repetition factor via RRC or other suitable signaling types may be non-dynamic in nature. In an NR system, an ability to more dynamically modify the PUCCH repetition factor may improve a performance of the UE 715 and/or the base station 705.

In various aspects of techniques and apparatuses described herein, a UE 715 may receive, from a base station 705, a semi-static configuration via RRC signaling that indicates associations between BWP and PUCCH repetition factors. For example, the semi-static configuration may indicate one or more associations between possible BWPs and corresponding PUCCH repetition factors. The possible BWPs may include both uplink BWPs and downlink BWPs. The UE 715 may receive DCI that includes an indication for the UE 715 to switch to a BWP (e.g., switch from a first BWP to a second BWP). The UE 715 may determine a PUCCH repetition factor based at least in part on an association with the BWP indicated in the DCI. In other words, the UE 715 may determine the PUCCH repetition factor based at least in part on the semi-static configuration, which indicates associations between the possible BWPs and the corresponding PUCCH repetition factors. The UE 715 may determine the PUCCH repetition factor based at least in part on the BWP indicated in the DCI. The UE 715 may transmit, to the base station 705, a PUCCH based at least in part on the PUCCH repetition factor. In some aspects, the PUCCH repetition factor may be dynamically indicated to the UE 715 based at least in part on the BWP switching. In other words, the BWP switching may implicitly indicate to the UE 715 the PUCCH repetition factor, based at least in part on the semi-static configuration that was previously received at the UE 715.

Figure 8:
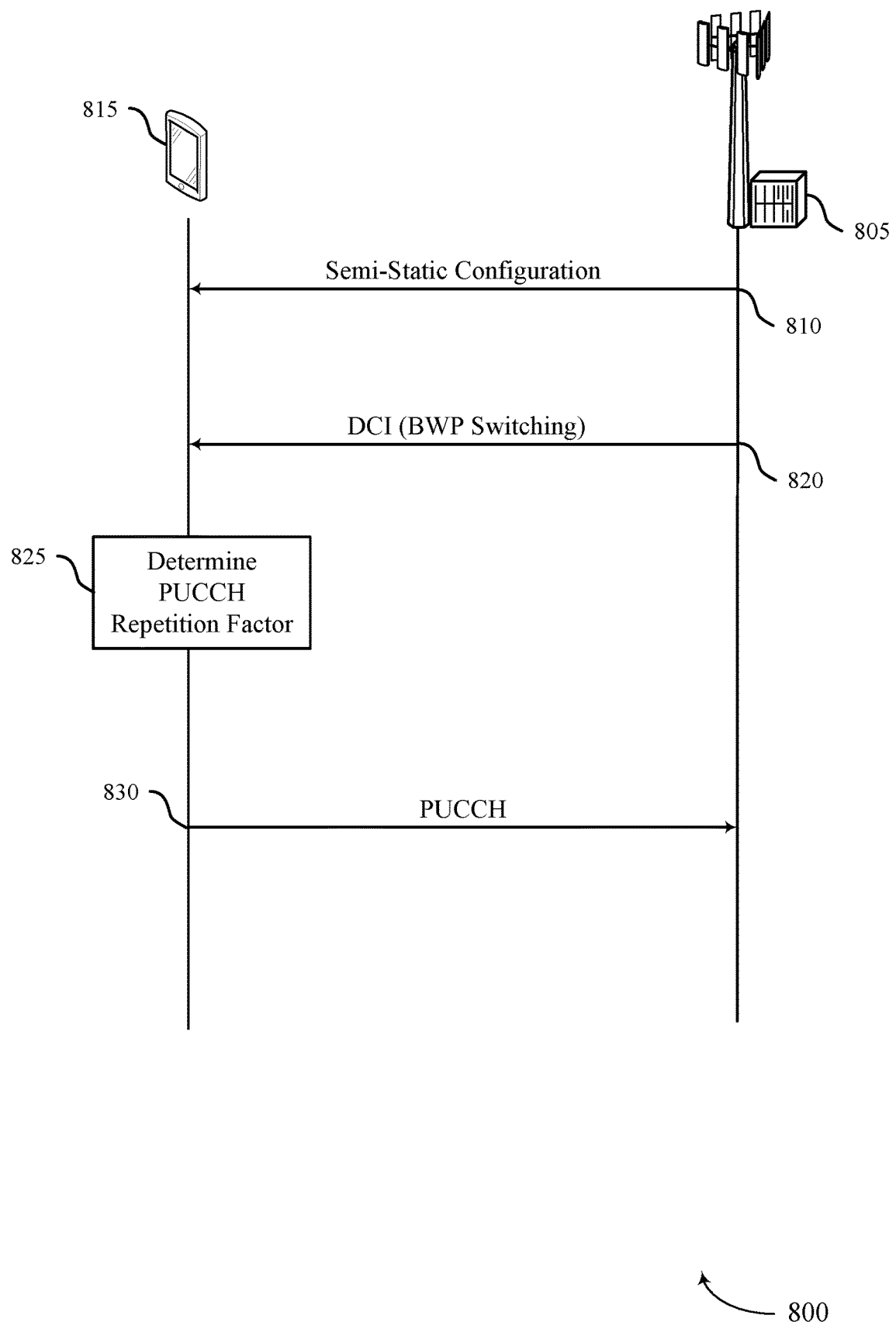
FIG. 8 illustrates an example of a process flow that supports determining uplink control channel repetition factors in accordance with aspects of the present disclosure.

FIG. 8 illustrates an example of a process flow 800 that supports determining uplink control channel repetition factors in accordance with aspects of the present disclosure. As shown in FIG. 8, process flow 800 may include a UE 815 and a base station 805, which may be examples of corresponding devices described with reference to FIGS. 1-7. In some aspects, the UE 815 and the base station 805 may be included in a wireless network such as wireless network 100.

As shown at 810, the UE 815 may receive a semi-static configuration from the base station. The UE 815 may receive the semi-static configuration via RRC signaling. The semi-static configuration may indicate associations between BWP and PUCCH repetition factors. For example, the semi-static configuration may indicate one or more associations between possible BWPs and corresponding PUCCH repetition factors. The possible BWPs may include both uplink BWPs and downlink BWPs.

In some aspects, the semi-static configuration may indicate an association between a BWP and a PUCCH repetition factor. In some aspects, the semi-static configuration may be a PUCCH resource set configuration. In some aspects, the association between the BWP and the PUCCH repetition factor may be based at least in part on a PUCCH resource set. In some aspects, the association between the BWP and the PUCCH repetition factor may be based at least in part on a PUCCH format. In some aspects, the association between the BWP and the PUCCH repetition factor may be based at least in part on an uplink control information (UCI) size. In some aspects, the association between the BWP and the PUCCH repetition factor may be based at least in part on UCI content.

In some aspects, the association of the BWP and the PUCCH repetition factor may be configured semi-statically via RRC signaling. The association may be configured via a configuration that is part of a PUCCH resource set configuration. The association of the BWP and the PUCCH repetition factor may be based at least in part on the PUCCH resource set. Further, the association of the BWP and the PUCCH repetition factor may be based at least in part on the PUCCH format, the UCI size, and/or the UCI content, such as whether the UCI content includes a layer 1 (L1) report.

At 820, the UE 815 may receive, from the base station, DCI that includes an indication for the UE 815 to switch to a BWP. For example, the DCI may indicate that the UE 815 is to switch from a first downlink BWP to a second downlink BWP. As another example, the DCI may indicate that the UE 815 is to switch from a first uplink BWP to a second uplink BWP.

At 825, the UE 815 may determine a PUCCH repetition factor based at least in part on an association between the BWP indicated in the DCI and the PUCCH repetition factor. The UE 815 may determine the PUCCH repetition factor based at least in part on the semi-static configuration, which indicates associations between the BWPs and the corresponding PUCCH repetition factors. The PUCCH repetition factor may be associated with a current active uplink BWP, or the PUCCH repetition factor may be associated with a current active downlink BWP.

As an example, the semi-static configuration may indicate four uplink BWPs and four downlink BWPs. For each of the four uplink BWPs, the semi-static configuration may indicate a PUCCH repetition factor (e.g., no PUCCH repetition, one PUCCH repetition, two PUCCH repetitions, etc.). Based at least in part on the BWP indicated in the DCI, the UE 815 may determine a corresponding PUCCH repetition factor, as indicated in the semi-static configuration. As a result, the base station 805 may implicitly indicate the PUCCH repetition factor for the UE 815 via BWP switching.

At 830, the UE 815 may transmit, to the base station, a PUCCH based at least in part on the PUCCH repetition factor. In other words, the PUCCH repetition factor that is implicitly indicated via the BWP switching may be used by the UE 815 for transmitting the PUCCH to the base station.

In some aspects, the UE 815 may receive a downlink MAC-CE that indicates one or more updated associations between possible BWPs and corresponding PUCCH repetition factors. In some aspects, the UE 815 may receive another DCI that indicates one or more updated associations between possible BWPs and corresponding PUCCH repetition factors. In other words, the association between the BWPs and the PUCCH repetition factors may be dynamically changed using the downlink MAC-CE or the DCI.

As indicated above, FIG. 8 is provided as an example. Other examples may differ from what is described with regard to FIG. 8.

Figure 9:
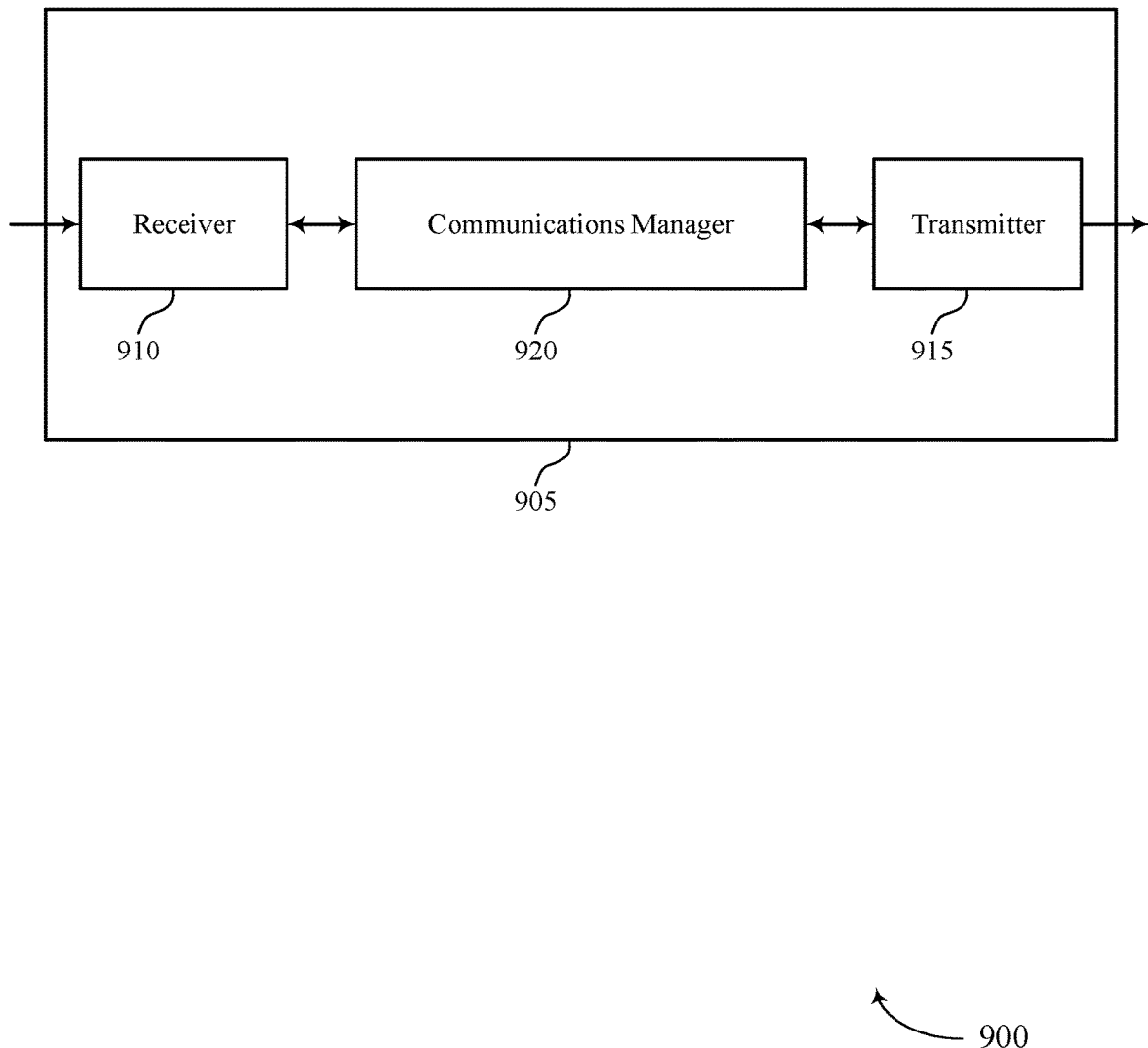
FIGS. 9 and 10 show block diagrams of devices that support determining uplink control channel repetition factors in accordance with aspects of the present disclosure.

FIG. 9 shows a block diagram 900 of a device 905 that supports determining uplink control channel repetition factors in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to determining uplink control channel repetition factors). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to determining uplink control channel repetition factors). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of determining uplink control channel repetition factors as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel. The communications manager 920 may be configured as or otherwise support a means for receiving, from the base station on the downlink control channel, a downlink control information message using a first aggregation level of the one or more aggregation levels. The communications manager 920 may be configured as or otherwise support a means for selecting, based on the first aggregation level, a first repetition factor that is indicated by the first aggregation level of the downlink control information message by the correspondence between the one or more aggregation levels for the downlink control channel and the one or more repetition factors for the uplink control channel. The communications manager 920 may be configured as or otherwise support a means for transmitting, to the base station on the uplink control channel, repetitions of an uplink control message according to the selected first repetition factor and repetitions of one or more subsequent uplink control messages on the uplink control channel according to the first repetition factor.

Additionally, or alternatively, the communications manager 920 may support wireless communications at a UE in accordance with examples as disclosed herein. For example, the communications manager 920 may be configured as or otherwise support a means for receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel. The communications manager 920 may be configured as or otherwise support a means for receiving, from the base station on the downlink control channel, a downlink control information message using a first aggregation level of the one or more aggregation levels. The communications manager 920 may be configured as or otherwise support a means for selecting, based on the first aggregation level, a first repetition factor that is indicated by the first aggregation level of the downlink control information message by the correspondence between the one or more aggregation levels for the downlink control channel and the one or more repetition factors for the uplink control channel. The communications manager 920 may be configured as or otherwise support a means for initiating a timer based on the receiving of the downlink control information message. The communications manager 920 may be configured as or otherwise support a means for transmitting, to the base station on the uplink control channel, repetitions of an uplink control message and one or more uplink control messages according to the first repetition factor for a duration of the timer.

Additionally, or alternatively, the communications manager 920 may support wireless communications at a UE in accordance with examples as disclosed herein. For example, the communications manager 920 may be configured as or otherwise support a means for receiving, from a base station, DCI that includes an indication for the UE to switch to a BWP. The communications manager 920 may be configured as or otherwise support a means for determining a PUCCH repetition factor based on an association between the BWP indicated in the DCI and the PUCCH repetition factor. The communications manager 920 may be configured as or otherwise support a means for transmitting, to the base station, a PUCCH based on the PUCCH repetition factor.

Additionally, or alternatively, the communications manager 920 may support wireless communications at a UE in accordance with examples as disclosed herein. For example, the communications manager 920 may be configured as or otherwise support a means for receiving signaling indicating a first repetition factor index, the UE being configured with information that maps, for each of a set of multiple repetition factor indexes, each of a set of multiple sets of transmission parameters to a corresponding quantity of PUCCH repetitions. The communications manager 920 may be configured as or otherwise support a means for using a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Additionally, or alternatively, the communications manager 920 may support wireless communications at a UE in accordance with examples as disclosed herein. For example, the communications manager 920 may be configured as or otherwise support a means for receiving signaling indicating a first quantity of PUCCH repetitions is associated with a first set of transmission parameters. The communications manager 920 may be configured as or otherwise support a means for using the first quantity of PUCCH repetitions for a first PUCCH transmission associated with the first set of transmission parameters.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for determining repetition factors, resulting in decreased system latency more efficient use of wireless resources, more efficient use of computational resources, and improved user experience.

Figure 10:
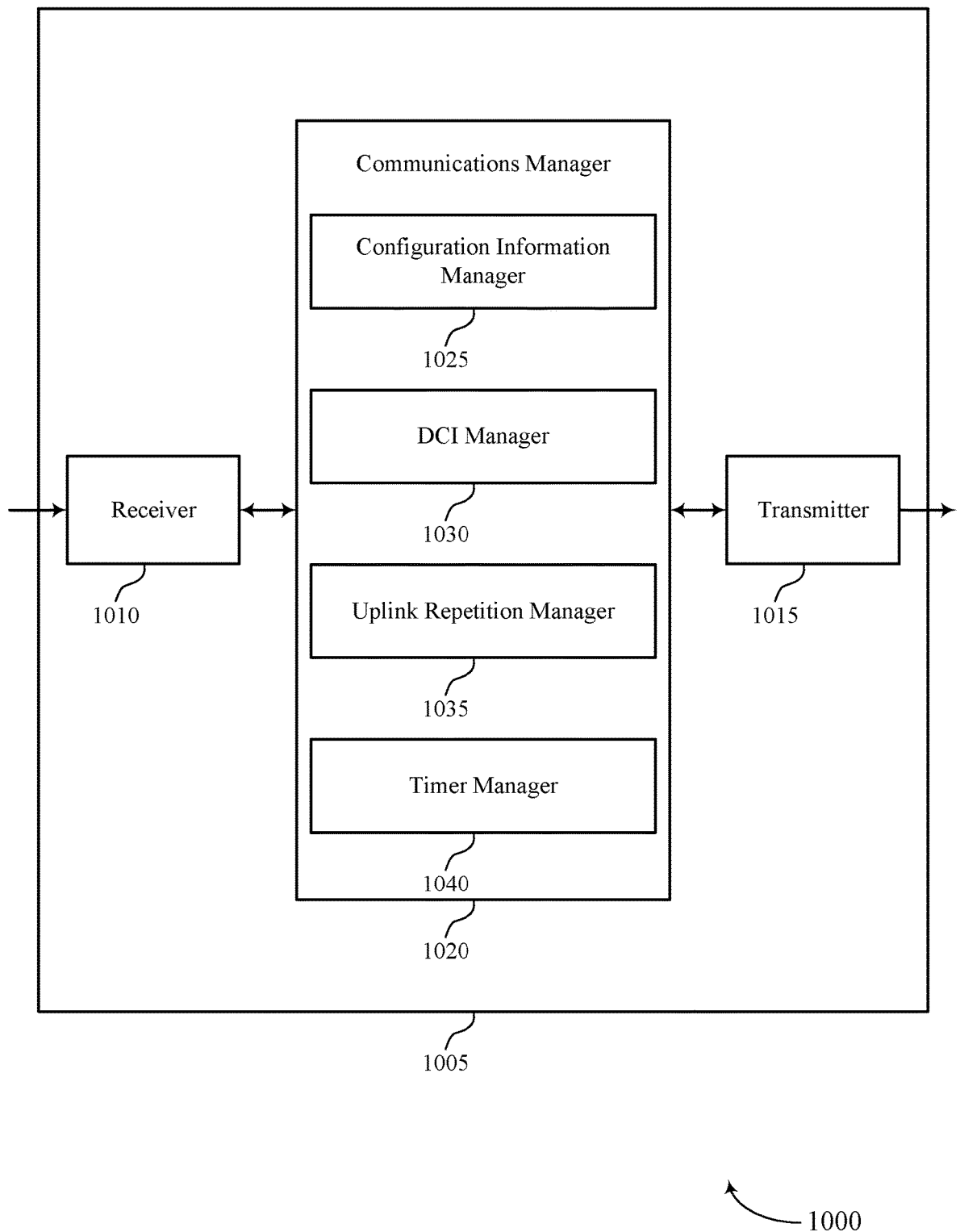

FIG. 10 shows a block diagram 1000 of a device 1005 that supports determining uplink control channel repetition factors in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to determining uplink control channel repetition factors). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to determining uplink control channel repetition factors). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of determining uplink control channel repetition factors as described herein. For example, the communications manager 1020 may include a configuration information manager 1025, a DCI manager 1030, an uplink repetition manager 1035, a timer manager 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The configuration information manager 1025 may be configured as or otherwise support a means for receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel. The DCI manager 1030 may be configured as or otherwise support a means for receiving, from the base station on the downlink control channel, a downlink control information message using a first aggregation level of the one or more aggregation levels. The uplink repetition manager 1035 may be configured as or otherwise support a means for selecting, based on the first aggregation level, a first repetition factor that is indicated by the first aggregation level of the downlink control information message by the correspondence between the one or more aggregation levels for the downlink control channel and the one or more repetition factors for the uplink control channel. The uplink repetition manager 1035 may be configured as or otherwise support a means for transmitting, to the base station on the uplink control channel, repetitions of an uplink control message according to the selected first repetition factor and repetitions of one or more subsequent uplink control messages on the uplink control channel according to the first repetition factor.

Additionally, or alternatively, the communications manager 1020 may support wireless communications at a UE in accordance with examples as disclosed herein. The configuration information manager 1025 may be configured as or otherwise support a means for receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel. The DCI manager 1030 may be configured as or otherwise support a means for receiving, from the base station on the downlink control channel, a downlink control information message using a first aggregation level of the one or more aggregation levels. The uplink repetition manager 1035 may be configured as or otherwise support a means for selecting, based on the first aggregation level, a first repetition factor that is indicated by the first aggregation level of the downlink control information message by the correspondence between the one or more aggregation levels for the downlink control channel and the one or more repetition factors for the uplink control channel. The timer manager 1040 may be configured as or otherwise support a means for initiating a timer based on the receiving of the downlink control information message. The uplink repetition manager 1035 may be configured as or otherwise support a means for transmitting, to the base station on the uplink control channel, repetitions of an uplink control message and one or more uplink control messages according to the first repetition factor for a duration of the timer.

Additionally, or alternatively, the communications manager 1020 may support wireless communications at a UE in accordance with examples as disclosed herein. The DCI manager 1030 may be configured as or otherwise support a means for receiving, from a base station, DCI that includes an indication for the UE to switch to a BWP. The uplink repetition manager 1035 may be configured as or otherwise support a means for determining a PUCCH repetition factor based on an association between the BWP indicated in the DCI and the PUCCH repetition factor. The uplink repetition manager 1035 may be configured as or otherwise support a means for transmitting, to the base station, a PUCCH based on the PUCCH repetition factor.

Additionally, or alternatively, the communications manager 1020 may support wireless communications at a UE in accordance with examples as disclosed herein. The uplink repetition manager 1035 may be configured as or otherwise support a means for receiving signaling indicating a first repetition factor index, the UE being configured with information that maps, for each of a set of multiple repetition factor indexes, each of a set of multiple sets of transmission parameters to a corresponding quantity of PUCCH repetitions. The uplink repetition manager 1035 may be configured as or otherwise support a means for using a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Additionally, or alternatively, the communications manager 1020 may support wireless communications at a UE in accordance with examples as disclosed herein. The uplink repetition manager 1035 may be configured as or otherwise support a means for receiving signaling indicating a first quantity of PUCCH repetitions is associated with a first set of transmission parameters. The uplink repetition manager 1035 may be configured as or otherwise support a means for using the first quantity of PUCCH repetitions for a first PUCCH transmission associated with the first set of transmission parameters.

Figure 11:
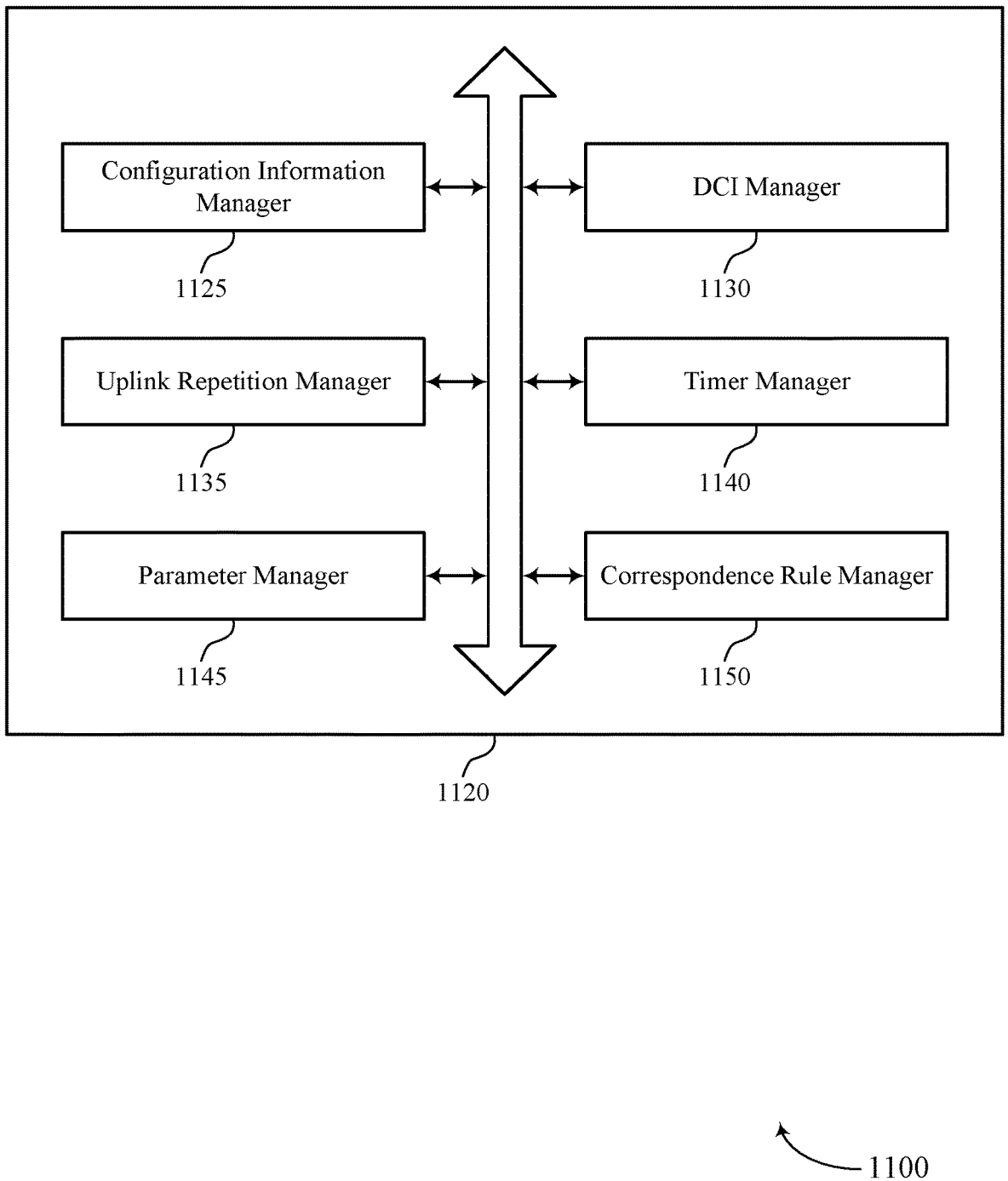
FIG. 11 shows a block diagram of a communications manager that supports determining uplink control channel repetition factors in accordance with aspects of the present disclosure.

FIG. 11 shows a block diagram 1100 of a communications manager 1120 that supports determining uplink control channel repetition factors in accordance with aspects of the present disclosure. The communications manager 1120 may be an example of aspects of a communications manager 920, a communications manager 1020, or both, as described herein. The communications manager 1120, or various components thereof, may be an example of means for performing various aspects of determining uplink control channel repetition factors as described herein. For example, the communications manager 1120 may include a configuration information manager 1125, a DCI manager 1130, an uplink repetition manager 1135, a timer manager 1140, a parameter manager 1145, a correspondence rule manager 1150, or any combination thereof. Each of these components may communicate, directly or indirectly, with one another (e.g., via one or more buses).

The communications manager 1120 may support wireless communications at a UE in accordance with examples as disclosed herein. The configuration information manager 1125 may be configured as or otherwise support a means for receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel. The DCI manager 1130 may be configured as or otherwise support a means for receiving, from the base station on the downlink control channel, a downlink control information message using a first aggregation level of the one or more aggregation levels. The uplink repetition manager 1135 may be configured as or otherwise support a means for selecting, based on the first aggregation level, a first repetition factor that is indicated by the first aggregation level of the downlink control information message by the correspondence between the one or more aggregation levels for the downlink control channel and the one or more repetition factors for the uplink control channel. In some examples, the uplink repetition manager 1135 may be configured as or otherwise support a means for transmitting, to the base station on the uplink control channel, repetitions of an uplink control message according to the selected first repetition factor and repetitions of one or more subsequent uplink control messages on the uplink control channel according to the first repetition factor.

In some examples, the DCI manager 1130 may be configured as or otherwise support a means for receiving, from the base station after transmitting repetitions of the one or more subsequent uplink control messages, a second downlink control information message using a second aggregation level of the one or more aggregation levels. In some examples, the uplink repetition manager 1135 may be configured as or otherwise support a means for transmitting, to the base station, repetitions of one or more additional uplink control messages according to a second repetition factor indicated by the second aggregation level of the second downlink control information message according to the correspondence between the one or more aggregation levels for the downlink control channel and the one or more repetition factors for the uplink control channel.

In some examples, to support receiving the configuration information, the configuration information manager 1125 may be configured as or otherwise support a means for receiving an indication of a control resource set configuration for the uplink control channel, the control resource set configuration including the configuration information indicating the correspondence between the one or more aggregation levels for the downlink control channel and the one or more repetition factors for the uplink control channel.

In some examples, to support receiving the configuration information, the configuration information manager 1125 may be configured as or otherwise support a means for receiving an indication of a search space configuration for the downlink control channel, the search space configuration including the configuration information indicating the correspondence between the one or more aggregation levels for the downlink control channel and the one or more repetition factors for the uplink control channel.

In some examples, the parameter manager 1145 may be configured as or otherwise support a means for determining whether one or more parameter values for the uplink control channel satisfy one or more rules. In some examples, the correspondence rule manager 1150 may be configured as or otherwise support a means for applying the correspondence between the one or more aggregation levels for the downlink control channel and the one or more repetition factors for the uplink control channel to the repetitions of the uplink control message based on the determining, where the transmitting of the repetitions of the uplink control message according to the first repetition factor is based on the applying.

In some examples, the one or more parameter values for the uplink control channel include an identifier of a resource set for the uplink control channel, a size of an uplink control information message for transmission on the uplink control channel, a format for the uplink control channel, contents of the uplink control information message, or any combination thereof.

In some examples, the correspondence rule manager 1150 may be configured as or otherwise support a means for receiving, in the configuration information, an indication of the one or more rules.

In some examples, the parameter manager 1145 may be configured as or otherwise support a means for determining whether one or more parameter values for the downlink control channel satisfy one or more rules. In some examples, the correspondence rule manager 1150 may be configured as or otherwise support a means for applying the correspondence between the one or more aggregation levels for the downlink control channel and the one or more repetition factors for the uplink control channel to the repetitions of the uplink control message based on the determining, where the transmitting of the repetitions of the uplink control message according to the first repetition factor is based on the applying.

In some examples, the one or more parameter values for the downlink control channel include a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

In some examples, the correspondence rule manager 1150 may be configured as or otherwise support a means for receiving, in the configuration information, an indication of the one or more rules.

Additionally, or alternatively, the communications manager 1120 may support wireless communications at a UE in accordance with examples as disclosed herein. In some examples, the configuration information manager 1125 may be configured as or otherwise support a means for receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel. In some examples, the DCI manager 1130 may be configured as or otherwise support a means for receiving, from the base station on the downlink control channel, a downlink control information message using a first aggregation level of the one or more aggregation levels. In some examples, the uplink repetition manager 1135 may be configured as or otherwise support a means for selecting, based on the first aggregation level, a first repetition factor that is indicated by the first aggregation level of the downlink control information message by the correspondence between the one or more aggregation levels for the downlink control channel and the one or more repetition factors for the uplink control channel. The timer manager 1140 may be configured as or otherwise support a means for initiating a timer based on the receiving of the downlink control information message. In some examples, the uplink repetition manager 1135 may be configured as or otherwise support a means for transmitting, to the base station on the uplink control channel, repetitions of an uplink control message and one or more uplink control messages according to the first repetition factor for a duration of the timer.

In some examples, the uplink repetition manager 1135 may be configured as or otherwise support a means for transmitting, upon expiration of the timer, repetitions of one or more additional uplink control messages according to a second repetition factor.

In some examples, to support receiving the configuration information, the configuration information manager 1125 may be configured as or otherwise support a means for receiving an indication of a control resource set configuration for the uplink control channel, the control resource set configuration including the configuration information indicating the correspondence between the one or more aggregation levels for the downlink control channel and the one or more repetition factors for the uplink control channel.

In some examples, to support receiving the configuration information, the configuration information manager 1125 may be configured as or otherwise support a means for receiving an indication of a search space configuration for the downlink control channel, the search space configuration including the configuration information indicating the correspondence between the one or more aggregation levels for the downlink control channel and the one or more repetition factors for the uplink control channel.

In some examples, the parameter manager 1145 may be configured as or otherwise support a means for determining whether one or more parameter values for the uplink control channel satisfy one or more rules. In some examples, the correspondence rule manager 1150 may be configured as or otherwise support a means for applying the correspondence between the one or more aggregation levels for the downlink control channel and the one or more repetition factors for the uplink control channel to the repetitions of the uplink control message based on the determining, where the transmitting of the repetitions of the uplink control message according to the first repetition factor is based on the applying.

In some examples, the one or more parameter values for the uplink control channel include an identifier of a resource set for the uplink control channel, a size of an uplink control information message for transmission on the uplink control channel, a format for the uplink control channel, contents of the uplink control information message, or any combination thereof.

In some examples, the correspondence rule manager 1150 may be configured as or otherwise support a means for receiving, in the configuration information, an indication of the one or more rules.

In some examples, the parameter manager 1145 may be configured as or otherwise support a means for determining whether one or more parameter values for the downlink control channel satisfy one or more rules. In some examples, the correspondence rule manager 1150 may be configured as or otherwise support a means for applying the correspondence between the one or more aggregation levels for the downlink control channel and the one or more repetition factors for the uplink control channel to the repetitions of the uplink control message based on the determining, where the transmitting of the repetitions of the uplink control message according to the first repetition factor is based on the applying.

In some examples, the one or more parameter values for the downlink control channel include a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

In some examples, the correspondence rule manager 1150 may be configured as or otherwise support a means for receiving, in the configuration information, an indication of the one or more rules.

Additionally, or alternatively, the communications manager 1120 may support wireless communications at a UE in accordance with examples as disclosed herein. In some examples, the DCI manager 1130 may be configured as or otherwise support a means for receiving, from a base station, DCI that includes an indication for the UE to switch to a BWP. In some examples, the uplink repetition manager 1135 may be configured as or otherwise support a means for determining a PUCCH repetition factor based on an association between the BWP indicated in the DCI and the PUCCH repetition factor. In some examples, the uplink repetition manager 1135 may be configured as or otherwise support a means for transmitting, to the base station, a PUCCH based on the PUCCH repetition factor.

In some examples, the configuration information manager 1125 may be configured as or otherwise support a means for receiving, from the base station, a semi-static configuration via radio resource control signaling that indicates the association between the BWP and the PUCCH repetition factor. In some examples, the uplink repetition manager 1135 may be configured as or otherwise support a means for where determining the PUCCH repetition factor includes determining the PUCCH repetition factor based on the semi-static configuration.

In some examples, the semi-static configuration is a PUCCH resource set configuration. In some examples, the semi-static configuration indicates one or more associations between possible BWPs and corresponding PUCCH repetition factors. In some examples, the association between the BWP and the PUCCH repetition factor is based on a PUCCH resource set. In some examples, the association between the BWP and the PUCCH repetition factor is based on a PUCCH format. In some examples, the association between the BWP and the PUCCH repetition factor is based on an uplink control information size. In some examples, the association between the BWP and the PUCCH repetition factor is based on uplink control information content. In some examples, the BWP is an uplink BWP. In some examples, the BWP is a downlink BWP.

In some examples, the uplink repetition manager 1135 may be configured as or otherwise support a means for receiving, from the base station, a downlink media access control control element that indicates one or more updated associations between possible BWPs and corresponding PUCCH repetition factors. In some examples, the DCI manager 1130 may be configured as or otherwise support a means for receiving, from the base station, a second DCI that indicates one or more updated associations between possible BWPs and corresponding PUCCH repetition factors.

Additionally, or alternatively, the communications manager 1120 may support wireless communications at a UE in accordance with examples as disclosed herein. In some examples, the uplink repetition manager 1135 may be configured as or otherwise support a means for receiving signaling indicating a first repetition factor index, the UE being configured with information that maps, for each of a set of multiple repetition factor indexes, each of a set of multiple sets of transmission parameters to a corresponding quantity of PUCCH repetitions. In some examples, the uplink repetition manager 1135 may be configured as or otherwise support a means for using a first quantity of PUCCH repetitions, for a first PUCCH transmission, based on the information mapping a combination of the first repetition factor index and a first set of transmission parameters associated with the first PUCCH transmission to the first quantity of PUCCH repetitions.

In some examples, the uplink repetition manager 1135 may be configured as or otherwise support a means for receiving signaling configuring the UE with the information via RRC signaling.

In some examples, the uplink repetition manager 1135 may be configured as or otherwise support a means for using a second quantity of PUCCH repetitions, for a second PUCCH transmission, based on the information mapping a combination of the first repetition factor index and a second set of transmission parameters associated with the second PUCCH transmission to the second quantity of PUCCH repetitions.

In some examples, the information maps a combination of a second repetition factor index and the first set of transmission parameters to a second quantity of PUCCH repetitions. In some examples, receiving the signaling indicating the first repetition factor index includes receiving DCI signaling indicating the first repetition factor index. In some examples, receiving the signaling indicating the first repetition factor index includes receiving downlink medium access control (MAC) control element (MAC-CE) signaling indicating the first repetition factor index.

In some examples, the first set of transmission parameters is associated with the first PUCCH transmission based on the first set of transmission parameters being associated with an PDSCH transmission associated with the first PUCCH transmission. In some examples, the first set of transmission parameters includes a transmit beam. In some examples, the first set of transmission parameters includes a bandwidth part. In some examples, the first set of transmission parameters includes a content of the PUCCH transmission or an PDSCH associated with the first PUCCH transmission. In some examples, the first set of transmission parameters includes a semi-persistent scheduling (SPS) transmission associated with the first PUCCH transmission.

In some examples, the uplink repetition manager 1135 may be configured as or otherwise support a means for receiving signaling indicating a third quantity of PUCCH repetitions is associated with the second set of transmission parameters. In some examples, the uplink repetition manager 1135 may be configured as or otherwise support a means for using the third quantity of PUCCH repetitions instead of the second quantity of PUCCH repetitions for a second PUCCH transmission associated with the second set of transmission parameters.

Additionally, or alternatively, the communications manager 1120 may support wireless communications at a UE in accordance with examples as disclosed herein. In some examples, the uplink repetition manager 1135 may be configured as or otherwise support a means for receiving a signaling indicating a first quantity of PUCCH repetitions is associated with a first set of transmission parameters. In some examples, the uplink repetition manager 1135 may be configured as or otherwise support a means for using the first quantity of PUCCH repetitions for a first PUCCH transmission associated with the first set of transmission parameters.

In some examples, the uplink repetition manager 1135 may be configured as or otherwise support a means for receiving signaling indicating a second quantity of PUCCH repetitions is associated with the set of transmission parameters. In some examples, the uplink repetition manager 1135 may be configured as or otherwise support a means for using the second quantity of PUCCH repetitions for a second PUCCH transmission associated with the first set of transmission parameters.

In some examples, the uplink repetition manager 1135 may be configured as or otherwise support a means for receiving signaling indicating the first quantity of PUCCH repetitions is associated with a second set of transmission parameters. In some examples, the uplink repetition manager 1135 may be configured as or otherwise support a means for using the first quantity of PUCCH repetitions for a second PUCCH transmission associated with the second set of transmission parameters.

In some examples, receiving the signaling indicating the first quantity of PUCCH repetitions is associated with a first set of transmission parameters includes receiving DCI signaling.

In some examples, receiving the signaling indicating the first quantity of PUCCH repetitions is associated with a first set of transmission parameters includes receiving downlink medium access control (MAC) control element (MAC-CE) signaling.

In some examples, the first set of transmission parameters is associated with the first PUCCH transmission based on the first set of transmission parameters being associated with an PDSCH transmission associated with the first PUCCH transmission. In some examples, the first set of transmission parameters includes a transmit beam. In some examples, the first set of transmission parameters includes a bandwidth part. In some examples, the first set of transmission parameters includes a content of the PUCCH transmission or an PDSCH associated with the first PUCCH transmission. In some examples, the first set of transmission parameters includes a semi-persistent scheduling (SPS) transmission associated with the first PUCCH transmission.

Figure 12:
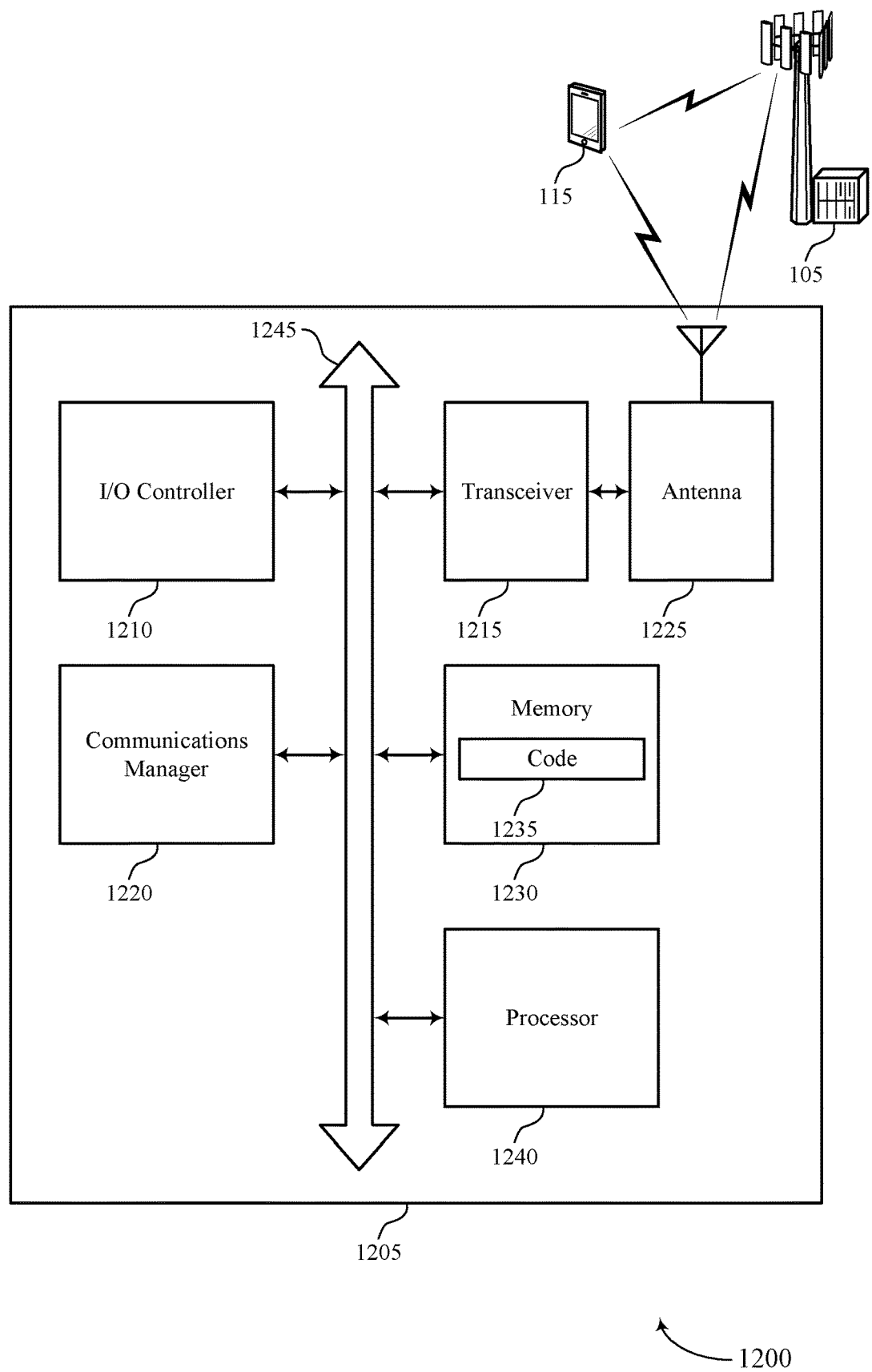
FIG. 12 shows a diagram of a system including a device that supports determining uplink control channel repetition factors in accordance with aspects of the present disclosure.

FIG. 12 shows a diagram of a system 1200 including a device 1205 that supports determining uplink control channel repetition factors in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting determining uplink control channel repetition factors). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel. The communications manager 1220 may be configured as or otherwise support a means for receiving, from the base station on the downlink control channel, a downlink control information message using a first aggregation level of the one or more aggregation levels. The communications manager 1220 may be configured as or otherwise support a means for selecting, based on the first aggregation level, a first repetition factor that is indicated by the first aggregation level of the downlink control information message by the correspondence between the one or more aggregation levels for the downlink control channel and the one or more repetition factors for the uplink control channel. The communications manager 1220 may be configured as or otherwise support a means for transmitting, to the base station on the uplink control channel, repetitions of an uplink control message according to the selected first repetition factor and repetitions of one or more subsequent uplink control messages on the uplink control channel according to the first repetition factor.

Additionally, or alternatively, the communications manager 1220 may support wireless communications at a UE in accordance with examples as disclosed herein. For example, the communications manager 1220 may be configured as or otherwise support a means for receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel. The communications manager 1220 may be configured as or otherwise support a means for receiving, from the base station on the downlink control channel, a downlink control information message using a first aggregation level of the one or more aggregation levels. The communications manager 1220 may be configured as or otherwise support a means for selecting, based on the first aggregation level, a first repetition factor that is indicated by the first aggregation level of the downlink control information message by the correspondence between the one or more aggregation levels for the downlink control channel and the one or more repetition factors for the uplink control channel. The communications manager 1220 may be configured as or otherwise support a means for initiating a timer based on the receiving of the downlink control information message. The communications manager 1220 may be configured as or otherwise support a means for transmitting, to the base station on the uplink control channel, repetitions of an uplink control message and one or more uplink control messages according to the first repetition factor for a duration of the timer.

Additionally, or alternatively, the communications manager 1220 may support wireless communications at a UE in accordance with examples as disclosed herein. For example, the communications manager 1220 may be configured as or otherwise support a means for receiving, from a base station, DCI that includes an indication for the UE to switch to a BWP. The communications manager 1220 may be configured as or otherwise support a means for determining a PUCCH repetition factor based on an association between the BWP indicated in the DCI and the PUCCH repetition factor. The communications manager 1220 may be configured as or otherwise support a means for transmitting, to the base station, a PUCCH based on the PUCCH repetition factor.

Additionally, or alternatively, the communications manager 1220 may support wireless communications at a UE in accordance with examples as disclosed herein. For example, the communications manager 1220 may be configured as or otherwise support a means for receiving signaling indicating a first repetition factor index, the UE being configured with information that maps, for each of a set of multiple repetition factor indexes, each of a set of multiple sets of transmission parameters to a corresponding quantity of PUCCH repetitions. The communications manager 1220 may be configured as or otherwise support a means for using a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Additionally, or alternatively, the communications manager 1220 may support wireless communications at a UE in accordance with examples as disclosed herein. For example, the communications manager 1220 may be configured as or otherwise support a means for receiving signaling indicating a first quantity of PUCCH repetitions is associated with a first set of transmission parameters. The communications manager 1220 may be configured as or otherwise support a means for using the first quantity of PUCCH repetitions for a first PUCCH transmission associated with the first set of transmission parameters.

By including or configuring the communications manager 1220 in accordance with examples as described herein, the device 1205 may support techniques for determining repetition factors, resulting in decreased system latency more efficient use of wireless resources, more efficient use of computational resources, and improved user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of determining uplink control channel repetition factors as described herein, or the processor 1240 and the memory 1230 may be otherwise configured to perform or support such operations.

Figure 13:
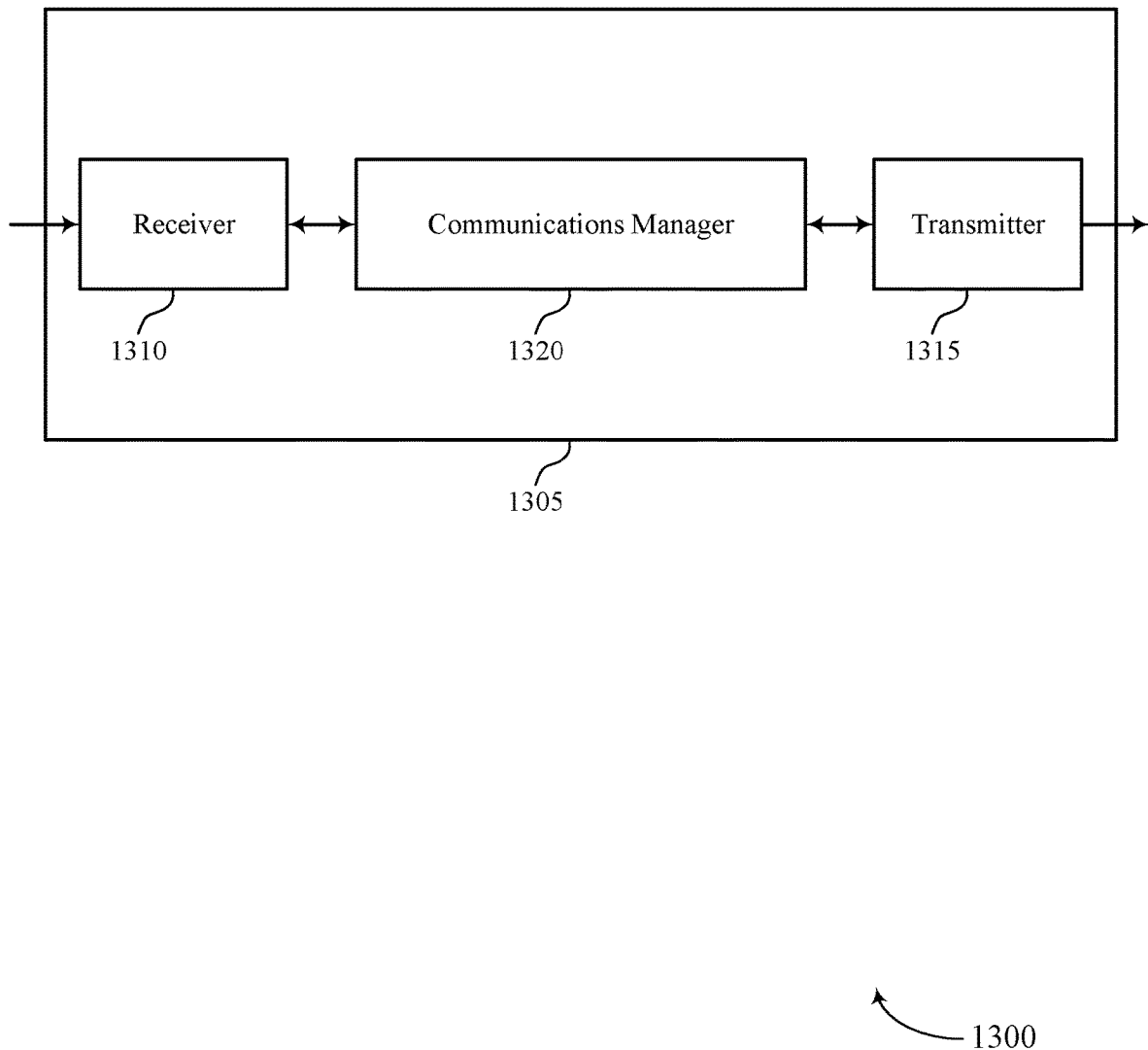
FIGS. 13 and 14 show block diagrams of devices that support determining uplink control channel repetition factors in accordance with aspects of the present disclosure.

FIG. 13 shows a block diagram 1300 of a device 1305 that supports determining uplink control channel repetition factors in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to determining uplink control channel repetition factors). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to determining uplink control channel repetition factors). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of determining uplink control channel repetition factors as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. For example, the communications manager 1320 may be configured as or otherwise support a means for transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel. The communications manager 1320 may be configured as or otherwise support a means for transmitting, to the UE on the downlink control channel, a downlink control information message using a first aggregation level of the one or more aggregation levels. The communications manager 1320 may be configured as or otherwise support a means for receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel.

Additionally, or alternatively, the communications manager 1320 may support wireless communications at a base station in accordance with examples as disclosed herein. For example, the communications manager 1320 may be configured as or otherwise support a means for transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel. The communications manager 1320 may be configured as or otherwise support a means for transmitting, to the UE on the downlink control channel, a downlink control information message using a first aggregation level of the one or more aggregation levels. The communications manager 1320 may be configured as or otherwise support a means for receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel. The communications manager 1320 may be configured as or otherwise support a means for initiating a timer based on the receiving of the downlink control information message. The communications manager 1320 may be configured as or otherwise support a means for receiving repetitions of uplink control messages according to the first repetition factor for a duration of the timer.

Additionally, or alternatively, the communications manager 1320 may support wireless communications at a base station in accordance with examples as disclosed herein. For example, the communications manager 1320 may be configured as or otherwise support a means for transmitting, to a UE, DCI that includes an indication for the UE to switch to a BWP. The communications manager 1320 may be configured as or otherwise support a means for receiving, from the UE, a PUCCH in accordance with a PUCCH repetition factor that is based on an association with the BWP indicated in the DCI.

Additionally, or alternatively, the communications manager 1320 may support wireless communications at a base station in accordance with examples as disclosed herein. For example, the communications manager 1320 may be configured as or otherwise support a means for sending a UE signaling indicating a first repetition factor index, the base station being configured with information that maps, for each of a set of multiple repetition factor indexes, each of a set of multiple sets of transmission parameters to a corresponding quantity of PUCCH repetitions. The communications manager 1320 may be configured as or otherwise support a means for monitoring for a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Additionally, or alternatively, the communications manager 1320 may support wireless communications at a base station in accordance with examples as disclosed herein. For example, the communications manager 1320 may be configured as or otherwise support a means for sending a UE signaling indicating a first quantity of PUCCH repetitions is associated with a first set of transmission parameters. The communications manager 1320 may be configured as or otherwise support a means for monitoring for the first quantity of PUCCH repetitions for a first PUCCH transmission associated with the first set of transmission parameters.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for determining repetition factors, resulting in decreased system latency more efficient use of wireless resources, more efficient use of computational resources, and improved user experience.

Figure 14:
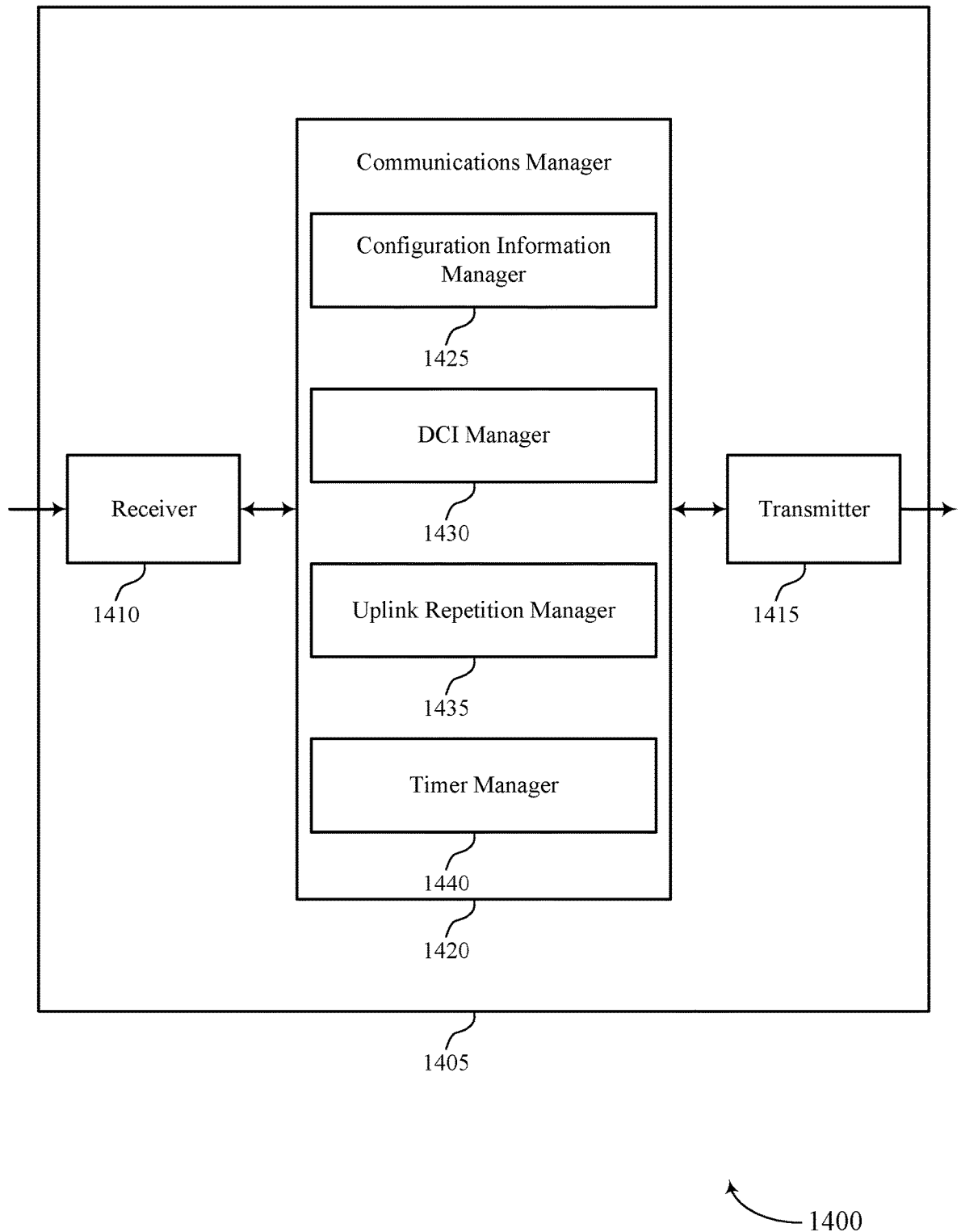

FIG. 14 shows a block diagram 1400 of a device 1405 that supports determining uplink control channel repetition factors in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to determining uplink control channel repetition factors). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to determining uplink control channel repetition factors). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of determining uplink control channel repetition factors as described herein. For example, the communications manager 1420 may include a configuration information manager 1425, a DCI manager 1430, an uplink repetition manager 1435, a timer manager 1440, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. The configuration information manager 1425 may be configured as or otherwise support a means for transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel. The DCI manager 1430 may be configured as or otherwise support a means for transmitting, to the UE on the downlink control channel, a downlink control information message using a first aggregation level of the one or more aggregation levels. The uplink repetition manager 1435 may be configured as or otherwise support a means for receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel.

Additionally, or alternatively, the communications manager 1420 may support wireless communications at a base station in accordance with examples as disclosed herein. The configuration information manager 1425 may be configured as or otherwise support a means for transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel. The DCI manager 1430 may be configured as or otherwise support a means for transmitting, to the UE on the downlink control channel, a downlink control information message using a first aggregation level of the one or more aggregation levels. The uplink repetition manager 1435 may be configured as or otherwise support a means for receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel. The timer manager 1440 may be configured as or otherwise support a means for initiating a timer based on the receiving of the downlink control information message. The uplink repetition manager 1435 may be configured as or otherwise support a means for receiving repetitions of uplink control messages according to the first repetition factor for a duration of the timer.

Additionally, or alternatively, the communications manager 1420 may support wireless communications at a base station in accordance with examples as disclosed herein. The DCI manager 1430 may be configured as or otherwise support a means for transmitting, to a UE, DCI that includes an indication for the UE to switch to a BWP. The uplink repetition manager 1435 may be configured as or otherwise support a means for receiving, from the UE, a PUCCH in accordance with a PUCCH repetition factor that is based on an association with the BWP indicated in the DCI.

Additionally, or alternatively, the communications manager 1420 may support wireless communications at a base station in accordance with examples as disclosed herein. The uplink repetition manager 1435 may be configured as or otherwise support a means for sending a UE signaling indicating a first repetition factor index, the base station being configured with information that maps, for each of a set of multiple repetition factor indexes, each of a set of multiple sets of transmission parameters to a corresponding quantity of PUCCH repetitions. The uplink repetition manager 1435 may be configured as or otherwise support a means for monitoring for a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Additionally, or alternatively, the communications manager 1420 may support wireless communications at a base station in accordance with examples as disclosed herein. The uplink repetition manager 1435 may be configured as or otherwise support a means for sending a UE signaling indicating a first quantity of PUCCH repetitions is associated with a first set of transmission parameters. The uplink repetition manager 1435 may be configured as or otherwise support a means for monitoring for the first quantity of PUCCH repetitions for a first PUCCH transmission associated with the first set of transmission parameters.

Figure 15:
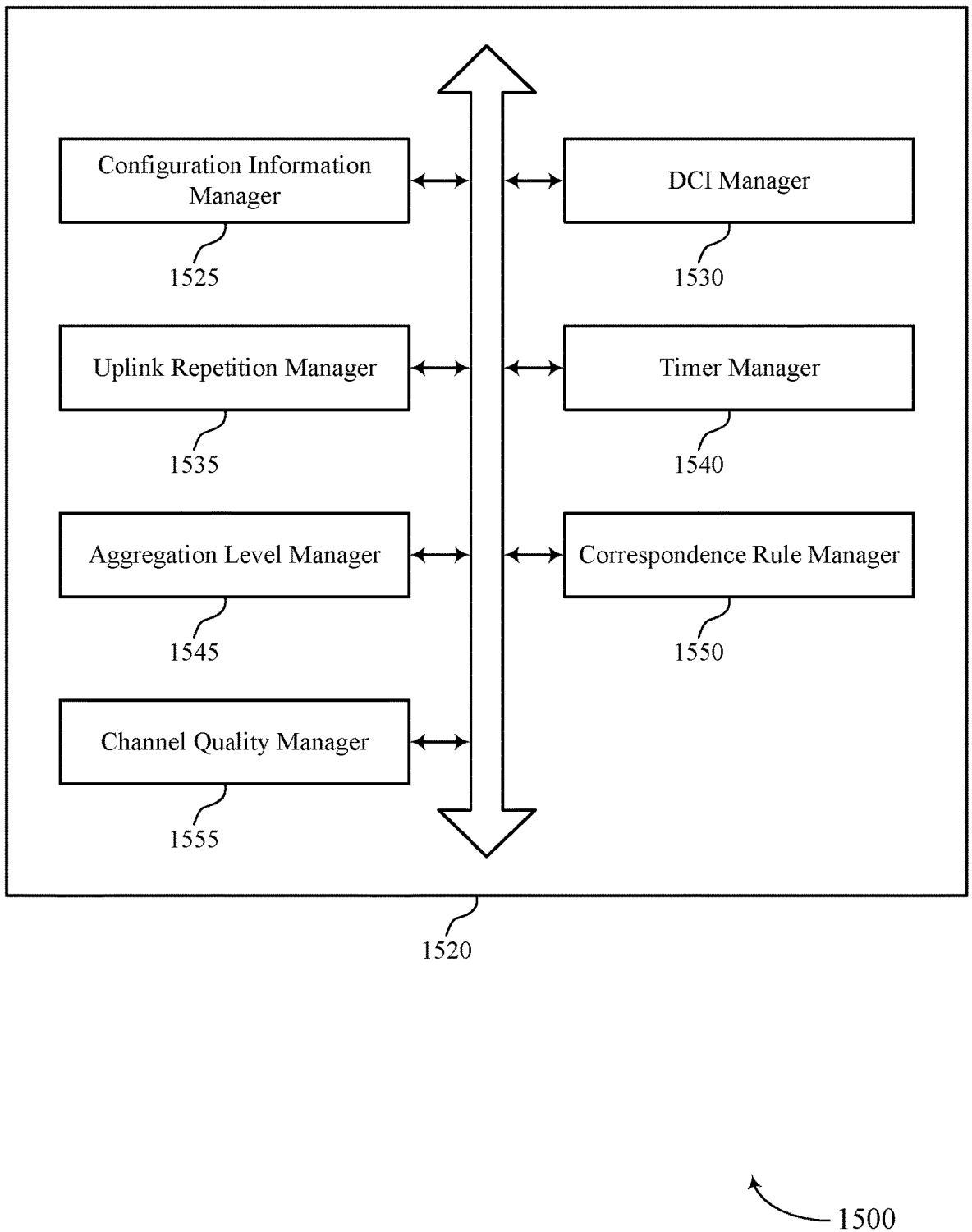
FIG. 15 shows a block diagram of a communications manager that supports determining uplink control channel repetition factors in accordance with aspects of the present disclosure.

FIG. 15 shows a block diagram 1500 of a communications manager 1520 that supports determining uplink control channel repetition factors in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of determining uplink control channel repetition factors as described herein. For example, the communications manager 1520 may include a configuration information manager 1525, a DCI manager 1530, an uplink repetition manager 1535, a timer manager 1540, an aggregation level manager 1545, a correspondence rule manager 1550, a channel quality manager 1555, or any combination thereof. Each of these components may communicate, directly or indirectly, with one another (e.g., via one or more buses).

The communications manager 1520 may support wireless communications at a base station in accordance with examples as disclosed herein. The configuration information manager 1525 may be configured as or otherwise support a means for transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel. The DCI manager 1530 may be configured as or otherwise support a means for transmitting, to the UE on the downlink control channel, a downlink control information message using a first aggregation level of the one or more aggregation levels. The uplink repetition manager 1535 may be configured as or otherwise support a means for receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel.

In some examples, the DCI manager 1530 may be configured as or otherwise support a means for transmitting, to the UE after receiving repetitions of the one or more subsequent uplink control messages, a second downlink control information message using a second aggregation level of the one or more aggregation levels. In some examples, the uplink repetition manager 1535 may be configured as or otherwise support a means for receiving, from the UE, repetitions of one or more additional uplink control messages according to a second repetition factor indicated by the second aggregation level of the second downlink control information message according to the correspondence between the one or more aggregation levels for the downlink control channel and the one or more repetition factors for the uplink control channel.

In some examples, to support transmitting the configuration information, the configuration information manager 1525 may be configured as or otherwise support a means for transmitting an indication of a control resource set configuration for the uplink control channel, the control resource set configuration including the configuration information indicating the correspondence between the one or more aggregation levels for the downlink control channel and the one or more repetition factors for the uplink control channel.

In some examples, to support transmitting the configuration information, the configuration information manager 1525 may be configured as or otherwise support a means for transmitting an indication of a search space configuration for the downlink control channel, the search space configuration including the configuration information indicating the correspondence between the one or more aggregation levels for the downlink control channel and the one or more repetition factors for the uplink control channel.

In some examples, the aggregation level manager 1545 may be configured as or otherwise support a means for identifying the first repetition factor of the one or more repetition factors for receiving the repetitions of the uplink control message. In some examples, the aggregation level manager 1545 may be configured as or otherwise support a means for selecting, from the one or more aggregation levels, the first aggregation level that is associated with the first repetition factor according to the correspondence, where the transmitting of the downlink control information message using the first aggregation level is based on the selecting.

In some examples, the channel quality manager 1555 may be configured as or otherwise support a means for determining a channel quality metric for the uplink control channel, where the identifying of the first repetition factor is based on the channel quality metric.

In some examples, the correspondence rule manager 1550 may be configured as or otherwise support a means for transmitting, to the UE in the configuration information, an indication of one or more rules instructing the UE to apply the correspondence to the repetitions of the uplink control message if one or more parameter values for the uplink control channel satisfy the one or more rules.

In some examples, the one or more parameter values for the uplink control channel include an identifier of a resource set for the uplink control channel, a size of an uplink control information message for transmission on the uplink control channel, a format for the uplink control channel, contents of the uplink control information message, or any combination thereof.

In some examples, the correspondence rule manager 1550 may be configured as or otherwise support a means for transmitting, to the UE in the configuration information, an indication of one or more rules instructing the UE to apply the correspondence to the repetitions of the uplink control message if one or more parameter values for the downlink control channel satisfy the one or more rules.

In some examples, the one or more parameter values for the downlink control channel include a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

Additionally, or alternatively, the communications manager 1520 may support wireless communications at a base station in accordance with examples as disclosed herein. In some examples, the configuration information manager 1525 may be configured as or otherwise support a means for transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel. In some examples, the DCI manager 1530 may be configured as or otherwise support a means for transmitting, to the UE on the downlink control channel, a downlink control information message using a first aggregation level of the one or more aggregation levels. In some examples, the uplink repetition manager 1535 may be configured as or otherwise support a means for receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel. The timer manager 1540 may be configured as or otherwise support a means for initiating a timer based on the receiving of the downlink control information message. In some examples, the uplink repetition manager 1535 may be configured as or otherwise support a means for receiving repetitions of uplink control messages according to the first repetition factor for a duration of the timer.

In some examples, the timer manager 1540 may be configured as or otherwise support a means for receiving, upon expiration of the timer, repetitions of one or more additional uplink control messages according to a second repetition factor.

In some examples, the DCI manager 1530 may be configured as or otherwise support a means for transmitting, to the UE after receiving repetitions of the one or more subsequent uplink control messages, a second downlink control information message using a second aggregation level of the one or more aggregation levels. In some examples, the uplink repetition manager 1535 may be configured as or otherwise support a means for receiving, from the UE, repetitions of one or more additional uplink control messages according to a second repetition factor indicated by the second aggregation level of the second downlink control information message according to the correspondence between the one or more aggregation levels for the downlink control channel and the one or more repetition factors for the uplink control channel.

In some examples, to support transmitting the configuration information, the configuration information manager 1525 may be configured as or otherwise support a means for transmitting an indication of a control resource set configuration for the uplink control channel, the control resource set configuration including the configuration information indicating the correspondence between the one or more aggregation levels for the downlink control channel and the one or more repetition factors for the uplink control channel.

In some examples, to support transmitting the configuration information, the configuration information manager 1525 may be configured as or otherwise support a means for transmitting an indication of a search space configuration for the downlink control channel, the search space configuration including the configuration information indicating the correspondence between the one or more aggregation levels for the downlink control channel and the one or more repetition factors for the uplink control channel.

In some examples, the aggregation level manager 1545 may be configured as or otherwise support a means for identifying the first repetition factor of the one or more repetition factors for receiving the repetitions of the uplink control message. In some examples, the aggregation level manager 1545 may be configured as or otherwise support a means for selecting, from the one or more aggregation levels, the first aggregation level that is associated with the first repetition factor according to the correspondence, where the transmitting of the downlink control information message using the first aggregation level is based on the selecting.

In some examples, the channel quality manager 1555 may be configured as or otherwise support a means for determining a channel quality metric for the uplink control channel, where the identifying of the first repetition factor is based on the channel quality metric.

In some examples, the correspondence rule manager 1550 may be configured as or otherwise support a means for transmitting, to the UE in the configuration information, an indication of one or more rules instructing the UE to apply the correspondence to the repetitions of the uplink control message if one or more parameter values for the uplink control channel satisfy the one or more rules.

In some examples, the one or more parameter values for the uplink control channel include an identifier of a resource set for the uplink control channel, a size of an uplink control information message for transmission on the uplink control channel, a format for the uplink control channel, contents of the uplink control information message, or any combination thereof.

In some examples, the correspondence rule manager 1550 may be configured as or otherwise support a means for transmitting, to the UE in the configuration information, an indication of one or more rules instructing the UE to apply the correspondence to the repetitions of the uplink control message if one or more parameter values for the downlink control channel satisfy the one or more rules.

In some examples, the one or more parameter values for the downlink control channel include a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

Additionally, or alternatively, the communications manager 1520 may support wireless communications at a base station in accordance with examples as disclosed herein. In some examples, the DCI manager 1530 may be configured as or otherwise support a means for transmitting, to a UE, DCI that includes an indication for the UE to switch to a BWP. In some examples, the uplink repetition manager 1535 may be configured as or otherwise support a means for receiving, from the UE, a PUCCH in accordance with a PUCCH repetition factor that is based on an association with the BWP indicated in the DCI.

In some examples, the configuration information manager 1525 may be configured as or otherwise support a means for transmitting, to the UE, a semi-static configuration via radio resource control signaling that indicates the association between the BWP and the PUCCH repetition factor. In some examples, the semi-static configuration is a PUCCH resource set configuration. In some examples, the semi-static configuration indicates one or more associations between possible BWPs and corresponding PUCCH repetition factors. In some examples, the association between the BWP and the PUCCH repetition factor is based on a PUCCH resource set. In some examples, the association between the BWP and the PUCCH repetition factor is based on a PUCCH format. In some examples, the association between the BWP and the PUCCH repetition factor is based on an uplink control information size. In some examples, the association between the BWP and the PUCCH repetition factor is based on uplink control information content. In some examples, the BWP is an uplink BWP. In some examples, the BWP is a downlink BWP.

In some examples, the configuration information manager 1525 may be configured as or otherwise support a means for transmitting, to the UE, a downlink media access control control element that indicates one or more updated associations between possible BWPs and corresponding PUCCH repetition factors.

In some examples, the configuration information manager 1525 may be configured as or otherwise support a means for transmitting, to the UE, a second DCI that indicates one or more updated associations between possible BWPs and corresponding PUCCH repetition factors.

Additionally, or alternatively, the communications manager 1520 may support wireless communications at a base station in accordance with examples as disclosed herein. In some examples, the uplink repetition manager 1535 may be configured as or otherwise support a means for sending a UE signaling indicating a first repetition factor index, the base station being configured with information that maps, for each of a set of multiple repetition factor indexes, each of a set of multiple sets of transmission parameters to a corresponding quantity of PUCCH repetitions. In some examples, the uplink repetition manager 1535 may be configured as or otherwise support a means for monitoring for a first quantity of PUCCH repetitions, for a first PUCCH transmission, based on the information mapping a combination of the first repetition factor index and a first set of transmission parameters associated with the first PUCCH transmission to the first quantity of PUCCH repetitions.

In some examples, the configuration information manager 1525 may be configured as or otherwise support a means for sending signaling configuring the UE with the information via RRC signaling.

In some examples, the uplink repetition manager 1535 may be configured as or otherwise support a means for monitoring a second quantity of PUCCH repetitions, for a second PUCCH transmission, based on the information mapping a combination of the first repetition factor index and a second set of transmission parameters associated with the second PUCCH transmission to the second quantity of PUCCH repetitions.

In some examples, the information maps a combination of a second repetition factor index and the first set of transmission parameters to a second quantity of PUCCH repetitions.

In some examples, sending the signaling indicating the first repetition factor index includes sending DCI signaling indicating the first repetition factor index.

In some examples, sending the signaling indicating the first repetition factor index includes sending downlink medium access control (MAC) control element (MAC-CE) signaling indicating the first repetition factor index.

In some examples, the first set of transmission parameters is associated with the first PUCCH transmission based on the first set of transmission parameters being associated with an PDSCH transmission associated with the first PUCCH transmission. In some examples, the first set of transmission parameters includes a transmit beam. In some examples, the first set of transmission parameters includes a bandwidth part. In some examples, the first set of transmission parameters includes a content of the PUCCH transmission or an PDSCH associated with the first PUCCH transmission. In some examples, the first set of transmission parameters includes a semi-persistent scheduling (SPS) transmission associated with the first PUCCH transmission.

In some examples, the uplink repetition manager 1535 may be configured as or otherwise support a means for sending signaling indicating a third quantity of PUCCH repetitions is associated with the second set of transmission parameters. In some examples, the uplink repetition manager 1535 may be configured as or otherwise support a means for monitoring the third quantity of PUCCH repetitions instead of the second quantity of PUCCH repetitions for a second PUCCH transmission associated with the second set of transmission parameters.

Additionally, or alternatively, the communications manager 1520 may support wireless communications at a base station in accordance with examples as disclosed herein. In some examples, the uplink repetition manager 1535 may be configured as or otherwise support a means for sending a UE signaling indicating a first quantity of PUCCH repetitions is associated with a first set of transmission parameters. In some examples, the uplink repetition manager 1535 may be configured as or otherwise support a means for monitoring for the first quantity of PUCCH repetitions for a first PUCCH transmission associated with the first set of transmission parameters.

In some examples, the uplink repetition manager 1535 may be configured as or otherwise support a means for sending signaling indicating a second quantity of PUCCH repetitions is associated with the set of transmission parameters. In some examples, the uplink repetition manager 1535 may be configured as or otherwise support a means for monitoring the second quantity of PUCCH repetitions for a second PUCCH transmission associated with the first set of transmission parameters.

In some examples, the uplink repetition manager 1535 may be configured as or otherwise support a means for sending signaling indicating the first quantity of PUCCH repetitions is associated with a second set of transmission parameters. In some examples, the uplink repetition manager 1535 may be configured as or otherwise support a means for monitoring the first quantity of PUCCH repetitions for a second PUCCH transmission associated with the second set of transmission parameters.

In some examples, sending the signaling indicating the first quantity of PUCCH repetitions is associated with a first set of transmission parameters includes sending DCI signaling.

In some examples, sending the signaling indicating the first quantity of PUCCH repetitions is associated with a first set of transmission parameters includes sending downlink medium access control (MAC) control element (MAC-CE) signaling.

In some examples, the first set of transmission parameters is associated with the first PUCCH transmission based on the first set of transmission parameters being associated with an PDSCH transmission associated with the first PUCCH transmission. In some examples, the first set of transmission parameters includes a transmit beam. In some examples, the first set of transmission parameters includes a bandwidth part.

In some examples, the first set of transmission parameters includes a content of the PUCCH transmission or an PDSCH associated with the first PUCCH transmission. In some examples, the first set of transmission parameters includes a semi-persistent scheduling (SPS) transmission associated with the first PUCCH transmission.

Figure 16:
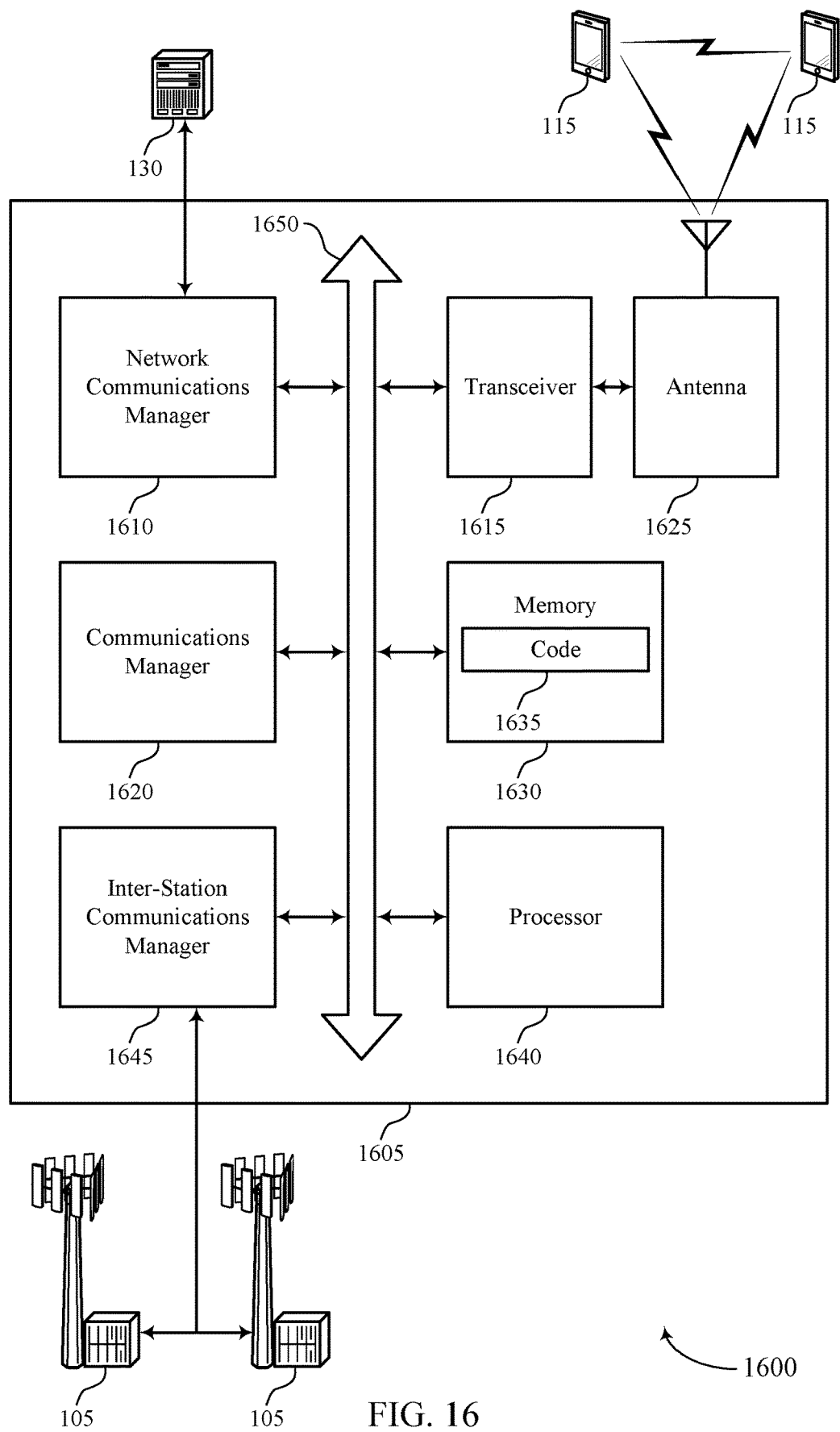
FIG. 16 shows a diagram of a system including a device that supports determining uplink control channel repetition factors in accordance with aspects of the present disclosure.

FIG. 16 shows a diagram of a system 1600 including a device 1605 that supports determining uplink control channel repetition factors in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting determining uplink control channel repetition factors). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a base station in accordance with examples as disclosed herein. For example, the communications manager 1620 may be configured as or otherwise support a means for transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel. The communications manager 1620 may be configured as or otherwise support a means for transmitting, to the UE on the downlink control channel, a downlink control information message using a first aggregation level of the one or more aggregation levels. The communications manager 1620 may be configured as or otherwise support a means for receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel.

Additionally, or alternatively, the communications manager 1620 may support wireless communications at a base station in accordance with examples as disclosed herein. For example, the communications manager 1620 may be configured as or otherwise support a means for transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel. The communications manager 1620 may be configured as or otherwise support a means for transmitting, to the UE on the downlink control channel, a downlink control information message using a first aggregation level of the one or more aggregation levels. The communications manager 1620 may be configured as or otherwise support a means for receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel. The communications manager 1620 may be configured as or otherwise support a means for initiating a timer based on the receiving of the downlink control information message. The communications manager 1620 may be configured as or otherwise support a means for receiving repetitions of uplink control messages according to the first repetition factor for a duration of the timer.

Additionally, or alternatively, the communications manager 1620 may support wireless communications at a base station in accordance with examples as disclosed herein. For example, the communications manager 1620 may be configured as or otherwise support a means for transmitting, to a UE, DCI that includes an indication for the UE to switch to a BWP. The communications manager 1620 may be configured as or otherwise support a means for receiving, from the UE, a PUCCH in accordance with a PUCCH repetition factor that is based on an association with the BWP indicated in the DCI.

Additionally, or alternatively, the communications manager 1620 may support wireless communications at a base station in accordance with examples as disclosed herein. For example, the communications manager 1620 may be configured as or otherwise support a means for sending a UE signaling indicating a first repetition factor index, the base station being configured with information that maps, for each of a set of multiple repetition factor indexes, each of a set of multiple sets of transmission parameters to a corresponding quantity of PUCCH repetitions. The communications manager 1620 may be configured as or otherwise support a means for monitoring for a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Additionally, or alternatively, the communications manager 1620 may support wireless communications at a base station in accordance with examples as disclosed herein. For example, the communications manager 1620 may be configured as or otherwise support a means for sending a UE signaling indicating a first quantity of PUCCH repetitions is associated with a first set of transmission parameters. The communications manager 1620 may be configured as or otherwise support a means for monitoring for the first quantity of PUCCH repetitions for a first PUCCH transmission associated with the first set of transmission parameters.

By including or configuring the communications manager 1620 in accordance with examples as described herein, the device 1605 may support techniques for determining repetition factors, resulting in decreased system latency more efficient use of wireless resources, more efficient use of computational resources, and improved user experience.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of determining uplink control channel repetition factors as described herein, or the processor 1640 and the memory 1630 may be otherwise configured to perform or support such operations.

Figure 17:
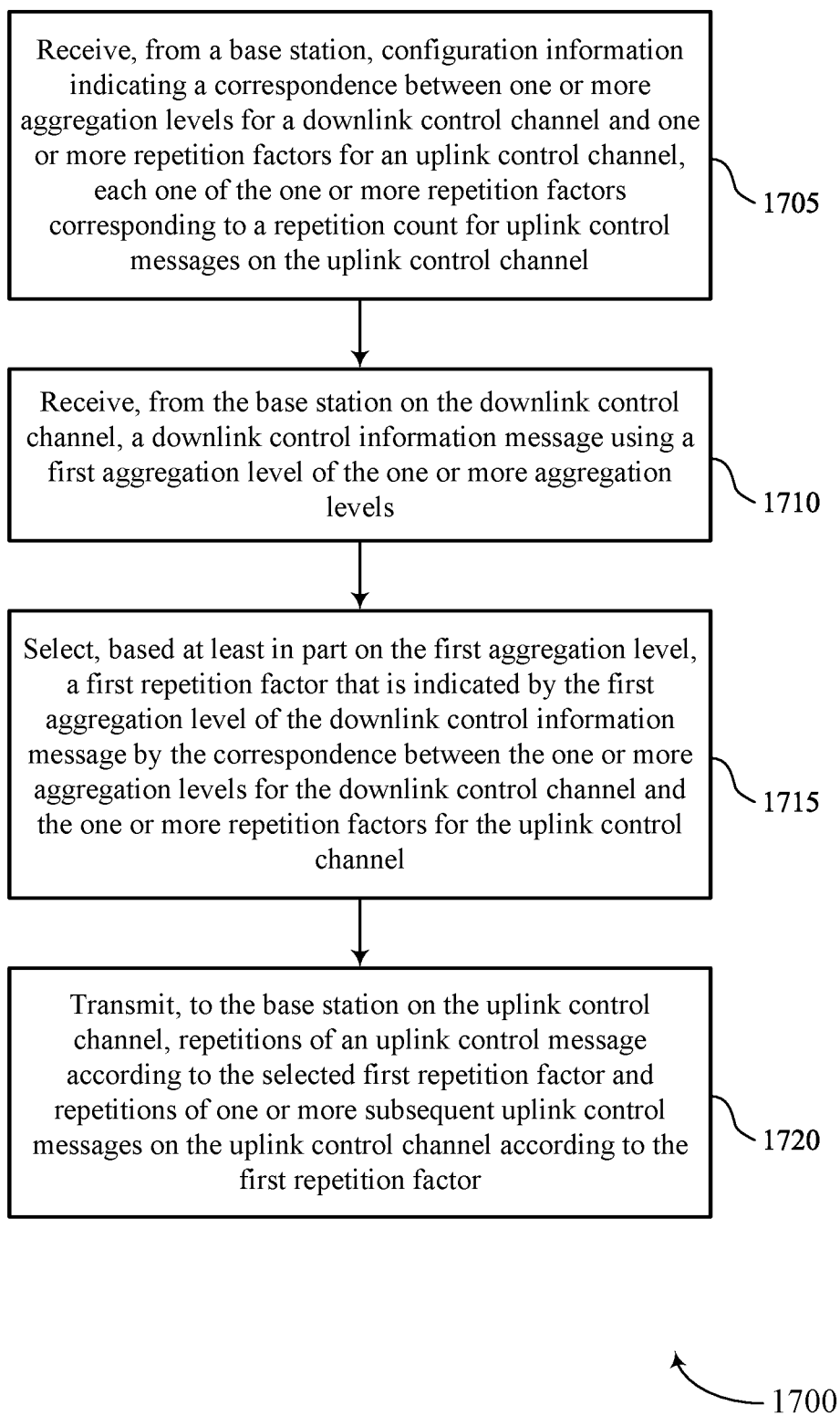
FIGS. 17 through 26 show flowcharts illustrating methods that support determining uplink control channel repetition factors in accordance with aspects of the present disclosure.

FIG. 17 shows a flowchart illustrating a method 1700 that supports determining uplink control channel repetition factors in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel. The operations of 1705 may be performed in accordance with examples as disclosed herein. In some examples, aspects of the operations of 1705 may be performed by a configuration information manager 1125 as described with reference to FIG. 11.

At 1710, the method may include receiving, from the base station on the downlink control channel, a downlink control information message using a first aggregation level of the one or more aggregation levels. The operations of 1710 may be performed in accordance with examples as disclosed herein. In some examples, aspects of the operations of 1710 may be performed by a DCI manager 1130 as described with reference to FIG. 11.

At 1715, the method may include selecting, based on the first aggregation level, a first repetition factor that is indicated by the first aggregation level of the downlink control information message by the correspondence between the one or more aggregation levels for the downlink control channel and the one or more repetition factors for the uplink control channel. The operations of 1715 may be performed in accordance with examples as disclosed herein. In some examples, aspects of the operations of 1715 may be performed by an uplink repetition manager 1135 as described with reference to FIG. 11.

At 1720, the method may include transmitting, to the base station on the uplink control channel, repetitions of an uplink control message according to the selected first repetition factor and repetitions of one or more subsequent uplink control messages on the uplink control channel according to the first repetition factor. The operations of 1720 may be performed in accordance with examples as disclosed herein. In some examples, aspects of the operations of 1720 may be performed by an uplink repetition manager 1135 as described with reference to FIG. 11.

Figure 18:
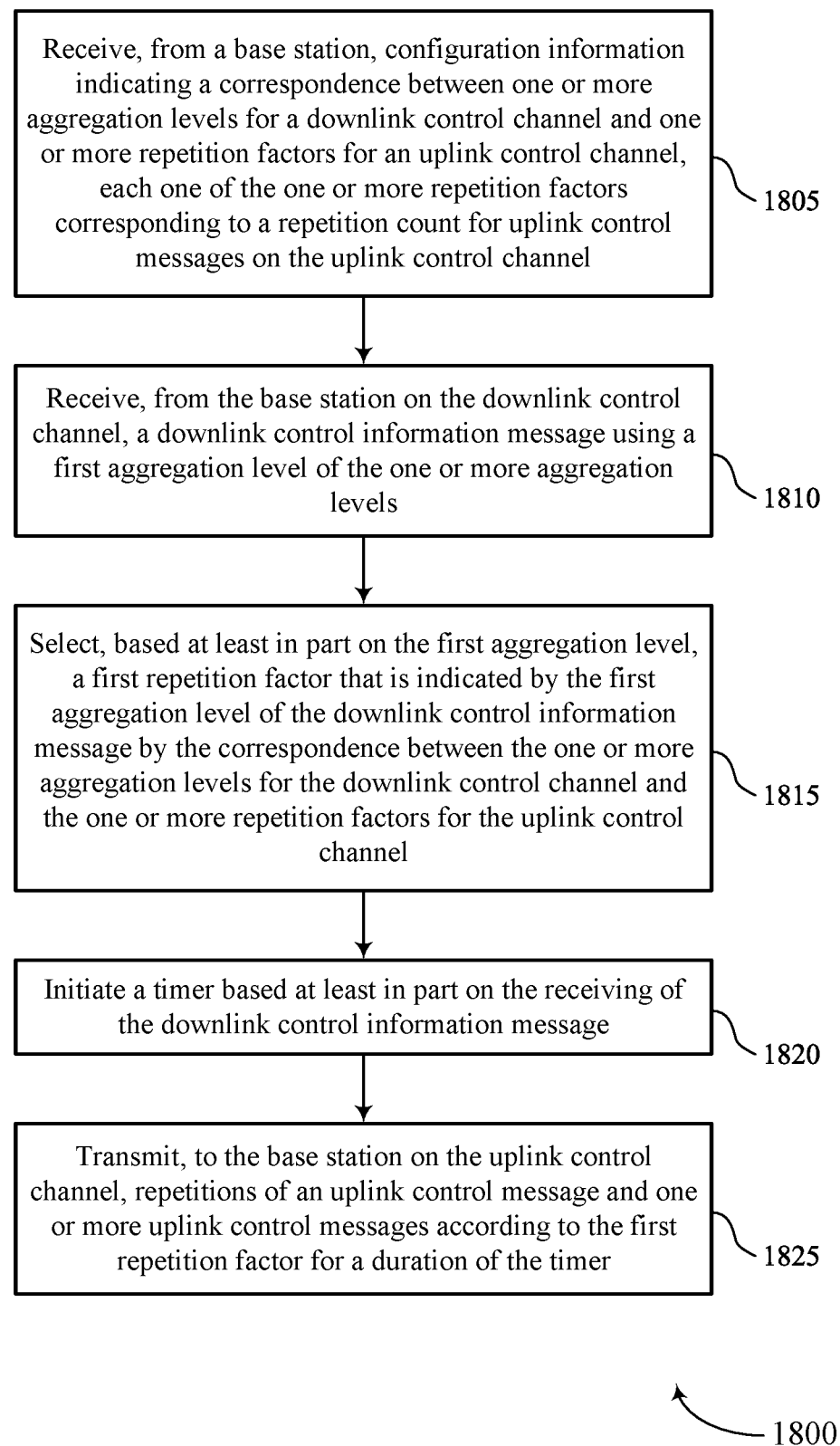

FIG. 18 shows a flowchart illustrating a method 1800 that supports determining uplink control channel repetition factors in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel. The operations of 1805 may be performed in accordance with examples as disclosed herein. In some examples, aspects of the operations of 1805 may be performed by a configuration information manager 1125 as described with reference to FIG. 11.

At 1810, the method may include receiving, from the base station on the downlink control channel, a downlink control information message using a first aggregation level of the one or more aggregation levels. The operations of 1810 may be performed in accordance with examples as disclosed herein. In some examples, aspects of the operations of 1810 may be performed by a DCI manager 1130 as described with reference to FIG. 11.

At 1815, the method may include selecting, based on the first aggregation level, a first repetition factor that is indicated by the first aggregation level of the downlink control information message by the correspondence between the one or more aggregation levels for the downlink control channel and the one or more repetition factors for the uplink control channel. The operations of 1815 may be performed in accordance with examples as disclosed herein. In some examples, aspects of the operations of 1815 may be performed by an uplink repetition manager 1135 as described with reference to FIG. 11.

At 1820, the method may include initiating a timer based on the receiving of the downlink control information message. The operations of 1820 may be performed in accordance with examples as disclosed herein. In some examples, aspects of the operations of 1820 may be performed by a timer manager 1140 as described with reference to FIG. 11.

At 1825, the method may include transmitting, to the base station on the uplink control channel, repetitions of an uplink control message and one or more uplink control messages according to the first repetition factor for a duration of the timer. The operations of 1825 may be performed in accordance with examples as disclosed herein. In some examples, aspects of the operations of 1825 may be performed by an uplink repetition manager 1135 as described with reference to FIG. 11.

Figure 19:
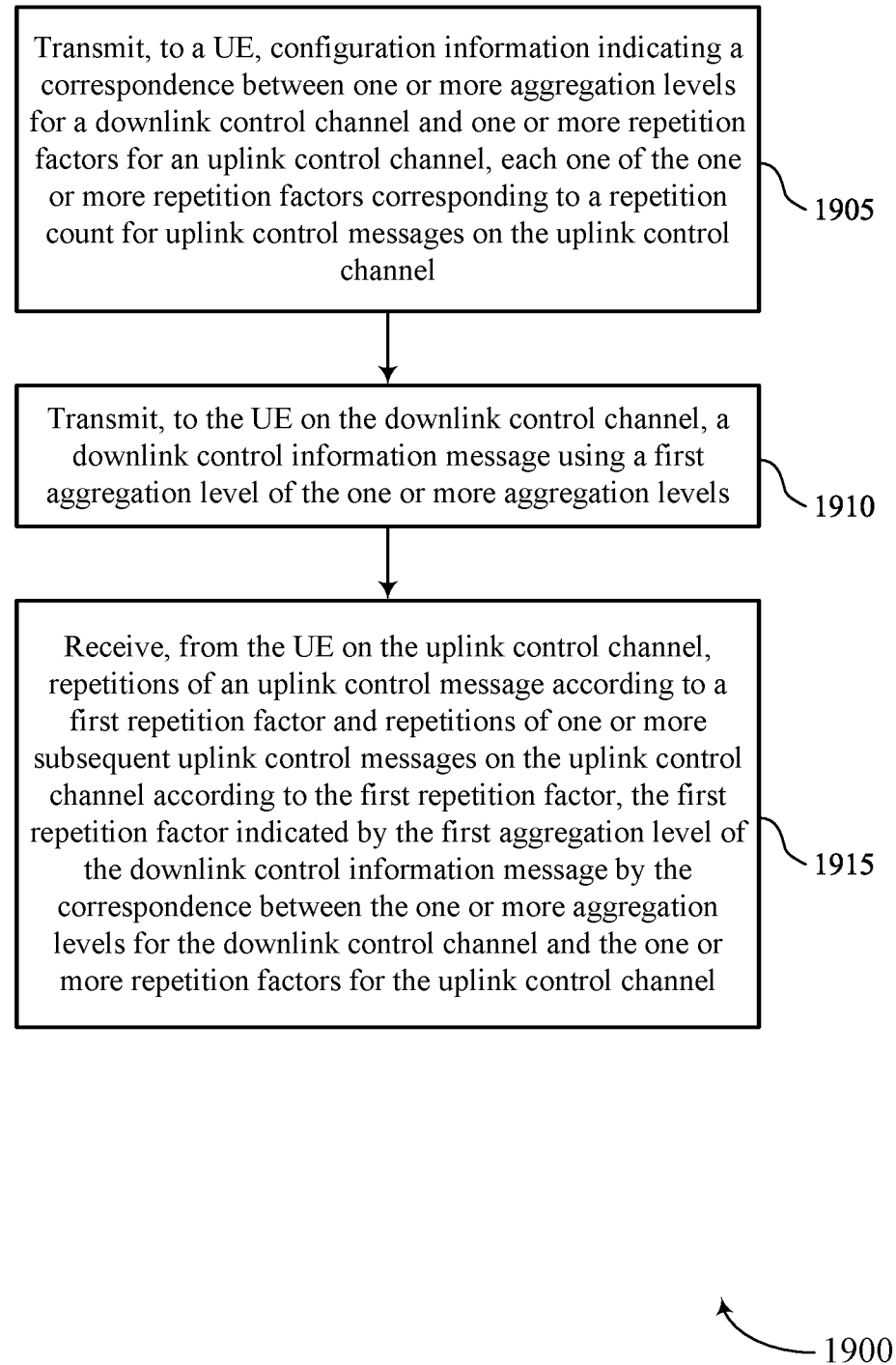

FIG. 19 shows a flowchart illustrating a method 1900 that supports determining uplink control channel repetition factors in accordance with aspects of the present disclosure. The operations of the method 1900 may be implemented by a base station or its components as described herein. For example, the operations of the method 1900 may be performed by a base station 105 as described with reference to FIGS. 1 through 8 and 13 through 16. In some examples, a base station may execute a set of instructions to control the functional elements of the base station to perform the described functions. Additionally, or alternatively, the base station may perform aspects of the described functions using special-purpose hardware.

At 1905, the method may include transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel. The operations of 1905 may be performed in accordance with examples as disclosed herein. In some examples, aspects of the operations of 1905 may be performed by a configuration information manager 1525 as described with reference to FIG. 15.

At 1910, the method may include transmitting, to the UE on the downlink control channel, a downlink control information message using a first aggregation level of the one or more aggregation levels. The operations of 1910 may be performed in accordance with examples as disclosed herein. In some examples, aspects of the operations of 1910 may be performed by a DCI manager 1530 as described with reference to FIG. 15.

At 1915, the method may include receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel. The operations of 1915 may be performed in accordance with examples as disclosed herein. In some examples, aspects of the operations of 1915 may be performed by an uplink repetition manager 1535 as described with reference to FIG. 15.

Figure 20:
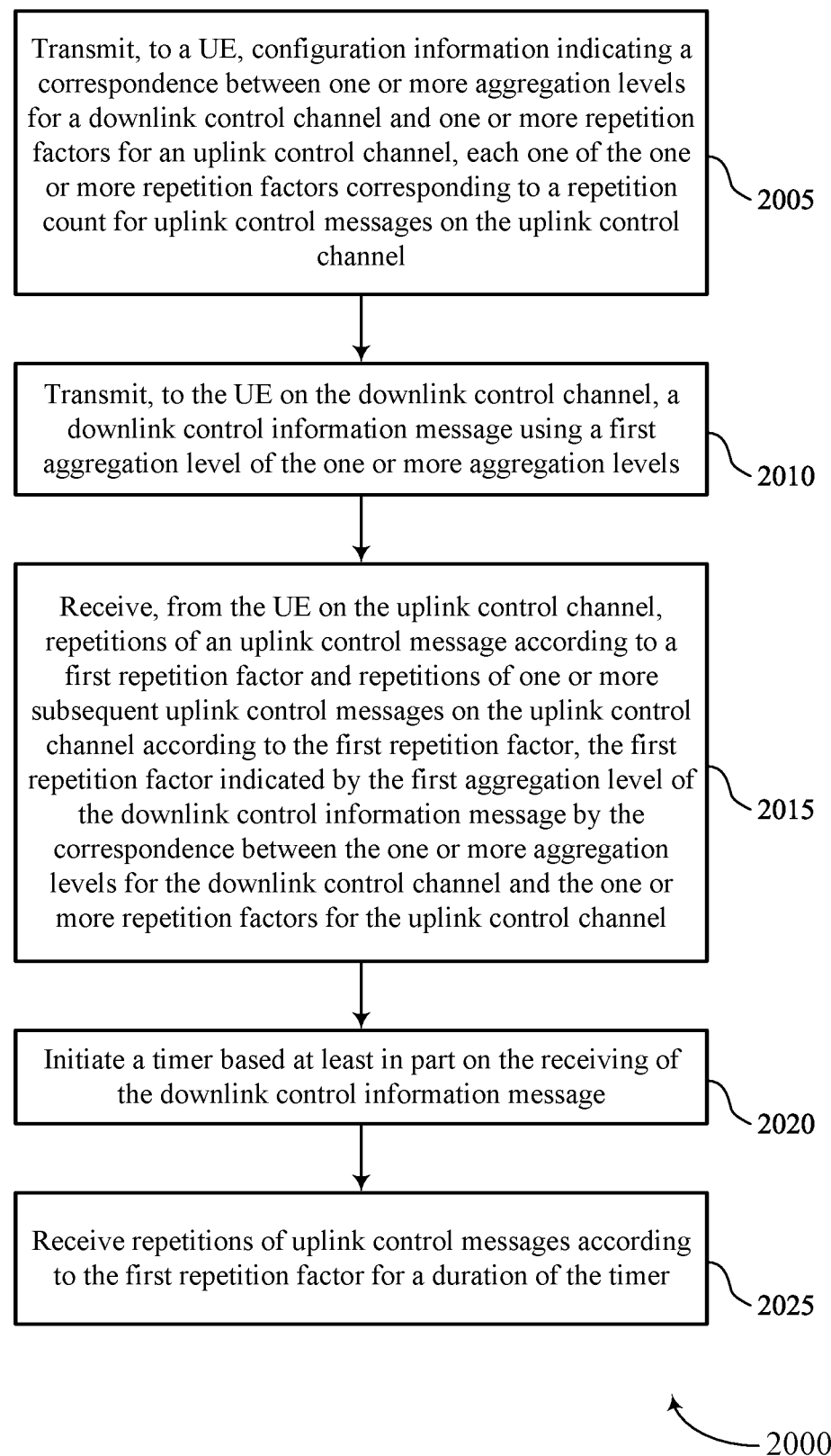

FIG. 20 shows a flowchart illustrating a method 2000 that supports determining uplink control channel repetition factors in accordance with aspects of the present disclosure. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally, or alternatively, the base station may perform aspects of the described functions using special-purpose hardware.

At 2005, the method may include transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel. The operations of 2005 may be performed in accordance with examples as disclosed herein. In some examples, aspects of the operations of 2005 may be performed by a configuration information manager 1525 as described with reference to FIG. 15.

At 2010, the method may include transmitting, to the UE on the downlink control channel, a downlink control information message using a first aggregation level of the one or more aggregation levels. The operations of 2010 may be performed in accordance with examples as disclosed herein. In some examples, aspects of the operations of 2010 may be performed by a DCI manager 1530 as described with reference to FIG. 15.

At 2015, the method may include receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel. The operations of 2015 may be performed in accordance with examples as disclosed herein. In some examples, aspects of the operations of 2015 may be performed by an uplink repetition manager 1535 as described with reference to FIG. 15.

At 2020, the method may include initiating a timer based on the receiving of the downlink control information message. The operations of 2020 may be performed in accordance with examples as disclosed herein. In some examples, aspects of the operations of 2020 may be performed by a timer manager 1540 as described with reference to FIG. 15.

At 2025, the method may include receiving repetitions of uplink control messages according to the first repetition factor for a duration of the timer. The operations of 2025 may be performed in accordance with examples as disclosed herein. In some examples, aspects of the operations of 2025 may be performed by an uplink repetition manager 1535 as described with reference to FIG. 15.

Figure 21:
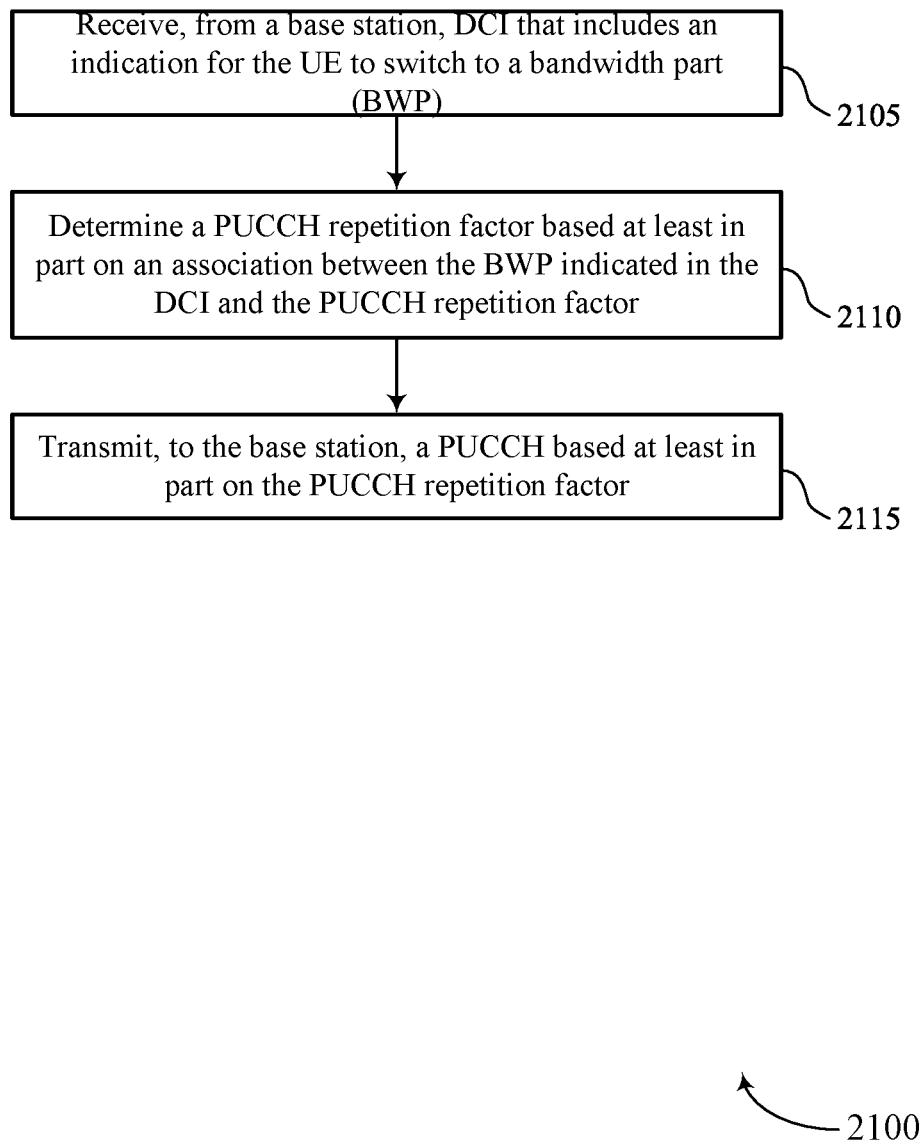

FIG. 21 shows a flowchart illustrating a method 2100 that supports determining uplink control channel repetition factors in accordance with aspects of the present disclosure. The operations of the method 2100 may be implemented by a UE or its components as described herein. For example, the operations of the method 2100 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2105, the method may include receiving, from a base station, DCI that includes an indication for the UE to switch to a BWP. The operations of 2105 may be performed in accordance with examples as disclosed herein. In some examples, aspects of the operations of 2105 may be performed by a DCI manager 1130 as described with reference to FIG. 11.

At 2110, the method may include determining a PUCCH repetition factor based on an association between the BWP indicated in the DCI and the PUCCH repetition factor. The operations of 2110 may be performed in accordance with examples as disclosed herein. In some examples, aspects of the operations of 2110 may be performed by an uplink repetition manager 1135 as described with reference to FIG. 11.

At 2115, the method may include transmitting, to the base station, a PUCCH based on the PUCCH repetition factor. The operations of 2115 may be performed in accordance with examples as disclosed herein. In some examples, aspects of the operations of 2115 may be performed by an uplink repetition manager 1135 as described with reference to FIG. 11.

Figure 22:
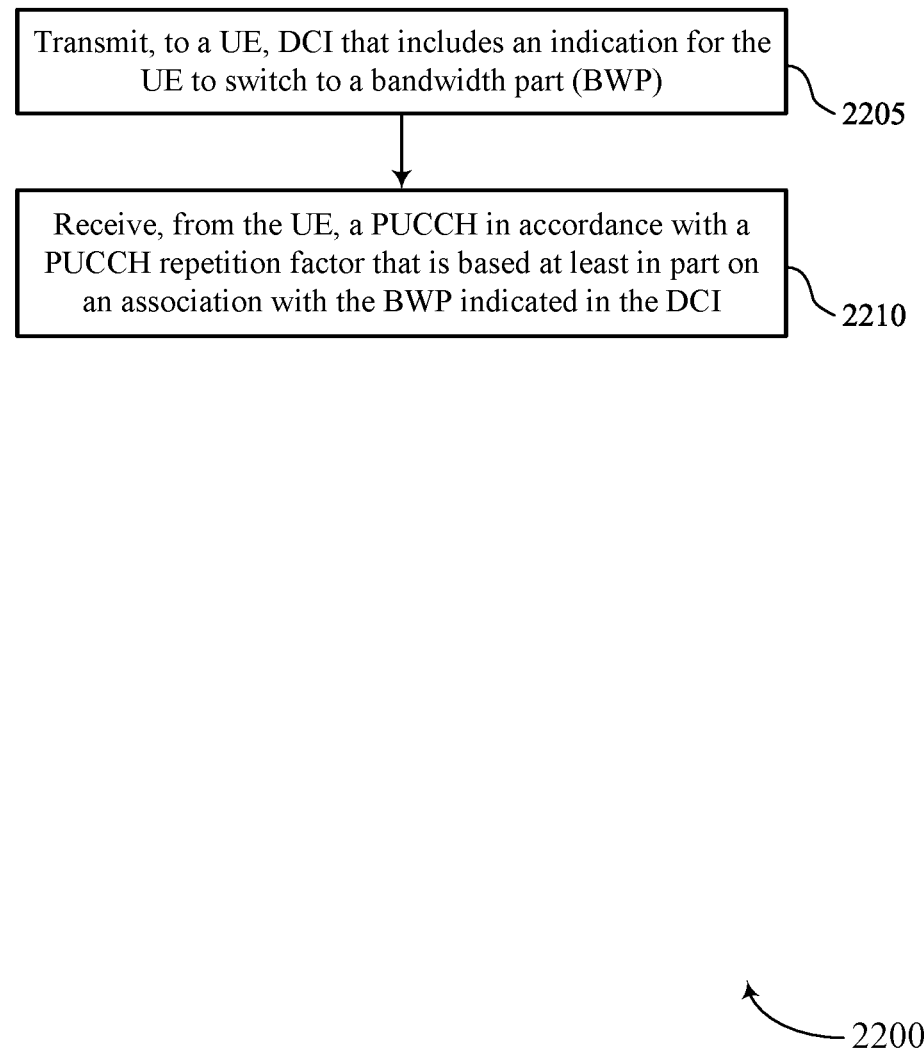

FIG. 22 shows a flowchart illustrating a method 2200 that supports determining uplink control channel repetition factors in accordance with aspects of the present disclosure. The operations of the method 2200 may be implemented by a base station or its components as described herein. For example, the operations of the method 2200 may be performed by a base station 105 as described with reference to FIGS. 1 through 8 and 13 through 16. In some examples, a base station may execute a set of instructions to control the functional elements of the base station to perform the described functions. Additionally, or alternatively, the base station may perform aspects of the described functions using special-purpose hardware.

At 2205, the method may include transmitting, to a UE, DCI that includes an indication for the UE to switch to a BWP. The operations of 2205 may be performed in accordance with examples as disclosed herein. In some examples, aspects of the operations of 2205 may be performed by a DCI manager 1530 as described with reference to FIG. 15.

At 2210, the method may include receiving, from the UE, a PUCCH in accordance with a PUCCH repetition factor that is based on an association with the BWP indicated in the DCI. The operations of 2210 may be performed in accordance with examples as disclosed herein. In some examples, aspects of the operations of 2210 may be performed by an uplink repetition manager 1535 as described with reference to FIG. 15.

Figure 23:
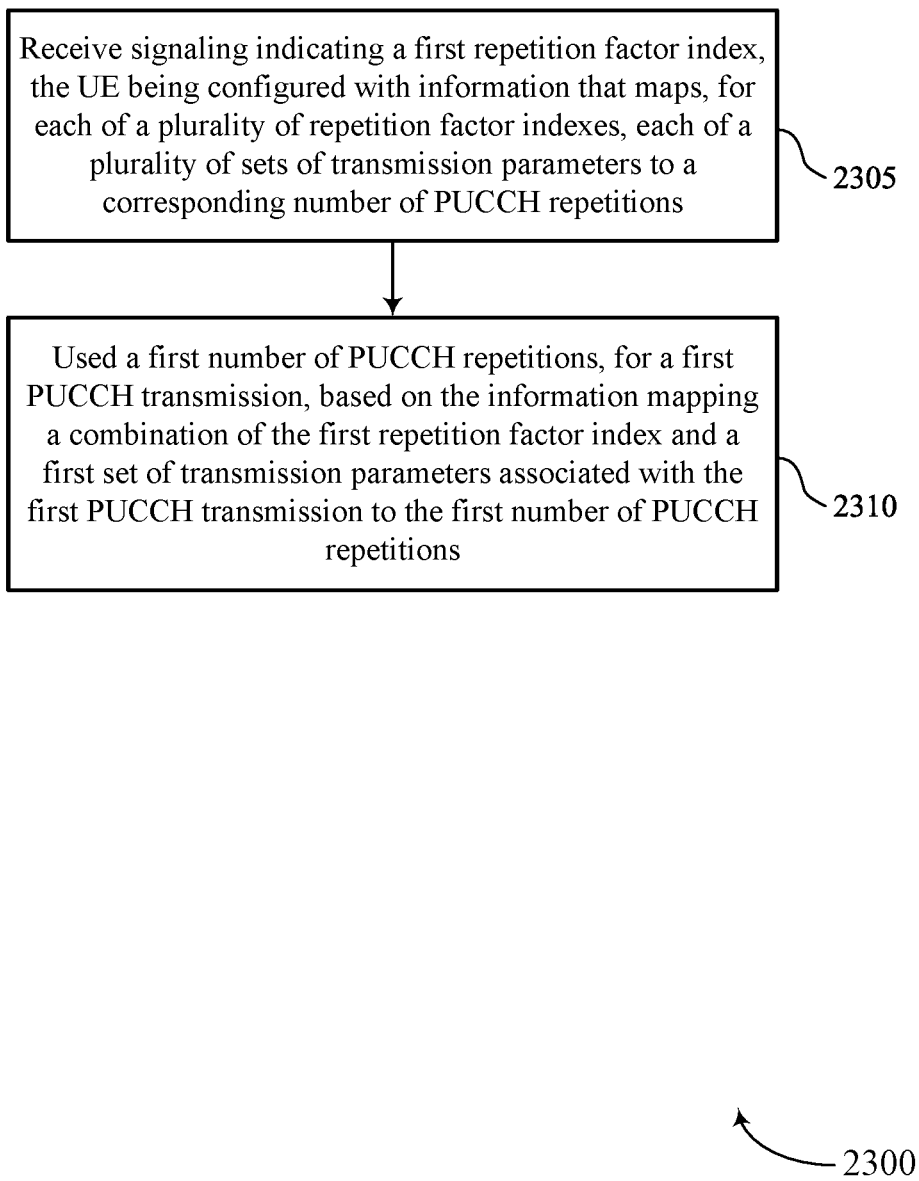

FIG. 23 shows a flowchart illustrating a method 2300 that supports determining uplink control channel repetition factors in accordance with aspects of the present disclosure. The operations of the method 2300 may be implemented by a UE or its components as described herein. For example, the operations of the method 2300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2305, the method may include receiving signaling indicating a first repetition factor index, the UE being configured with information that maps, for each of a set of multiple repetition factor indexes, each of a set of multiple sets of transmission parameters to a corresponding quantity of PUCCH repetitions. The operations of 2305 may be performed in accordance with examples as disclosed herein. In some examples, aspects of the operations of 2305 may be performed by an uplink repetition manager 1135 as described with reference to FIG. 11.

At 2310, the method may include using a first quantity of PUCCH repetitions, for a first PUCCH transmission, based on the information mapping a combination of the first repetition factor index and a first set of transmission parameters associated with the first PUCCH transmission to the first quantity of PUCCH repetitions. The operations of 2310 may be performed in accordance with examples as disclosed herein. In some examples, aspects of the operations of 2310 may be performed by an uplink repetition manager 1135 as described with reference to FIG. 11.

Figure 24:
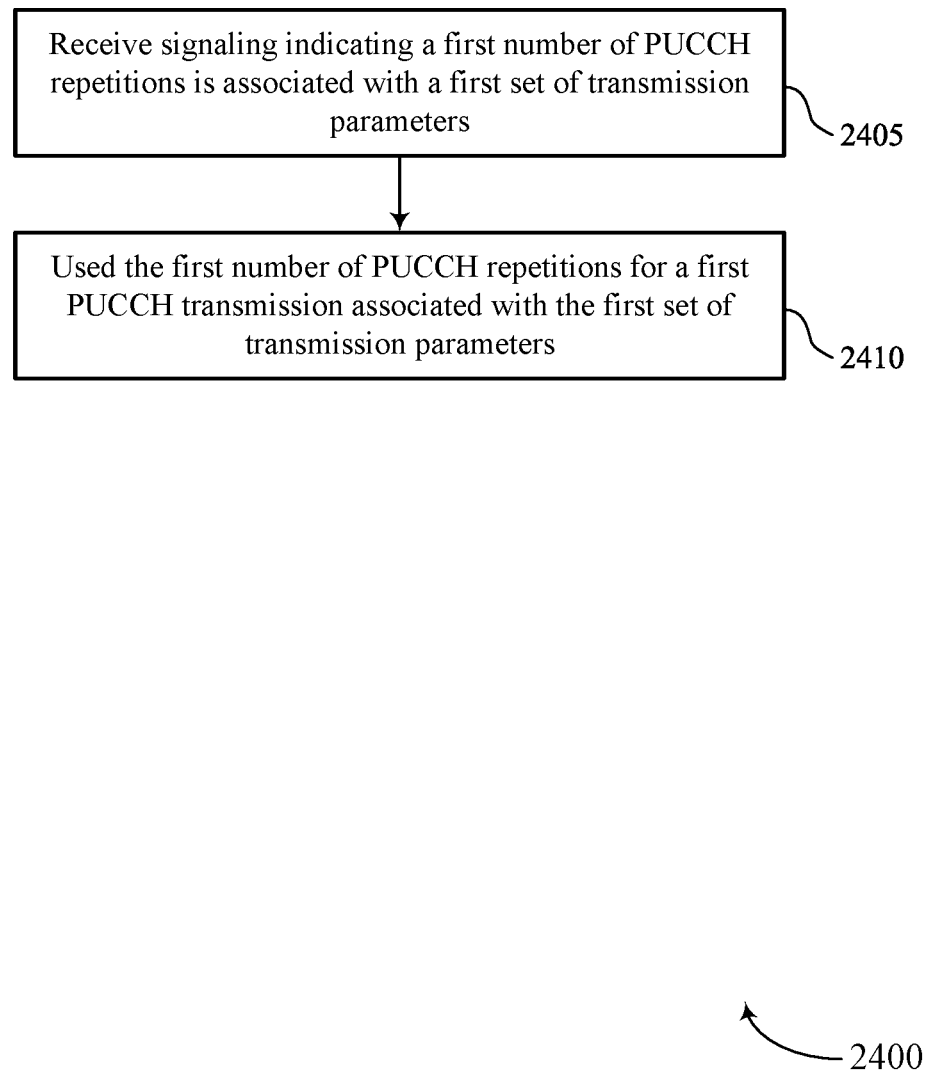

FIG. 24 shows a flowchart illustrating a method 2400 that supports determining uplink control channel repetition factors in accordance with aspects of the present disclosure. The operations of the method 2400 may be implemented by a UE or its components as described herein. For example, the operations of the method 2400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2405, the method may include receiving signaling indicating a first quantity of PUCCH repetitions is associated with a first set of transmission parameters. The operations of 2405 may be performed in accordance with examples as disclosed herein. In some examples, aspects of the operations of 2405 may be performed by an uplink repetition manager 1135 as described with reference to FIG. 11.

At 2410, the method may include using the first quantity of PUCCH repetitions for a first PUCCH transmission associated with the first set of transmission parameters. The operations of 2410 may be performed in accordance with examples as disclosed herein. In some examples, aspects of the operations of 2410 may be performed by an uplink repetition manager 1135 as described with reference to FIG. 11.

Figure 25:
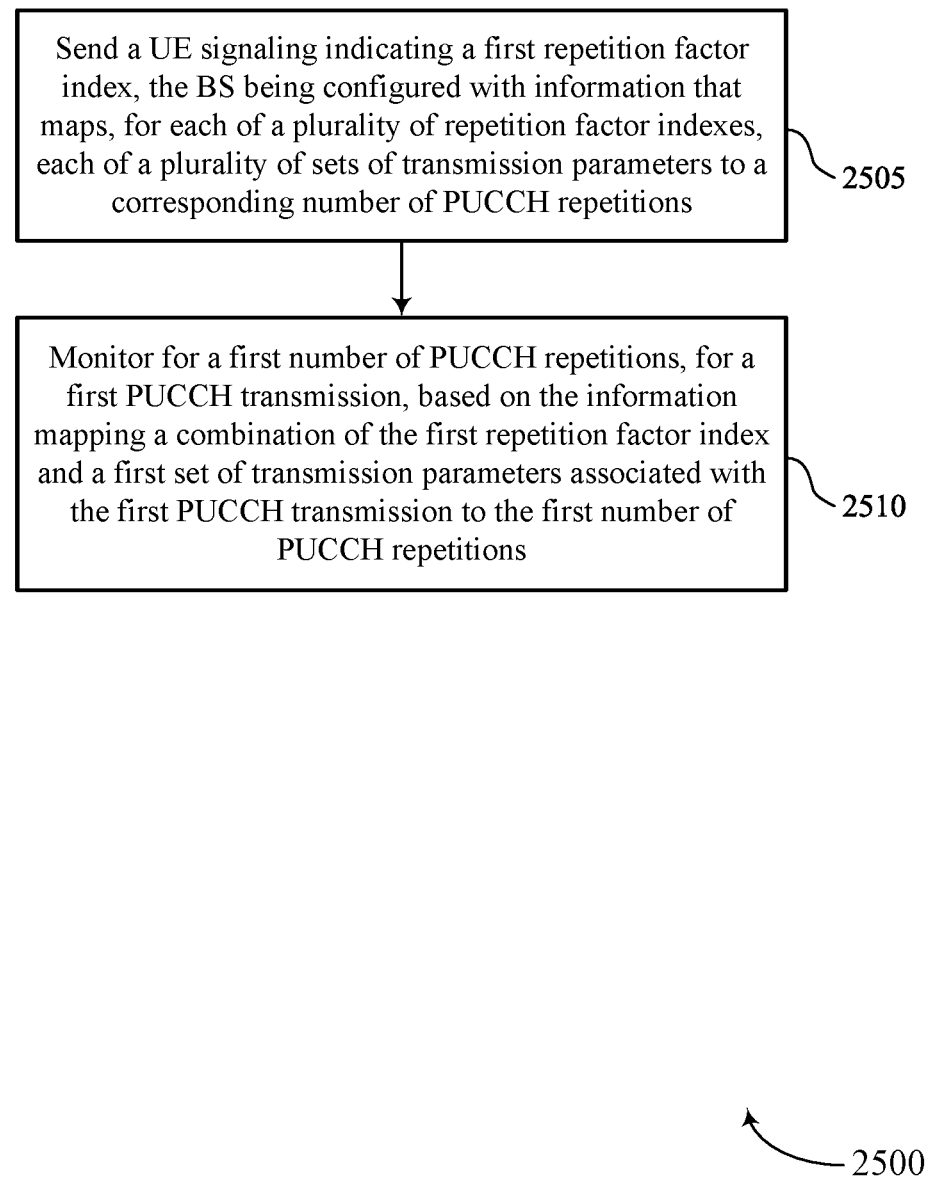

FIG. 25 shows a flowchart illustrating a method 2500 that supports determining uplink control channel repetition factors in accordance with aspects of the present disclosure. The operations of the method 2500 may be implemented by a base station or its components as described herein. For example, the operations of the method 2500 may be performed by a base station 105 as described with reference to FIGS. 1 through 8 and 13 through 16. In some examples, a base station may execute a set of instructions to control the functional elements of the base station to perform the described functions. Additionally, or alternatively, the base station may perform aspects of the described functions using special-purpose hardware.

At 2505, the method may include sending a UE signaling indicating a first repetition factor index, the base station being configured with information that maps, for each of a set of multiple repetition factor indexes, each of a set of multiple sets of transmission parameters to a corresponding quantity of PUCCH repetitions. The operations of 2505 may be performed in accordance with examples as disclosed herein. In some examples, aspects of the operations of 2505 may be performed by an uplink repetition manager 1535 as described with reference to FIG. 15.

At 2510, the method may include monitoring for a first quantity of PUCCH repetitions, for a first PUCCH transmission, based on the information mapping a combination of the first repetition factor index and a first set of transmission parameters associated with the first PUCCH transmission to the first quantity of PUCCH repetitions. The operations of 2510 may be performed in accordance with examples as disclosed herein. In some examples, aspects of the operations of 2510 may be performed by an uplink repetition manager 1535 as described with reference to FIG. 15.

Figure 26:
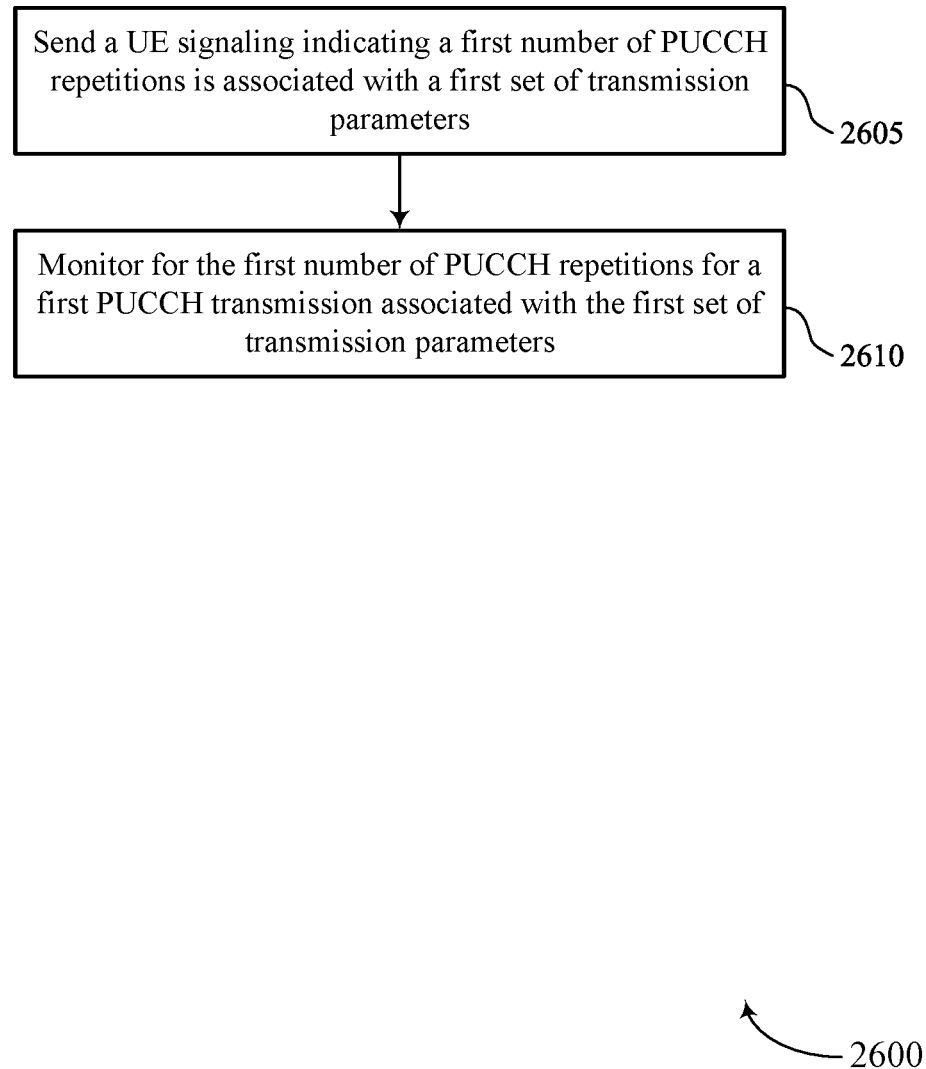

FIG. 26 shows a flowchart illustrating a method 2600 that supports determining uplink control channel repetition factors in accordance with aspects of the present disclosure. The operations of the method 2600 may be implemented by a base station or its components as described herein. For example, the operations of the method 2600 may be performed by a base station 105 as described with reference to FIGS. 1 through 8 and 13 through 16. In some examples, a base station may execute a set of instructions to control the functional elements of the base station to perform the described functions. Additionally, or alternatively, the base station may perform aspects of the described functions using special-purpose hardware.

At 2605, the method may include sending a UE signaling indicating a first quantity of PUCCH repetitions is associated with a first set of transmission parameters. The operations of 2605 may be performed in accordance with examples as disclosed herein. In some examples, aspects of the operations of 2605 may be performed by an uplink repetition manager 1535 as described with reference to FIG. 15.

At 2610, the method may include monitoring for the first quantity of PUCCH repetitions for a first PUCCH transmission associated with the first set of transmission parameters. The operations of 2610 may be performed in accordance with examples as disclosed herein. In some examples, aspects of the operations of 2610 may be performed by an uplink repetition manager 1535 as described with reference to FIG. 15.

The following provides an overview of aspects of the present disclosure:

Aspect 1: A method for wireless communications at a UE, comprising: receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel; receiving, from the base station on the downlink control channel, a downlink control information message using a first aggregation level of the one or more aggregation levels; selecting, based at least in part on the first aggregation level, a first repetition factor that is indicated by the first aggregation level of the downlink control information message by the correspondence between the one or more aggregation levels for the downlink control channel and the one or more repetition factors for the uplink control channel; and transmitting, to the base station on the uplink control channel, repetitions of an uplink control message according to the selected first repetition factor and repetitions of one or more subsequent uplink control messages on the uplink control channel according to the first repetition factor.

Aspect 2: The method of aspect 1, further comprising: receiving, from the base station after transmitting repetitions of the one or more subsequent uplink control messages, a second downlink control information message using a second aggregation level of the one or more aggregation levels; and transmitting, to the base station, repetitions of one or more additional uplink control messages according to a second repetition factor indicated by the second aggregation level of the second downlink control information message according to the correspondence between the one or more aggregation levels for the downlink control channel and the one or more repetition factors for the uplink control channel.

Aspect 3: The method of any of aspects 1 through 2, wherein receiving the configuration information comprises: receiving an indication of a control resource set configuration for the uplink control channel, the control resource set configuration comprising the configuration information indicating the correspondence between the one or more aggregation levels for the downlink control channel and the one or more repetition factors for the uplink control channel.

Aspect 4: The method of any of aspects 1 through 3, wherein receiving the configuration information comprises: receiving an indication of a search space configuration for the downlink control channel, the search space configuration comprising the configuration information indicating the correspondence between the one or more aggregation levels for the downlink control channel and the one or more repetition factors for the uplink control channel.

Aspect 5: The method of any of aspects 1 through 4, further comprising: determining whether one or more parameter values for the uplink control channel satisfy one or more rules; and applying the correspondence between the one or more aggregation levels for the downlink control channel and the one or more repetition factors for the uplink control channel to the repetitions of the uplink control message based at least in part on the determining, wherein the transmitting of the repetitions of the uplink control message according to the first repetition factor is based at least in part on the applying.

Aspect 6: The method of aspect 5, wherein the one or more parameter values for the uplink control channel comprise an identifier of a resource set for the uplink control channel, a size of an uplink control information message for transmission on the uplink control channel, a format for the uplink control channel, contents of the uplink control information message, or any combination thereof.

Aspect 7: The method of any of aspects 5 through 6, further comprising: receiving, in the configuration information, an indication of the one or more rules.

Aspect 8: The method of any of aspects 1 through 7, further comprising: determining whether one or more parameter values for the downlink control channel satisfy one or more rules; and applying the correspondence between the one or more aggregation levels for the downlink control channel and the one or more repetition factors for the uplink control channel to the repetitions of the uplink control message based at least in part on the determining, wherein the transmitting of the repetitions of the uplink control message according to the first repetition factor is based at least in part on the applying.

Aspect 9: The method of aspect 8, wherein the one or more parameter values for the downlink control channel comprise a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

Aspect 10: The method of any of aspects 8 through 9, further comprising: receiving, in the configuration information, an indication of the one or more rules.

Aspect 11: A method for wireless communications at a UE, comprising: receiving, from a base station, configuration information indicating a correspondence between one or more aggregation levels for a downlink control channel and one or more repetition factors for an uplink control channel, each one of the one or more repetition factors corresponding to a repetition count for uplink control messages on the uplink control channel; receiving, from the base station on the downlink control channel, a downlink control information message using a first aggregation level of the one or more aggregation levels; selecting, based at least in part on the first aggregation level, a first repetition factor that is indicated by the first aggregation level of the downlink control information message by the correspondence between the one or more aggregation levels for the downlink control channel and the one or more repetition factors for the uplink control channel; initiating a timer based at least in part on the receiving of the downlink control information message; and transmitting, to the base station on the uplink control channel, repetitions of an uplink control message and one or more uplink control messages according to the first repetition factor for a duration of the timer.

Aspect 12: The method of aspect 11, further comprising: transmitting, upon expiration of the timer, repetitions of one or more additional uplink control messages according to a second repetition factor.

Aspect 13: The method of any of aspects 11 through 12, wherein receiving the configuration information comprises: receiving an indication of a control resource set configuration for the uplink control channel, the control resource set configuration comprising the configuration information indicating the correspondence between the one or more aggregation levels for the downlink control channel and the one or more repetition factors for the uplink control channel.

Aspect 14: The method of any of aspects 11 through 13, wherein receiving the configuration information comprises: receiving an indication of a search space configuration for the downlink control channel, the search space configuration comprising the configuration information indicating the correspondence between the one or more aggregation levels for the downlink control channel and the one or more repetition factors for the uplink control channel.

Aspect 15: The method of any of aspects 11 through 14, further comprising: determining whether one or more parameter values for the uplink control channel satisfy one or more rules; and applying the correspondence between the one or more aggregation levels for the downlink control channel and the one or more repetition factors for the uplink control channel to the repetitions of the uplink control message based at least in part on the determining, wherein the transmitting of the repetitions of the uplink control message according to the first repetition factor is based at least in part on the applying.

Aspect 16: The method of aspect 15, wherein the one or more parameter values for the uplink control channel comprise an identifier of a resource set for the uplink control channel, a size of an uplink control information message for transmission on the uplink control channel, a format for the uplink control channel, contents of the uplink control information message, or any combination thereof.

Aspect 17: The method of any of aspects 15 through 16, further comprising: receiving, in the configuration information, an indication of the one or more rules.

Aspect 18: The method of any of aspects 11 through 17, further comprising: determining whether one or more parameter values for the downlink control channel satisfy one or more rules; and applying the correspondence between the one or more aggregation levels for the downlink control channel and the one or more repetition factors for the uplink control channel to the repetitions of the uplink control message based at least in part on the determining, wherein the transmitting of the repetitions of the uplink control message according to the first repetition factor is based at least in part on the applying.

Aspect 19: The method of aspect 18, wherein the one or more parameter values for the downlink control channel comprise a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

Aspect 20: The method of any of aspects 18 through 19, further comprising: receiving, in the configuration information, an indication of the one or more rules.

Aspect 21: A method for wireless communications at a base station, comprising: transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel; transmitting, to the UE on the downlink control channel, a downlink control information message using a first aggregation level of the one or more aggregation levels; and receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel.

Aspect 22: The method of aspect 21, further comprising: transmitting, to the UE after receiving repetitions of the one or more subsequent uplink control messages, a second downlink control information message using a second aggregation level of the one or more aggregation levels; and receiving, from the UE, repetitions of one or more additional uplink control messages according to a second repetition factor indicated by the second aggregation level of the second downlink control information message according to the correspondence between the one or more aggregation levels for the downlink control channel and the one or more repetition factors for the uplink control channel.

Aspect 23: The method of any of aspects 21 through 22, wherein transmitting the configuration information comprises: transmitting an indication of a control resource set configuration for the uplink control channel, the control resource set configuration comprising the configuration information indicating the correspondence between the one or more aggregation levels for the downlink control channel and the one or more repetition factors for the uplink control channel.

Aspect 24: The method of any of aspects 21 through 23, wherein transmitting the configuration information comprises: transmitting an indication of a search space configuration for the downlink control channel, the search space configuration comprising the configuration information indicating the correspondence between the one or more aggregation levels for the downlink control channel and the one or more repetition factors for the uplink control channel.

Aspect 25: The method of any of aspects 21 through 24, further comprising: identifying the first repetition factor of the one or more repetition factors for receiving the repetitions of the uplink control message; and selecting, from the one or more aggregation levels, the first aggregation level that is associated with the first repetition factor according to the correspondence, wherein the transmitting of the downlink control information message using the first aggregation level is based at least in part on the selecting.

Aspect 26: The method of aspect 25, further comprising: determining a channel quality metric for the uplink control channel, wherein the identifying of the first repetition factor is based at least in part on the channel quality metric.

Aspect 27: The method of any of aspects 21 through 26, further comprising: transmitting, to the UE in the configuration information, an indication of one or more rules instructing the UE to apply the correspondence to the repetitions of the uplink control message if one or more parameter values for the uplink control channel satisfy the one or more rules.

Aspect 28: The method of aspect 27, wherein the one or more parameter values for the uplink control channel comprise an identifier of a resource set for the uplink control channel, a size of an uplink control information message for transmission on the uplink control channel, a format for the uplink control channel, contents of the uplink control information message, or any combination thereof.

Aspect 29: The method of any of aspects 21 through 28, further comprising: transmitting, to the UE in the configuration information, an indication of one or more rules instructing the UE to apply the correspondence to the repetitions of the uplink control message if one or more parameter values for the downlink control channel satisfy the one or more rules.

Aspect 30: The method of aspect 29, wherein the one or more parameter values for the downlink control channel comprise a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

Aspect 31: A method for wireless communications at a base station, comprising: transmitting, to a UE, configuration information indicating a correspondence between one or more aggregation levels for a downlink control channel and one or more repetition factors for an uplink control channel, each one of the one or more repetition factors corresponding to a repetition count for uplink control messages on the uplink control channel; transmitting, to the UE on the downlink control channel, a downlink control information message using a first aggregation level of the one or more aggregation levels; receiving, from the UE on the uplink control channel, repetitions of an uplink control message according to a first repetition factor and repetitions of one or more subsequent uplink control messages on the uplink control channel according to the first repetition factor, the first repetition factor indicated by the first aggregation level of the downlink control information message by the correspondence between the one or more aggregation levels for the downlink control channel and the one or more repetition factors for the uplink control channel; initiating a timer based at least in part on the receiving of the downlink control information message; and receiving repetitions of uplink control messages according to the first repetition factor for a duration of the timer.

Aspect 32: The method of aspect 31, further comprising: receiving, upon expiration of the timer, repetitions of one or more additional uplink control messages according to a second repetition factor.

Aspect 33: The method of any of aspects 31 through 32, further comprising: transmitting, to the UE after receiving repetitions of the one or more subsequent uplink control messages, a second downlink control information message using a second aggregation level of the one or more aggregation levels; and receiving, from the UE, repetitions of one or more additional uplink control messages according to a second repetition factor indicated by the second aggregation level of the second downlink control information message according to the correspondence between the one or more aggregation levels for the downlink control channel and the one or more repetition factors for the uplink control channel.

Aspect 34: The method of any of aspects 31 through 33, wherein transmitting the configuration information comprises: transmitting an indication of a control resource set configuration for the uplink control channel, the control resource set configuration comprising the configuration information indicating the correspondence between the one or more aggregation levels for the downlink control channel and the one or more repetition factors for the uplink control channel.

Aspect 35: The method of any of aspects 31 through 34, wherein transmitting the configuration information comprises: transmitting an indication of a search space configuration for the downlink control channel, the search space configuration comprising the configuration information indicating the correspondence between the one or more aggregation levels for the downlink control channel and the one or more repetition factors for the uplink control channel.

Aspect 36: The method of any of aspects 31 through 35, further comprising: identifying the first repetition factor of the one or more repetition factors for receiving the repetitions of the uplink control message; and selecting, from the one or more aggregation levels, the first aggregation level that is associated with the first repetition factor according to the correspondence, wherein the transmitting of the downlink control information message using the first aggregation level is based at least in part on the selecting.

Aspect 37: The method of any of aspects 31 through 36, further comprising: determining a channel quality metric for the uplink control channel, wherein the identifying of the first repetition factor is based at least in part on the channel quality metric.

Aspect 38: The method of any of aspects 31 through 37, further comprising: transmitting, to the UE in the configuration information, an indication of one or more rules instructing the UE to apply the correspondence to the repetitions of the uplink control message if one or more parameter values for the uplink control channel satisfy the one or more rules.

Aspect 39: The method of aspect 38, wherein the one or more parameter values for the uplink control channel comprise an identifier of a resource set for the uplink control channel, a size of an uplink control information message for transmission on the uplink control channel, a format for the uplink control channel, contents of the uplink control information message, or any combination thereof.

Aspect 40: The method of any of aspects 31 through 39, further comprising: transmitting, to the UE in the configuration information, an indication of one or more rules instructing the UE to apply the correspondence to the repetitions of the uplink control message if one or more parameter values for the downlink control channel satisfy the one or more rules.

Aspect 41: The method of aspect 40, wherein the one or more parameter values for the downlink control channel comprise a size of the downlink control information message, an identifier for a search space associated with the downlink control channel, an identifier for a control resource set associated with the downlink control channel, an index of the control channel within a search space, a location of control channel elements within a control resource set for the control channel, an index of a search space of the control channel, or any combination thereof.

Aspect 42: A method for wireless communications at a UE, comprising: receiving, from a base station, DCI that includes an indication for the UE to switch to a BWP; determining a PUCCH repetition factor based at least in part on an association between the BWP indicated in the DCI and the PUCCH repetition factor; and transmitting, to the base station, a PUCCH based at least in part on the PUCCH repetition factor.

Aspect 43: The method of aspect 42, further comprising: receiving, from the base station, a semi-static configuration via radio resource control signaling that indicates the association between the BWP and the PUCCH repetition factor; and wherein determining the PUCCH repetition factor comprises determining the PUCCH repetition factor based at least in part on the semi-static configuration.

Aspect 44: The method of aspect 43, wherein the semi-static configuration is a PUCCH resource set configuration.

Aspect 45: The method of any of aspects 43 through 44, wherein the semi-static configuration indicates one or more associations between possible BWPs and corresponding PUCCH repetition factors.

Aspect 46: The method of any of aspects 42 through 45, wherein the association between the BWP and the PUCCH repetition factor is based at least in part on a PUCCH resource set.

Aspect 47: The method of any of aspects 42 through 46, wherein the association between the BWP and the PUCCH repetition factor is based at least in part on a PUCCH format.

Aspect 48: The method of any of aspects 42 through 47, wherein the association between the BWP and the PUCCH repetition factor is based at least in part on an uplink control information size.

Aspect 49: The method of any of aspects 42 through 48, wherein the association between the BWP and the PUCCH repetition factor is based at least in part on uplink control information content.

Aspect 50: The method of any of aspects 42 through 49, wherein the BWP is an uplink BWP.

Aspect 51: The method of any of aspects 42 through 50, wherein the BWP is a downlink BWP.

Aspect 52: The method of any of aspects 42 through 51, further comprising: receiving, from the base station, a downlink media access control control element that indicates one or more updated associations between possible BWPs and corresponding PUCCH repetition factors.

Aspect 53: The method of any of aspects 42 through 52, wherein the DCI is a first DCI, and further comprising: receiving, from the base station, a second DCI that indicates one or more updated associations between possible BWPs and corresponding PUCCH repetition factors.

Aspect 54: A method for wireless communications at a base station, comprising: transmitting, to a UE, DCI that includes an indication for the UE to switch to a BWP; and receiving, from the UE, a PUCCH in accordance with a PUCCH repetition factor that is based at least in part on an association with the BWP indicated in the DCI.

Aspect 55: The method of aspect 54, further comprising: transmitting, to the UE, a semi-static configuration via radio resource control signaling that indicates the association between the BWP and the PUCCH repetition factor.

Aspect 56: The method of aspect 55, wherein the semi-static configuration is a PUCCH resource set configuration.

Aspect 57: The method of any of aspects 55 through 56, wherein the semi-static configuration indicates one or more associations between possible BWPs and corresponding PUCCH repetition factors.

Aspect 58: The method of any of aspects 54 through 57, wherein the association between the BWP and the PUCCH repetition factor is based at least in part on a PUCCH resource set.

Aspect 59: The method of any of aspects 54 through 58, wherein the association between the BWP and the PUCCH repetition factor is based at least in part on a PUCCH format.

Aspect 60: The method of any of aspects 54 through 59, wherein the association between the BWP and the PUCCH repetition factor is based at least in part on an uplink control information size.

Aspect 61: The method of any of aspects 54 through 60, wherein the association between the BWP and the PUCCH repetition factor is based at least in part on uplink control information content.

Aspect 62: The method of any of aspects 54 through 61, wherein the BWP is an uplink BWP.

Aspect 63: The method of any of aspects 54 through 62, wherein the BWP is a downlink BWP.

Aspect 64: The method of any of aspects 54 through 63, further comprising: transmitting, to the UE, a downlink media access control control element that indicates one or more updated associations between possible BWPs and corresponding PUCCH repetition factors.

Aspect 65: The method of any of aspects 54 through 64, wherein the DCI is a first DCI, and further comprising: transmitting, to the UE, a second DCI that indicates one or more updated associations between possible BWPs and corresponding PUCCH repetition factors.

Aspect 66: A method for wireless communications at a UE, comprising: receiving signaling indicating a first repetition factor index, the UE being configured with information that maps, for each of a plurality of repetition factor indexes, each of a plurality of sets of transmission parameters to a corresponding quantity of PUCCH repetitions; and using a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Aspect 67: The method of aspect 66, further comprising: receiving signaling configuring the UE with the information via RRC signaling.

Aspect 68: The method of any of aspects 66 through 67, further comprising: using a second quantity of PUCCH repetitions, for a second PUCCH transmission, based on the information mapping a combination of the first repetition factor index and a second set of transmission parameters associated with the second PUCCH transmission to the second quantity of PUCCH repetitions.

Aspect 69: The method of any of aspects 66 through 68, wherein the information maps a combination of a second repetition factor index and the first set of transmission parameters to a second quantity of PUCCH repetitions.

Aspect 70: The method of any of aspects 66 through 69, wherein receiving the signaling indicating the first repetition factor index comprises receiving DCI signaling indicating the first repetition factor index.

Aspect 71: The method of any of aspects 66 through 70, wherein receiving the signaling indicating the first repetition factor index comprises receiving downlink medium access control (MAC) control element (MAC-CE) signaling indicating the first repetition factor index.

Aspect 72: The method of any of aspects 66 through 71, wherein the first set of transmission parameters is associated with the first PUCCH transmission based on the first set of transmission parameters being associated with an PDSCH transmission associated with the first PUCCH transmission.

Aspect 73: The method of any of aspects 66 through 72, wherein the first set of transmission parameters comprises a transmit beam.

Aspect 74: The method of any of aspects 66 through 73, wherein the first set of transmission parameters comprises a bandwidth part.

Aspect 75: The method of any of aspects 66 through 74, wherein the first set of transmission parameters comprises a content of the PUCCH transmission or an PDSCH associated with the first PUCCH transmission.

Aspect 76: The method of any of aspects 66 through 75, wherein the first set of transmission parameters comprises a semi-persistent scheduling (SPS) transmission associated with the first PUCCH transmission.

Aspect 77: The method of any of aspects 66 through 76, wherein the information maps a combination of the first repetition factor index and a second set of transmission parameters to a second quantity of PUCCH repetitions, and further comprising: receiving signaling indicating a third quantity of PUCCH repetitions is associated with the second set of transmission parameters; and using the third quantity of PUCCH repetitions instead of the second quantity of PUCCH repetitions for a second PUCCH transmission associated with the second set of transmission parameters.

Aspect 78: A method for wireless communications at a UE, comprising: receiving signaling indicating a first quantity of PUCCH repetitions is associated with a first set of transmission parameters; and using the first quantity of PUCCH repetitions for a first PUCCH transmission associated with the first set of transmission parameters.

Aspect 79: The method of aspect 78, further comprising: receiving signaling indicating a second quantity of PUCCH repetitions is associated with the set of transmission parameters; and using the second quantity of PUCCH repetitions for a second PUCCH transmission associated with the first set of transmission parameters.

Aspect 80: The method of any of aspects 78 through 79, further comprising: receiving signaling indicating the first quantity of PUCCH repetitions is associated with a second set of transmission parameters; and using the first quantity of PUCCH repetitions for a second PUCCH transmission associated with the second set of transmission parameters.

Aspect 81: The method of any of aspects 78 through 80, wherein receiving the signaling indicating the first quantity of PUCCH repetitions is associated with a first set of transmission parameters comprises receiving DCI signaling.

Aspect 82: The method of any of aspects 78 through 81, wherein receiving the signaling indicating the first quantity of PUCCH repetitions is associated with a first set of transmission parameters comprises receiving downlink medium access control (MAC) control element (MAC-CE) signaling.

Aspect 83: The method of any of aspects 78 through 82, wherein the first set of transmission parameters is associated with the first PUCCH transmission based on the first set of transmission parameters being associated with an PDSCH transmission associated with the first PUCCH transmission.

Aspect 84: The method of any of aspects 78 through 83, wherein the first set of transmission parameters comprises a transmit beam.

Aspect 85: The method of any of aspects 78 through 84, wherein the first set of transmission parameters comprises a bandwidth part.

Aspect 86: The method of any of aspects 78 through 85, wherein the first set of transmission parameters comprises a content of the PUCCH transmission or an PDSCH associated with the first PUCCH transmission.

Aspect 87: The method of any of aspects 78 through 86, wherein the first set of transmission parameters comprises a semi-persistent scheduling (SPS) transmission associated with the first PUCCH transmission.

Aspect 88: A method for wireless communications at a base station, comprising: sending a UE signaling indicating a first repetition factor index, the base station being configured with information that maps, for each of a plurality of repetition factor indexes, each of a plurality of sets of transmission parameters to a corresponding quantity of PUCCH repetitions; and monitoring for a first quantity of PUCCH repetitions, for a first PUCCH transmission, based on the information mapping a combination of the first repetition factor index and a first set of transmission parameters associated with the first PUCCH transmission to the first quantity of PUCCH repetitions.

Aspect 89: The method of aspect 88, further comprising: sending signaling configuring the UE with the information via RRC signaling.

Aspect 90: The method of any of aspects 88 through 89, further comprising: monitoring a second quantity of PUCCH repetitions, for a second PUCCH transmission, based on the information mapping a combination of the first repetition factor index and a second set of transmission parameters associated with the second PUCCH transmission to the second quantity of PUCCH repetitions.

Aspect 91: The method of any of aspects 88 through 90, wherein the information maps a combination of a second repetition factor index and the first set of transmission parameters to a second quantity of PUCCH repetitions.

Aspect 92: The method of any of aspects 88 through 91, wherein sending the signaling indicating the first repetition factor index comprises sending DCI signaling indicating the first repetition factor index.

Aspect 93: The method of any of aspects 88 through 92, wherein sending the signaling indicating the first repetition factor index comprises sending downlink medium access control (MAC) control element (MAC-CE) signaling indicating the first repetition factor index.

Aspect 94: The method of any of aspects 88 through 93, wherein the first set of transmission parameters is associated with the first PUCCH transmission based on the first set of transmission parameters being associated with an PDSCH transmission associated with the first PUCCH transmission.

Aspect 95: The method of any of aspects 88 through 94, wherein the first set of transmission parameters comprises a transmit beam.

Aspect 96: The method of any of aspects 88 through 95, wherein the first set of transmission parameters comprises a bandwidth part.

Aspect 97: The method of any of aspects 88 through 96, wherein the first set of transmission parameters comprises a content of the PUCCH transmission or an PDSCH associated with the first PUCCH transmission.

Aspect 98: The method of any of aspects 88 through 97, wherein the first set of transmission parameters comprises a semi-persistent scheduling (SPS) transmission associated with the first PUCCH transmission.

Aspect 99: The method of any of aspects 88 through 98, wherein the information maps a combination of the first repetition factor index and a second set of transmission parameters to a second quantity of PUCCH repetitions, and further comprising: sending signaling indicating a third quantity of PUCCH repetitions is associated with the second set of transmission parameters; and monitoring the third quantity of PUCCH repetitions instead of the second quantity of PUCCH repetitions for a second PUCCH transmission associated with the second set of transmission parameters.

Aspect 100: A method for wireless communications at a base station, comprising: sending a UE signaling indicating a first quantity of PUCCH repetitions is associated with a first set of transmission parameters; and monitoring for the first quantity of PUCCH repetitions for a first PUCCH transmission associated with the first set of transmission parameters.

Aspect 101: The method of aspect 100, further comprising: sending signaling indicating a second quantity of PUCCH repetitions is associated with the set of transmission parameters; and monitoring the second quantity of PUCCH repetitions for a second PUCCH transmission associated with the first set of transmission parameters.

Aspect 102: The method of any of aspects 100 through 101, further comprising: sending signaling indicating the first quantity of PUCCH repetitions is associated with a second set of transmission parameters; and monitoring the first quantity of PUCCH repetitions for a second PUCCH transmission associated with the second set of transmission parameters.

Aspect 103: The method of any of aspects 100 through 102, wherein sending the signaling indicating the first quantity of PUCCH repetitions is associated with a first set of transmission parameters comprises sending DCI signaling.

Aspect 104: The method of any of aspects 100 through 103, wherein sending the signaling indicating the first quantity of PUCCH repetitions is associated with a first set of transmission parameters comprises sending downlink medium access control (MAC) control element (MAC-CE) signaling.

Aspect 105: The method of any of aspects 100 through 104, wherein the first set of transmission parameters is associated with the first PUCCH transmission based on the first set of transmission parameters being associated with an PDSCH transmission associated with the first PUCCH transmission.

Aspect 106: The method of any of aspects 100 through 105, wherein the first set of transmission parameters comprises a transmit beam.

Aspect 107: The method of any of aspects 100 through 106, wherein the first set of transmission parameters comprises a bandwidth part.

Aspect 108: The method of any of aspects 100 through 107, wherein the first set of transmission parameters comprises a content of the PUCCH transmission or an PDSCH associated with the first PUCCH transmission.

Aspect 109: The method of any of aspects 100 through 108, wherein the first set of transmission parameters comprises a semi-persistent scheduling (SPS) transmission associated with the first PUCCH transmission.

Aspect 110: An apparatus for wireless communications at a UE, comprising a processor; memory coupled with the processor; and instructions stored in the memory and executable by the processor to cause the apparatus to perform a method of any of aspects 1 through 10.

Aspect 111: An apparatus for wireless communications at a UE, comprising at least one means for performing a method of any of aspects 1 through 10.

Aspect 112: A non-transitory computer-readable medium storing code for wireless communications at a UE, the code comprising instructions executable by a processor to perform a method of any of aspects 1 through 10.

Aspect 113: An apparatus for wireless communications at a UE, comprising a processor; memory coupled with the processor; and instructions stored in the memory and executable by the processor to cause the apparatus to perform a method of any of aspects 11 through 20.

Aspect 114: An apparatus for wireless communications at a UE, comprising at least one means for performing a method of any of aspects 11 through 20.

Aspect 115: A non-transitory computer-readable medium storing code for wireless communications at a UE, the code comprising instructions executable by a processor to perform a method of any of aspects 11 through 20.

Aspect 116: An apparatus for wireless communications at a base station, comprising a processor; memory coupled with the processor; and instructions stored in the memory and executable by the processor to cause the apparatus to perform a method of any of aspects 21 through 30.

Aspect 117: An apparatus for wireless communications at a base station, comprising at least one means for performing a method of any of aspects 21 through 30.

Aspect 118: A non-transitory computer-readable medium storing code for wireless communications at a base station, the code comprising instructions executable by a processor to perform a method of any of aspects 21 through 30.

Aspect 119: An apparatus for wireless communications at a base station, comprising a processor; memory coupled with the processor; and instructions stored in the memory and executable by the processor to cause the apparatus to perform a method of any of aspects 31 through 41.

Aspect 120: An apparatus for wireless communications at a base station, comprising at least one means for performing a method of any of aspects 31 through 41.

Aspect 121: A non-transitory computer-readable medium storing code for wireless communications at a base station, the code comprising instructions executable by a processor to perform a method of any of aspects 31 through 41.

Aspect 122: An apparatus for wireless communications at a UE, comprising a processor; memory coupled with the processor; and instructions stored in the memory and executable by the processor to cause the apparatus to perform a method of any of aspects 42 through 53.

Aspect 123: An apparatus for wireless communications at a UE, comprising at least one means for performing a method of any of aspects 42 through 53.

Aspect 124: A non-transitory computer-readable medium storing code for wireless communications at a UE, the code comprising instructions executable by a processor to perform a method of any of aspects 42 through 53.

Aspect 125: An apparatus for wireless communications at a base station, comprising a processor; memory coupled with the processor; and instructions stored in the memory and executable by the processor to cause the apparatus to perform a method of any of aspects 54 through 65.

Aspect 126: An apparatus for wireless communications at a base station, comprising at least one means for performing a method of any of aspects 54 through 65.

Aspect 127: A non-transitory computer-readable medium storing code for wireless communications at a base station, the code comprising instructions executable by a processor to perform a method of any of aspects 54 through 65.

Aspect 128: An apparatus for wireless communications at a UE, comprising a processor; memory coupled with the processor; and instructions stored in the memory and executable by the processor to cause the apparatus to perform a method of any of aspects 66 through 77.

Aspect 129: An apparatus for wireless communications at a UE, comprising at least one means for performing a method of any of aspects 66 through 77.

Aspect 130: A non-transitory computer-readable medium storing code for wireless communications at a UE, the code comprising instructions executable by a processor to perform a method of any of aspects 66 through 77.

Aspect 131: An apparatus for wireless communications at a UE, comprising a processor; memory coupled with the processor; and instructions stored in the memory and executable by the processor to cause the apparatus to perform a method of any of aspects 78 through 87.

Aspect 132: An apparatus for wireless communications at a UE, comprising at least one means for performing a method of any of aspects 78 through 87.

Aspect 133: A non-transitory computer-readable medium storing code for wireless communications at a UE, the code comprising instructions executable by a processor to perform a method of any of aspects 78 through 87.

Aspect 134: An apparatus for wireless communications at a base station, comprising a processor; memory coupled with the processor; and instructions stored in the memory and executable by the processor to cause the apparatus to perform a method of any of aspects 88 through 99.

Aspect 135: An apparatus for wireless communications at a base station, comprising at least one means for performing a method of any of aspects 88 through 99.

Aspect 136: A non-transitory computer-readable medium storing code for wireless communications at a base station, the code comprising instructions executable by a processor to perform a method of any of aspects 88 through 99.

Aspect 137: An apparatus for wireless communications at a base station, comprising a processor; memory coupled with the processor; and instructions stored in the memory and executable by the processor to cause the apparatus to perform a method of any of aspects 100 through 109.

Aspect 138: An apparatus for wireless communications at a base station, comprising at least one means for performing a method of any of aspects 100 through 109.

Aspect 139: A non-transitory computer-readable medium storing code for wireless communications at a base station, the code comprising instructions executable by a processor to perform a method of any of aspects 100 through 109.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a message that indicates at least one association between a bandwidth part (BWP) and a physical uplink control channel (PUCCH) repetition factor;
   receiving downlink control information (DCI) that includes an indication for the UE to switch to the BWP for communications;
   determining the PUCCH repetition factor based at least in part on the indication of the at least one association between the BWP and the PUCCH repetition factor; and
   transmitting a PUCCH based at least in part on the PUCCH repetition factor.

2. The method of claim 1, wherein the receiving of the message that indicates the at least one association between the BWP and the PUCCH repetition factor comprises:
   receiving a semi-static configuration via radio resource control signaling that indicates the at least one association between the BWP and the PUCCH repetition factor, wherein determining the PUCCH repetition factor is based at least in part on the semi-static configuration.

3. The method of claim 2, wherein the semi-static configuration is a PUCCH resource set configuration.

4. The method of claim 2, wherein the semi-static configuration indicates one or more associations between possible BWPs and corresponding PUCCH repetition factors.

5. The method of claim 1, wherein the at least one association between the BWP and the PUCCH repetition factor is based at least in part on a PUCCH resource set, a PUCCH format, an uplink control information size, or uplink control information content.

6. The method of claim 1, further comprising:
   receiving a downlink medium access control (MAC) control element (MAC-CE) that indicates one or more updated associations between possible BWPs and corresponding PUCCH repetition factors.

7. The method of claim 1, wherein the DCI is a first DCI, and further comprising:
   receiving a second DCI that indicates one or more updated associations between possible BWPs and corresponding PUCCH repetition factors.

8. A method for wireless communications at a user equipment (UE), comprising:
   receiving first signaling indicating that a first repetition factor index is associated with a first mapping of a first quantity of physical uplink control channel (PUCCH) repetitions to a first set of transmission parameters and a second repetition factor index is associated with a second mapping of a second quantity of PUCCH repetitions to the first set of transmission parameters;
   receiving second signaling that selects the first repetition factor index from among the first repetition factor index and the second repetition factor index indicated via the first signaling; and
   using, based at least in part on the second signaling that selects the first repetition factor index, the first quantity of PUCCH repetitions for a first PUCCH transmission associated with the first set of transmission parameters.

9. The method of claim 8, further comprising:
   receiving third signaling that selects the second repetition factor index from among the first repetition factor index and the second repetition factor index indicated via the first signaling; and
   using, based at least in part on the third signaling that selects the second repetition factor index, the second quantity of PUCCH repetitions for a second PUCCH transmission associated with the first set of transmission parameters.

10. The method of claim 8, further comprising:
    receiving signaling indicating the first quantity of PUCCH repetitions is associated with a second set of transmission parameters; and
    using the first quantity of PUCCH repetitions for a second PUCCH transmission associated with the second set of transmission parameters.

11. The method of claim 8, wherein receiving the first signaling comprises receiving downlink control information (DCI) signaling.

12. The method of claim 8, wherein receiving the first signaling comprises receiving downlink medium access control (MAC) control element (MAC-CE) signaling.

13. The method of claim 8, wherein the first set of transmission parameters is associated with the first PUCCH transmission based on the first set of transmission parameters being associated with a physical downlink shared channel (PDSCH) transmission associated with the first PUCCH transmission.

14. The method of claim 8, wherein the first set of transmission parameters comprises a transmit beam, a bandwidth part, a content of the PUCCH transmission, a physical downlink shared channel (PDSCH) associated with the first PUCCH transmission, or a semi-persistent scheduling (SPS) transmission associated with the first PUCCH transmission.

15. An apparatus for wireless communications at a user equipment (UE), comprising:
    one or more processors;
    memory coupled with the one or more processors; and
    instructions stored in the memory and executable by the one or more processors to cause the apparatus to:
      receive a message that indicates at least one association between a bandwidth part (BWP) and a physical uplink control channel (PUCCH) repetition factor;
      receive downlink control information (DCI) that includes an indication for the UE to switch to the BWP for communications;

determine the PUCCH repetition factor based at least in part on the indication of the at least one association between the BWP and the PUCCH repetition factor; and transmit a PUCCH based at least in part on the PUCCH repetition factor.

16. The apparatus of claim 15, wherein the instructions to receive the message that indicates the at least one association between the BWP and the PUCCH repetition factor are further executable by the one or more processors to cause the apparatus to:

receive a semi-static configuration via radio resource control signaling that indicates the at least one association between the BWP and the PUCCH repetition factor, wherein determining the PUCCH repetition factor comprises is based at least in part on the semi-static configuration.

17. The apparatus of claim 16, wherein the semi-static configuration is a PUCCH resource set configuration.

18. The apparatus of claim 16, wherein the semi-static configuration indicates one or more associations between possible BWPs and corresponding PUCCH repetition factors.

19. The apparatus of claim 15, wherein the at least one association between the BWP and the PUCCH repetition factor is based at least in part on a PUCCH resource set, a PUCCH format, an uplink control information size, or uplink control information content.

20. The apparatus of claim 15, wherein the instructions are further executable by the one or more processors to cause the apparatus to:

receive a downlink medium access control (MAC) control element (MAC-CE) that indicates one or more updated associations between possible BWPs and corresponding PUCCH repetition factors.

21. The apparatus of claim 15, wherein the DCI is a first DCI, and wherein the instructions are further executable by the one or more processors to cause the apparatus to:

receive a second DCI that indicates one or more updated associations between possible BWPs and corresponding PUCCH repetition factors.

22. An apparatus for wireless communications at a user equipment (UE), comprising:

one or more processors;

memory coupled with the one or more processors; and instructions stored in the memory and executable by the one or more processors to cause the apparatus to:

receive first signaling indicating that a first repetition factor index is associated with a first mapping of a first quantity of physical uplink control channel (PUCCH) repetitions to a first set of transmission parameters and a second repetition factor index is associated with a second mapping of a second quantity of PUCCH repetitions to the first set of transmission parameters;

receive second signaling that selects the first repetition factor index from among the first repetition factor index and the second repetition factor index indicated via the first signaling; and use, based at least in part on the second signaling that selects the first repetition factor index, the first quantity of PUCCH repetitions for a first PUCCH transmission associated with the first set of transmission parameters.

23. The apparatus of claim 22, wherein the instructions are further executable by the one or more processors to cause the apparatus to:

receive third signaling that selects the second repetition factor index from among the first repetition factor index and the second repetition factor index indicated via the first signaling; and use, based at least in part on the third signaling that selects the second repetition factor index, the second quantity of PUCCH repetitions for a second PUCCH transmission associated with the first set of transmission parameters.

24. The apparatus of claim 22, wherein the instructions are further executable by the one or more processors to cause the apparatus to:

receive signaling indicating the first quantity of PUCCH repetitions is associated with a second set of transmission parameters; and use the first quantity of PUCCH repetitions for a second PUCCH transmission associated with the second set of transmission parameters.

25. The apparatus of claim 22, wherein the instructions to receive the first signaling are executable by the one or more processors to cause the apparatus to receive downlink control information (DCI) signaling.

26. The apparatus of claim 22, wherein the instructions to receive the first signaling are executable by the one or more processors to cause the apparatus to receive downlink medium access control (MAC) control element (MAC-CE) signaling.

27. The apparatus of claim 22, wherein the first set of transmission parameters is associated with the first PUCCH transmission based on the first set of transmission parameters being associated with a physical downlink shared channel (PDSCH) transmission associated with the first PUCCH transmission.

28. The apparatus of claim 22, wherein the first set of transmission parameters comprises a transmit beam, a bandwidth part, a content of the PUCCH transmission, a physical downlink shared channel (PDSCH) associated with the first PUCCH transmission, or a semi-persistent scheduling (SPS) transmission associated with the first PUCCH transmission.

* * * * *